(12) United States Patent
Billeter et al.

(10) Patent No.: US 12,462,210 B2
(45) Date of Patent: Nov. 4, 2025

(54) PERFORMANCE MEASURING SYSTEM MEASURING SUSTAINABLE DEVELOPMENT RELEVANT PROPERTIES OF AN OBJECT, AND METHOD THEREOF

(71) Applicant: Swiss Reinsurance Company Ltd., Zürich (CH)

(72) Inventors: Salomon Rudolf Billeter, Adliswil (CH); Xi Fan, Zürich (CH); Francesca Mancini, Zürich (CH); Alicia Montoya, Zürich (CH)

(73) Assignee: Swiss Reinsurance Company Ltd., Zürich (CH)

(*) Notice: Subject to any disclaimer, the term of this patent is extended or adjusted under 35 U.S.C. 154(b) by 0 days.

(21) Appl. No.: 17/932,194

(22) Filed: Sep. 14, 2022

(65) Prior Publication Data

US 2023/0090136 A1  Mar. 23, 2023

Related U.S. Application Data

(63) Continuation of application No. PCT/EP2022/055860, filed on Mar. 8, 2022.

(51) Int. Cl.
*G06Q 10/0637* (2023.01)
(52) U.S. Cl.
CPC .............. *G06Q 10/06375* (2013.01)

(58) Field of Classification Search
CPC ................................. G06Q 10/06375
See application file for complete search history.

(56) References Cited

PUBLICATIONS

Insurance regulation for sustainable development ; University of Cambridge; Jul. 2015 (Year: 2015).*
Sustainability Risk Management; Deloitte; 2019 (Year: 2019).*
Sustainability risks & opportunities in the insurance industry; Gatzert et el.; 2020 (Year: 2020).*
The (Re)Insurance Industry's Roles in the Integration of Nature-Based Solutions for Prevention in Disaster Risk Reduction-Insights from a European Survey; Marchal et al; Nov. 2019 (Year: 2019).*

* cited by examiner

*Primary Examiner* — Deirdre D Hatcher
(74) *Attorney, Agent, or Firm* — Oblon, McClelland, Maier & Neustadt, L.L.P.

(57) ABSTRACT

Proposed is an automated measuring system for progress monitoring and steering of impacts of a complex system to world environment and ecosystem induced by environmental-human linkages and for quantitative measuring of effects of applied risk-transfer structures to said environmental-human linkages induced by risk-transfer-SDG linkages measuring quantifying distances of progresses toward at least one of a predefined sustainable development goal with and without applying said risk-transfer structures.

11 Claims, 24 Drawing Sheets

| | | |
|---|---|---|
| End poverty in all its forms everywhere | X | |
| End hunger, achieve food security and improved nutrition and promote sustainable agriculture | X | |
| Ensure healthy lives and promote well-being for all at all ages | X | |
| Ensure inclusive and equitable quality education and promote lifelong learning opportunities for all | | X |
| Achieve gender equality and empower all women and girls | X | |
| Ensure availability and sustainable management of water and sanitation for all | | |
| Ensure access to affordable, reliable, sustainable and modern energy for all | | |
| Promote sustained, inclusive and sustainable economic growth, full and productive employment and decent work for all | X | |
| Build resilient infrastructure, promote inclusive and sustainable industrialization and foster innovation | | X |
| Reduce inequality within and among countries | | X |
| Make cities and human settlements inclusive, safe, resilient and sustainable | | X |
| Ensure sustainable consumption and production patterns | | |
| Take urgent action to combat climate change and its impacts | X | |
| Conserve and sustainably use the oceans, seas and marine resources for sustainable development | | |
| Protect, restore and promote sustainable use of terrestrial ecosystems, sustainably manage forests, combat desertification, and halt and reverse land degradation and halt biodiversity loss | | |
| Promote peaceful and inclusive societies for sustainable development, provide access to justice for all and build effective, accountable and inclusive institutions at all levels | | |
| Strengthen the means of implementation and revitalise the global partnership for sustainable development | | X |

Fig. 3

PERFORMANCE MEASURING SYSTEM MEASURING SUSTAINABLE DEVELOPMENT RELEVANT PROPERTIES OF AN OBJECT, AND METHOD THEREOF

CROSS REFERENCE TO RELATED APPLICATIONS

The present application is a continuation application of International Patent Application No. PCT/EP2022/055860, filed Mar. 8, 2022, which is based upon and claims the benefits of priority to Swiss Application No. 00246/21, filed Mar. 8, 2021. The entire contents of all of the above applications are incorporated herein by reference.

FIELD OF THE INVENTION

The present invention relates to performance measuring systems measuring quantifiable environmental-human and/or human-human linkages of an object based on predefined sustainable development relevant properties of objects. The measurements can, for example, be triggered by threshold values of Key-Performance-Indicators (KPI) related to predefined Sustainable Development Goals (SDG) measuring performance of a particular activities in relation to the predefined SDGs. In particular, the invention relates to measuring systems for measurements based on evolving real-world measuring parameters based on appropriate metrics capturing environmental and societal impacts of time-dependent developments. Further, the invention also relates to digital systems using digital replica measurements in the context of the Internet of Things (IoT) and machine learning technologies for measuring quantifiable environmental-human linkages of an object based on predefined sustainable development relevant properties of objects.

BACKGROUND OF THE INVENTION

In many fields of technology, it is often a technical requirement to make measurements and/or predictions regarding the evolving operation or status of real world physical systems, as assets or objects, based on measured parameters and sensory data. Measuring performance of a real-world system in relation to sustainable development is particularly difficult, since the interaction of complex system with the real-world is often complex and multi-dimensional. However, it is a need to have a reliable system for measuring of predefined Sustainable Development Goals (SDGs). SDGs, inter alia, aiming to minimize poverty, preserve the planet's biodiversity and ecosystem and thus ensure prosperity for mankind. SDGs are often differently defined. For example, the United Nations (UN) SDGs can be adopted as reference categorization to generate the sustainable impact of system, business or activities. The UN SDGs comprising a collection of 17 global measures designed to provide a blueprint to achieve a better and more sustainable development. The UN SDGs were set in 2015 and are intended to be achieved by the year 2030 as part of the UN Resolution "The 2030 Agenda".

Based on this background, it is desirable to be able to measure and track sustainable development goals and measuring thresholds of a complex system, as an enterprise or industrial plant. Today, the most prevalent system is the wide spread attempted use of an individual person as human expert tracking based on their individual metrics in spreadsheets and email, presentations and documents to capture their sustainable development goal findings. This technique is prone to errors and misunderstanding and can quickly become inconsistent, complicated, and even unmanageable. Other prior art systems include only software tracking modules covering energy, water, sometimes waste and carbon management. These systems have been less successful due to the limited uptake and adoption of full carbon trading in a geographical region and the limited use as they only cover two to three areas. In addition, there have been attempts by accounting software manufacturers to address this problem by scanning the buying records of a business and attempting to assign a carbon value to an item. At best, the assigned value can only be a guess value to the items carbon value and at worst is simply misleading. These systems offer limited value to the end user and have had limited uptake and appeal. Thus, it is desirable to provide a sustainable development measuring and tracking system and method that overcomes the limitations of current, prior art systems and methods. In particular, there is no prior art system, allowing to measure the impact of applied risk-transfers, e.g. provided by insurance technology or other exposure mitigation measures, techniques, and methods, more particular dedicatedly measuring variations in applied different risk-transfer structures.

Such measurements depend on the complexity and range covered by the environmental-human and/or human-human linkages and the corresponding defined range of sustainable development goals of the complex system or object to be measured. For example, the complexity of such measurements became even more challenging through the movement from the United Nation's (UN) Millennium Development Goals (Mgs), as reference indicators, to the requirements of the newer UN Sustainable Development Goals (SDGs). Prior art systems have intrinsic technical problems providing more holistic measurements and more consistent measurements associated with a broader range of environmental-human linkages to be measured and more complex-interacting systems/objects. It is to be noted that, although both SDGs and MDGs define selected sets performance indicators to measure, the SDG set is based on a profoundly different process than the MDGs. The MDGs had 8 goals and 21 targets, dealing with various performance issues all associated directly or indirectly with the aim to reduce poverty and hunger. The twenty-one targets were each accompanied by one or several predefined performance indicators. These indicators were the measurable benchmarks against which a possible progress of a system was measured. The UN SDGs, by contrast, emerged from the MDGs, which were criticized to not fully parametrizing, capturing and measuring the actual development. To be completer and more holistic, the UN SDGs involved now 17 goals and 169 targets, which intended to be more or less universal (applicable to all kind of systems and geographical regions), integrated and transformative covering the whole sustainability development. The set of SDGs should adopt a much broader scope than the MDGs, attempting to not only end extreme poverty and eradicate hunger but also to foster global prosperity in an economically and environmentally sustainable way. The SDGs were designed to be action oriented, global in nature and universally applicable in order to ensure technically their applicability to all possible systems. Not surprisingly the SDG program by its size and scale has attracted much more technical challenges, since the sheer scope and scale of the SDGs have made technical measurements almost impossible. Measuring, validating and assessing 232 performance indicators is technically not only difficult but also expensive and extremely time consuming. Further, the lack of prioritization has further introduced the problem that in moving from 21 MDG targets to 169 SDG targets there will be a fragmentation of effort and resources regardless the technical possibility of measurement, since the mere measuring does not allow to weight the various factors against each other's. But also from a mere statistical perspective the implications of introduction of the SDGs for the accompanying indicator framework are enormous. Not only have the number of goals and targets increased considerably (the MDGs had 8 goals, 21 targets and 60 indicators whereas the SDGs have 17 goals, 169 targets and 232 indicators), but so also has the complexity of these targets. An example for the complexity of performance measurements are also based on the parametrization to be chosen technically. An example is the target for global macroeconomic stability: Although there is no consensus on what this technically exactly means, it is a technical requirement to agree on a certain dashboard or set of parametrizing indicators for the measurements. To simplify the measurements, some of the prior art systems try an own priorisation by applying a selection to the performance indicators for the measurements. However, such a selection is technically not trivial, since it presumes the knowledge about the impact and correlation of the measured indicators to the measured targets and goals. For example, a selection of indicators can start by a determining a large set of potential indicators from which the most appropriate are selected according to pre-defined and accepted technical methods. The selected (priorized) indicators should, in particular, reflect influence in quantitative terms. The selection of indicators is therefore e.g. supported by empirical studies of the historical influence of the indicator on the desired objective, the historical influence of measures on the indicator, and correlations between the various indicators.

In general terms, there is a strong demand in the technical field to provide a performance measuring tool on the basis of its technical ability to provide an overall measurement and assessment of sustainable development performance, in a way that can be easily interpreted and analyzed. The choice of indicators and of their targets can be considered as two central points for setting up of a technically usable SDGs performance metric. A pivotal element is the identification of the targets, as many objectives laid down by the 17 SDGs (and their related 169 targets) are not defined in quantitative technical terms. Another crucial technical point is how to assess the key requirements for selecting the most appropriate set of SDGs indicators which is technically also challenging, since somehow the underlying parameter correlations and dependencies have to be known. For example, it can be useful that the SDGs indicator set preferably aligns as closely as possible with the targets put forward in the United Nations 2030 Agenda, thus, developing an indicator framework for monitoring and reporting the SDGs performance process globally, acknowledging that different indicators might be appropriate in different contexts. Optimal use of statistical indicators to measure the SDGs is country context-dependent and, in general, there is a trade-off between the range of coverage and comparability on the one hand and detail and availability of measuring parameters on the other hand. A common example is the Eurostat SDGs set of indicators trying to balance comparability across countries with data and measurement quality and appropriateness.

In a straight forward approach, three methods to measure SDGs performance can be imagined, however other more complex methods are also possible. These methods include (i) a simple mean approach, (ii) a distance measuring approach, and (iii) a progress measuring approach.

The simple means method is technically based on constructing a measure of SDG performance by measuring the mean over all indicators at goal level. As such, all indicators are given an equal weight and the equality of weights applies to all measured systems or countries or the like. Thus, no regional adaptions or weightings are used e.g. to set priorities by weight certain indicators more than others. Before measuring the mean, indicators need to be rescaled in order to account for different unit measures. After rescaling all variables, all measured values are expressed relatively, and a given technical unit of measurement does not matter anymore. The aggregation at goal level can be noted as follows:

$$I_{ij}^M = \sum_{k=1}^{N_{ij}} \frac{1}{N_{ij}} \frac{x_{ijk} - \min_{jk}}{\max_{jk} - \min_{jk}}$$

where $N_{ij}$ is the number of indicators for SDG j for which system i has data and $x_{ijk}$ denotes the score for indicator k (within SDG j) for system i (it is worth to be noted already here, that as a preferable embodiment of the present invention, s can be used for SDG and j for mechanism). Subtracting the minimum value across systems for indicator k ($\min_{jk}$), and dividing this difference by the range ($\max_{jk}-\min_{jk}$) results in a rescaled measuring value between 0 and 1. This rescaled measuring value is then aggregated with equal weights over all indicators k within SDG j to obtain a measure of performance for system i. The system can e.g. denote the facilities and activities of an enterprise, or even a complex ensemble as a country. In the technical field, the simple mean approach is e.g. used to construct the Bertelsmann Index (BI) measure, where the construction of the BI comprises three main steps. Using different measurement data sources (WB, OECD, IMF, UN . . . ) the BI results from censoring outliers, rescaling and weighting the different measuring indicators. The resulting index measures the relative performance of a system to all systems included in the measurement. Low, medium and high indicator measuring values are also assigned to develop a dashboard assessing country progress for each indicator.

The distance measure method is an alternative method technically based on measuring SDG performance by a predefined distance measure as e.g. the OECD's distance measure (OECD: Organisation for Economic Co-operation and Development). This approach measures a standardized distance to a specified target for each measured performance indicator. This can e.g. be done by dividing the absolute distance of a measured system to the target and dividing this number by the standard deviation in all systems' performance on the evaluated indicator. Values below 0 (system surpassed the target) are set to 0. As such, the measured relative performance of a system strongly depends on which systems were included to measure the standard deviation. The measuring of the distance fora system i with respect to SDG j can be denoted as follows:

$$I_{ij}^D = \sum_{k=1}^{N_{ij}} \frac{1}{N_{ij}} \max\left(\frac{T_{jk} - x_{ijkl}}{SD_{jk}}, 0\right)$$

where $T_{jk}$ is the target for indicator k in SDG j, $x_{jk}$ is the last available observation t for the system i with respect to indicator k in goal j. In order to obtain positive values by subtracting a system's value and the target for indicator k, all values were transformed such that higher values are preferred. If a country exceeds the target in the latest available year, its distance is set to 0. Once distance measures are obtained for each indicator k, a country's score for SDG j can be computed by calculating the simple average of all distances.

Finally, the progress measure method of SDG performance is another alternative method technically based on the monitoring on the progress towards the SDGs in a predefined context, as e.g. measuring data from the monitoring report by Eurostat in the EU (European Union) context. In a first step, a value is constructed for each system for a time $t_{end}$ assuming normal activities, as e.g. a status based on business-as-usual. The normal activities growth rate can be measured by extracting the first and last observation for each indicator and by linearly interpolating the measured values to predicted end values. The resulting values are then aggregated within goals by feature scaling and equal weighting. The advantages of this approach are twofold. First, many more indicators can be included as no targets are required. Second, the use of contextual measuring data allows an assessment of SDG performance that accounts for the specific context. Formally, this can be written as:

$$I_{ij}^P = \sum_{k=1}^{N_{ij}} \frac{1}{N_{ij}} \frac{x_{ijk}^{t^1} - x_{ijk}^{t^0}}{t^1 - t^0}(t_{end} - t^1) + x_{ijk}^{t^1}$$

where $x_{ijk}^{t^1}$ ($x_{ijk}^{t^0}$) is the latest (first) measurement of system i with respect to indicator k in goal j. The difference between $t_{end}$ and the latest year of measurement ($t^1$) determines the value to be added to the latest measurement $x_{ijk}^{t^1}$ to get the predicted/extrapolated value for $t_{end}$—assuming a linear trend continues. In order to obtain a performance measure at goal level, progress measures were averaged over all indicators after rescaling values between 0 and 1, similar to the aggregation step done for the simple mean and the Bertelsmann Index measure.

To compare the disadvantages of the three prior art methods, the mean values, distance measures and progress measures for all goals can be measured using contextual measurements, e.g. Eurostat measuring data. Rankings can e.g. be constructed based on the Bertelsmann Index by measuring data for each goal and each system. In contrast, instead of the distance measure if it is not available contextually for the selected systems, the methodology can also be applied to contextual indicators with identified targets. In addition, the average score can be measured using the same subset of indicators with targets. This results in five SDGs measures which are generated, the corresponding number of indicators, the data measuring sources/systems, and the methods used. All measures of SDGs performance can be obtained using a statistical method and a selected SDGs set of indicators. For different SDGs, there may be positive or negative correlations between two of them. This implies that the ranking can change completely for these goals when a subset of the available indicators is used. As such, the existing methods have the technical disadvantage that all available indicators should be used to evade the above mentioned problem, however this is technically difficult. Choosing the simple mean or the distance measure to aggregate performance at goal level does significantly affect relative rankings. Most rank order correlations are close to 1 and even equal to 1. Finally, as indicated by FIG. 2, there is a discrepancy between rankings resulting from the progress measure and others. This can be caused by the different set of indicators used when constructing the distance measure and the progress measure. When comparing only the methods while holding the number of indicators constant (i.e. "mean" and "p"), there is an overall strong correlation between rankings. Again, the choice of indicators is of obvious importance for the prior art methods. In addition, methodological choices can result in major implications for individual systems in terms of their measured SDG ranking. Thus, the prior art systems do not produce reproducible measurements, which should be overcome by a new reliable measuring system. As such, for prior art system, it is recommendable to use all available indicators in order to produce reliable results, which makes the measurement time consuming and complex.

Since prior art system critically depend in the selection of the measuring indicators, such a selection of indicators should start by determining a large set of potential indicators from which the most appropriate are selected according to defined and accepted methods. The selected, main indicators should, inter alia, reflect policy influence in quantitative terms. The selection of main indicators should e.g. be supported by measurements or empirical analysis of the historical influence of the indicator on the desired objective, the historical influence of policy measures on the indicator, and correlations between the various indicators. Obviously, there may be situations in which all indicators will improve and these can easily be identified as being instances of exemplary sustainable development. However, in most specific cases, the effects of policy measures on certain goals are contradictory (e.g., job creation versus environmental conservation in certain sectors) and therefore it has to be taken account of their substitution potential—which may be limited for ecological or technical reasons or due to the fact that social preferences only allow limited substitution. Varying degrees of substitution potential can e.g. be seen in the distinction between weak and strong sustainability.

Another problem, and a most significant one, is that prior art systems are not able to provide appropriate automation regarding the quantified contribution of risk-transfer structures to specific SDGs and their targets. Regarding the measurement of a contribution of risk-transfer structures to sustainable development of a system or object, the seventeen above-discussed SDGs can, for example, form the basis of a possible quantification and measurement. Such a technical solution should not only be able to quantify but also to identify which goals are significantly correlated to an applied risk-transfer structure and its associated risk protection mechanism contributing or supporting the goals' advances or achievements. Furthermore, a technical solution should provide an automated, concrete measuring approach based on technical measuring means assessing risk-transfer and its contribution to a specific SDG and the development results achieved.

To include risk-transfer mechanisms to mitigate against the impact of occurring loss/damage events, as a variety of risks (life, health, asset) and extreme weather, climate and agricultural hazards, this encapsulates both risk-transfer mechanisms/products provided by risk-transfer systems, as primary insurance systems or secondary insurance systems (reinsurance systems), insurance mutuals, or intermediaries, such as brokers. Apart from the autonomously operated risk-transfer industrial systems, risk-transfer structures affecting SDGs may also cover government-provided risk mitigation mechanisms, such as agricultural or climate risk insurance, subsidized health and accident structures, or development partner ships with the risk-transfer industry. It is clear that applying risk-transfer structures can plays a crucial role as a tool to achieve development goals including goals related to financial sector development, social protection, food security, agricultural, rural and urban development, gender equality and women's economic empowerment, micro, small and medium enterprise (MSME) development; and climate change. Thus, there is a great need for technical and automated solutions allowing to generate and provide appropriate risk-transfer structures/products and to measure and quantify their impact by implementation for the SDGs.

In the context of the contribution by risk-transfer structure, the protection of people and assets is a key component of sustainable development. In the absence of any formal protection mechanism, when faced by occurring damage/loss-events/shocks, e.g. emerging natural hazards as earthquakes, hurricanes, storms, floods, or droughts etc., low-income people typically rely for recovery solely on informal coping mechanisms, essentially self-aligning/mitigating of aftermaths of impacting events, such as asking family members and friends for help, taking loans, selling assets, not investing in education, or depleting savings. As such, industrial risk-transfer as a risk mitigation strategy allows low-income individuals, MSMEs, middle-income individuals as well as governments to protect and build on their existing assets. Without the application of effective risk-transfer structures, it is unlikely that sustainable development is truly achievable.

Although risk-transfer structures are only explicitly mentioned once in the UN SDGs, they are implicitly technically relevant for the achievement of multiple goals. Applying risk-transfer structures is only mentioned in the SDGs in relation to disaster risk mitigation, while the technical concept of risk-transfer is itself only noted with respect to disaster risk several times. Insurance technology as a risk protection mechanism can affect many of the SDGs, directly or indirectly. Risk-transfer structures will be critical to the achievement of six of the seventeen SDGs, and important to the completion of five other SDGs. This invention focuses on those goals which directly rely on risk-transfer as a risk protection mechanism to achieve the SDGs. However, it has to be distinguished between those SDGs where risk-transfer structures can make a direct contribution at a primary level, and those where it indirectly yet substantially contributes at a secondary level. The difference between the two levels is the depth of the contribution of the risk-transfer to the specific SDGs. FIG. 3 lists the SDGs denoting those 6 SDGs that can be directly enhanced and impacted by applying appropriate risk-transfer structures. It also marks the five SDGs where risk-transfer structures can significantly contribute at a secondary level. Regarding the 6 SDGs which are contributed and impacted directly by the application of risk-transfer structures, the following summarizes the impact:

SDG 1 (No Poverty): (i) Risk-transfer structures provide a safety net for those covered by the structures, preventing people from falling (back) into poverty after experiencing a shock; (ii) Risk-transfer structures are able to provide an economic protection mechanism for all; and (iii) Risk-transfer structures sustains other development efforts.

SDG 2 (Zero Hunger): (i) Risk-transfer structures are able to actuate locally driven and sustainable food production by opening lending opportunities where there were none before, and by encouraging investment in enhanced agricultural practices; (ii) Applying risk-transfer structures improves household food security by stabilizing the household's financial situation after a shock; and (iii) Risk-transfer structures help people to respond and adapt to natural catastrophes, which otherwise can plunge them into greater poverty.

SDG 3 (Good Health and Well-Being): (i) Applying risk-transfer structures and social protection can play complementary roles to cover a range of household health care costs; (ii) Risk-transfer structures improve health-care seeking behavior.

SDG 5: (i) There are gender differences in risks faced by women and men; (ii) Risk-transfer structures generate protection for women working in the informal sector who often fall outside the reach of public social protection schemes; (iii) Risk-transfer structures are able to provide protection for women against the devastating effects of gender-related reproductive health risks; (iv) Risk-transfer structures are able to provide protection for women from the financial impact of losing family members, helping women to retain their homes, sustain their businesses, continue education of their children, and generally maintain the financial stability of their household.

SDG 8 (Decent Work And Economic Growth): (i) Risk-transfer structures are able to provide protection for assets, thereby unlocking loans and other funds for investments by MSMEs; (ii) Risk-transfer structures free MSME's private funds for productive investment; (iii) Risk-transfer structures are able to support the development of MSMEs by protecting them from losses due to risks related to business, natural disasters or other catastrophes; and (iv) Risk-transfer structures are able to support avoidance of child labor related risk financing.

SDG 13 (Climate Action): (i) Applying risk-transfer structures provides mitigation of the effects of extreme weather events, thereby strengthening climate change resilience; (ii) Risk-transfer structures are able to complement and strengthen other climate change coping efforts; and (iii) Catastrophe risk-transfer structures are able to protect a variety of stakeholders, from companies and infrastructure to the most vulnerable.

Where the application of risk-transfer structures is a primary level contributor to SDGs, its effect on the respective SDG is directly correlated and measurable, and the impact of measures in this area can be directly parameterized. Thus, risk-transfer mechanisms actuate and underpin possible achievement of the six, directly correlated SDGs at least by providing some form of cover and risk protection to low-income individuals.

The UN SDG 1 is about ending poverty which may be the most important UN SDG, since it is under-pinned by all other UN SDG goals. By attempting to end poverty, many of the issues addressed by the other SDGs (such as those related to health, women's empowerment, infrastructure or climate change) will be affected by this goal as they are ultimately based on severe poverty among large proportions of the population, especially in developing countries. Risk-transfer structures provides a safety net for those being covered, preventing families from falling (back) into poverty after experiencing for example a natural catastrophic shock induced or triggered by the occurrence of a natural catastrophic event as earthquakes, storms, hurricanes, droughts etc. It is obvious that when a shock occurs, families without cover by an applied risk-transfer structures often liquidate their savings, take gifts and loans from friends and family, borrow at high interest rates, reduce family consumption, disinvest in education and sometimes must sell productive assets at a discount; all of these coping strategies reduce their resilience to future shocks. Through its intrinsic function, applying risk-transfer structures reduces the vulnerability of people, and increases the resilience of the poor and those in vulnerable situations and reduce their exposure and vulnerability to climate-related extreme events and other economic, social and environmental shocks and disasters. Without the possibility of applying risk-transfer structures, low- and even middle-income people can fall (back) into poverty once a severe shock strikes. Risk-transfer helps prevent people from becoming poor due to an un-foreseen event leading to economic, financial and/or social hardship. It allows families to avoid the additional hardship of turning to other coping strategies that may create an ongoing and often long-term burden, such as long-term borrowing or selling the business. Extremely poor people, i.e. those living on less than USD 1.9 a day, also need the possibility of applying risk-transfer structures. For severely poor families, this buffer may have to come from the government through the provision of social protection measures. But for those people that have some cash income and can therefore afford small premiums, risk-transfer structures provides a buffer from the vicious cycle of poverty and thus can play an important role in building their resilience. Risk-transfer structures designed especially for low-income people is often referred as "microinsurance". Making risk-transfer more inclusive by providing microinsurance and a greater variety of risk-transfer structures/products (for example, micro pensions, agricultural insurance, and climate risk insurance) is a core strategy for building working safety nets for the poor and even the middle-income population. Microinsurance itself is a poverty-oriented structure that complements other monetary safety structures such as payments, savings and loans. If appropriately designed, microinsurance structures can help to ensure that all men and women, in particular the poor and the vulnerable, have equal rights to economic resources. The application of risk-transfer structures sustains other development efforts. After many years of financial sector development aimed at the low-income market, it is clear that a combination of inputs is required to lift people out of poverty, among them, stable employment, training, access to markets and finance, and economic growth in general. Although each of these has a role in risk mitigation, good value risk-transfer structures are what will sustain such development efforts in case of a crisis. Without risk-transfer cover and support, one single crisis in the family, business, community or region such as a death, an accident, or a drought can constrain an individual's economic improvement, leading to severe financial consequences and devastating the development efforts of many years, sometimes for the entire family, i.e. leading away from the SDG. With this, both individual as well as communal (governments, donors and communities) development achievements can be impeded The UN SDG 2 is about ending hunger (zero hunger). Hunger is one of the greatest constraints to development. It is estimated that around 800 million people globally do not have enough food to live healthy lives. The economic and social consequences of hunger are obvious. Generally, hunger is directly related to both weak food security in urban areas and unsustainable and changing agricultural production patterns. Applying risk-transfer structures can foster locally driven and sustainable food production by opening lending opportunities where there were none before, and by encouraging investment in enhanced agricultural practices. The support of agricultural productivity is a key element of eradicating hunger. Many development efforts aiming to eradicate hunger are therefore focused on how to support the agricultural sector in ensuring food security. Crop risk poses a very serious threat for low-income farming households. Risk events deplete the farmers' food stores, and the likelihood of crop risk events makes lenders more reluctant to lend for investments in agriculture and livestock production. Risk-transfer, especially agricultural risk-transfer, is able to improve the situation but is currently not easily available to low-income farmers. Over time, specific risk-transfer structures can contribute to strengthening the agricultural sector by providing better opportunities for farmers to manage their risks while increasing and diversifying their investments into their agricultural activities, positively impacting production, sustainability, food security, and employment. Without properly applied risk-transfer structures to mitigate these risks, it is unlikely that SDG 2 can be achieved. Applied risk-transfer structures improves household food security by stabilizing the household's financial situation after a shock. For many people, the fall back into severe poverty is often a direct result of the lack of social or private protection mechanisms. Hunger and malnutrition are often the result of a shock. Segments of the population living immediately above the poverty line are vulnerable to hunger, for example, as a consequence of the death of a family member on whose income they relied. Insurance mitigates the effects of shocks such as a death in the family, and indirectly helps to eradicate hunger among low-income groups. Insurance helps people to respond and adapt to natural catastrophes, which otherwise can plunge them into greater poverty. It is to be noted, that disasters disproportionately affect the poorest communities and significantly increase hunger and malnutrition. Appropriately applied risk-transfer structures can mitigate hunger and enhance the resilience of vulnerable people to confront the nutritional effects of natural disasters and climate change. ! is insurance can be solely provided by the private sector or the government, or jointly through a public-private partner-ship.

The UN SDG 3 is about good health and well-being. Poor health hinders social and economic development. In the absence of effective universal health coverage schemes in developing countries and emerging economies, low-income populations struggle to pay for their health care expenses. Even when there is health care financing available, there are typically gaps in coverage which need to be filled individually in order to retain resilience to health-related shocks. In the absence of effective risk-transfer structures, health care costs often force those affected and their families into deeper poverty. Risk-transfer and social protection can play complementary roles to cover a range of household health care costs. Until there is true universal coverage in a country, public private partnerships are needed to provide the range of health cover that low-income families require, within a price range that they can afford. Health care financing for the population by a social protection system can be complemented by applying risk-transfer structures which cover costs excluded from the social protection health care plan. Microinsurance structures, for example, can cover smaller types of these health care costs, such as the inpatient expenses incurred resulting from certain critical illnesses, or a daily cash benefit during a hospitalization intended to cover incidental expenses or lost income, or smaller slices of health care costs such as gynecological cover. Risk-transfer improves health-care seeking behavior. People with health insurance have been found to be more likely to have health checks and seek treatment more often and earlier. This generates healthier lives and well-being.

The UN SDG 5 is based on measuring gender equality. There are gender differences in risks faced by women and men. These differences are driven by both biological and socio-cultural factors. Women may face different risks to men due to pregnancy and childbirth, as well as associated biological health risks during different stages of their life cycle. Women can also face greater vulnerability to a range of risks compared to men based on the socially constructed gender roles. Cultural factors related to the role of women mean that they shoulder greater responsibility for domestic chores and caring for children and elderly relatives. Generally, this work is unpaid and in many instances, it is in addition to paid work-related responsibilities or restricts more productive work and the accumulation of assets to provide women with a safety net. In some countries, these socio-cultural barriers to gender equality and women's empowerment are enshrined into law, which can restrict women's legal participation in society and the economy. For instance, women may require a male relative's permission and signature to obtain identification documents, a prerequisite to accessing health care or education. At the same time, women often outlive their male spouse, whom they may economically depend on. Thus upon the death of their husband, they can be left without income or assets to provide them with protection in the face of risk events. In this context and possibly because of these risks and challenges, women are generally more open to risk mitigation and protection than men. Risk-transfer structures can help women reduce their financial reliance on others, and in turn, this independence can contribute towards their economic empowerment. As such, there is an emerging belief in risk-transfer systems to target women as a customer segment and cover gender-specific risks for women and their families as beneficiaries. Risk-transfer offers protection for women working in the informal sector who often fall outside the reach of public social protection schemes. As unpaid family caregivers, self-employed vendors or informally paid day laborers, poor women are generally excluded from public social protection schemes. In the absence of government protection, microinsurance and micro pensions provided by the private sector or through public private partner-ships can provide important and affordable safety nets. Cover by risk-transfer structures protect women against the devastating effects of gender-related reproductive health risks. Cover by risk-transfer structures protect women from the financial impact of losing family members, helping women to retain their homes, sustain their businesses, continue education of their children, and generally maintain the financial stability of their household. Risk-transfer structures can protect women financially if they lose family members or outlive their husband, which is more often the case as women statistically live longer than men. The loss of a husband can negatively affect a woman's welfare because of the lost income and possibly high expenses for the funeral, as well as social norms which may hinder the ability of a widow to equally participate in society. Applying risk-transfer structures can help women to cope with financial shocks and thereby avoid resorting to other coping strategies such as taking children out of school or borrowing money, which can have serious implications. Without risk-transfer, the costs arising from a risk event are often disproportionately shouldered by women and for many years. At these critical life events, applied risk-transfer can economically empower women.

The UN SDG 8 is about decent work and economic growth. To reach inclusive and sustainable economic growth and employment, it is necessary to develop an enabling environment for enterprises of different sizes. the missing middle is a term used in developing countries, which describes an economic environment with some large enterprises and many small ones. Medium-sized enterprises are lacking in such markets. Hence, small enterprises need support to scale, while medium-sized enterprises require support to grow into larger sized enterprises and obtain external financing to invest in machinery, perform marketing, adopt environmental and social standards, train personnel etc. Many micro- and small-enterprises are found in emerging markets and significantly contribute to employment generation and the global economy. The risk-transfer sector has been innovating to respond to their market potential, realizing the latent financing demand of this segment including for risk-transfer. Risk-transfer structures are able to protect assets, thereby unlocking loans and other funds for investments by MSMEs. Risk-transfer addresses the needs of MSMEs by providing a risk transfer mechanism, thereby freeing funds to allow them to invest in their businesses. Productivity generally depends on the potential to innovate and expand, which often depends on leveraging external funding. By supporting their investment capacities, risk-transfer structures are able to support leverage productivity gains. Additionally, it helps securing investment in premises, machinery and other productive assets. Further, it facilitates the securing of loans for such investments, as it allows the entrepreneur to prove that the assets are protected. Therefore, banks are more willing to lend to MSMEs with an applied cover by risk-transfer structures. Applying risk-transfer structures allows to free MSME's private funds for productive investment. Allowing MSMEs to pay for risk protection in small instalments, risk-transfer enables MSMEs to re-allocate funds they would have otherwise needed to reserve for potential future shock events towards investment in better technologies, product innovation, and ultimately income generating activities. Applying risk-transfer structures supports the development of MSMEs by protecting them from losses due to risks related to business, natural disasters or other catastrophes. Applied risk-transfer sustains business activities after a natural disaster or other catastrophic event. Self-employed and low-income people have very limited abilities to develop and maintain the financial buffer needed to bring a business back after a shock. Risk-transfer provides the funds to rebuild their businesses more rapidly. Risk-transfer structures can also help to avoid child labor related risk financing. Forced labor is economically-based and often the result of the family facing the disastrous effects of a shock such as the death of a family member who was the breadwinner. Indeed, in some cultures, indenturing children or forcing them to work for wages is a risk management strategy for those at or below the poverty line. In this way, applying risk-transfer structures can be a much better risk management tool for these families. Therefore, risk-transfer can play an important role in preventing the poor deploying their children as an economic strategy for survival.

Finally, the UN SDG 8 is about urgent action to combat climate change and its impacts. Due to the advance of climate change, natural disasters are expected to occur more frequently in future. Climate change threatens the development efforts of entire regions, negatively affecting families, businesses, communities and entire countries. Developing countries are likely to be the most affected. Climate change induces negative effects which can already be observed globally, such as the rise of the sea-level due to melting polar caps; the desertification in many parts of the world due to a lack of rain; ocean acidification due to increased carbon emissions; and glacial retreat due to a rise of the average global temperature. Such changes have an especially harsh impact on the low-income populations of developing countries. This is because they often live in the most disaster-prone areas, e.g. their living places might be located near the coast, in drought-prone areas, or on hillsides. In many cases, climate change adaptation, such as in Belize where coastal fishermen were moved inland after hurricane Hattie, is necessary in order to mitigate the negative effects. However, adaptation measures might prove difficult, ineffective, costly and lengthy, and hence, are not always possible. Furthermore, adaptation can only partly mitigate the effects of natural catastrophes. Applying risk-transfer structures mitigates the effects of extreme weather events, thereby strengthening climate change resilience. The negative effects of climate change develop over a long period and thus they are not transferrable as such. However, extreme weather events, which will rise in number and severity due to climate change, can be covered by appropriately applied risk-transfer structures. Risk-transfer comes into play as a complementary measure covering the residual risk that cannot be mitigated effectively by adaptation measures. On a large scale, even governments can apply risk-transfer structures, e.g. to protect their infra-structure against weather extremes, disasters and natural catastrophes, to reduce inequality to their neighboring countries. Many risk-transfer structures directed towards mitigating the negative financial consequences of disasters and natural catastrophes (often induced by climate change) for the population are focusing on the agricultural sector because weather fluctuations are a major risk factor for agricultural productivity. Risk-transfer complements and strengthens other climate change coping efforts, such as awareness-raising measures and improving human and institutional capacity on climate change mitigation, adaptation, impact reduction and early warning systems. Direct and indirect risk-transfer solutions are specific coping measures to climate change and should be included in national climate change plans accordingly. Risk-transfer structures are able to improves both human and institutional capacities to reduce the impacts of climate change. Families, MSMEs and other companies, public institutions and governments, all can rely on the applicability of risk-transfer structures when climate-related disaster strikes. Weather data and early warning systems can complement risk-transfer and help to improve the feasibility of the insurance and the preparedness of those affected. Catastrophe risk-transfer structures protects a variety of stakeholders, from companies and infrastructure to the most vulnerable. Catastrophe risk-transfer is provided primarily through index-based risk-transfer structures, where claim payouts are triggered by a predetermined index, e.g. wind speed, volume of flood waters, level of drought, and other calamity triggers, which are all potentially impacted by climate change. To date, these risk-transfer structures have generally been limited in their effectiveness and ability to reach scale.

FIG. 5 shows applying risk-transfer structures as a secondary level contributor to five SDGs Where risk-transfer is a secondary level contributor to insurance, the relevance of risk-transfer and its effect on the respective SDG is indirect and less obvious than to the primary level SDGs mentioned above. However, applying risk-transfer structures is still relevant at least to the 5 SDGs shown in FIG. 5. SDG 4 (Quality Education) is about ensure inclusive and equitable quality education and promote lifelong learning opportunities for all. Applying risk-transfer structures can help families maintain access to education. Once a shock happens to the family or business, poor families can often no longer afford to invest in the education of their children. A life risk-transfer structure or another form of risk-transfer cover can help to sustain the cash-flow for the family and ensure that children's education is not impacted as a coping strategy. Some risk-transfer structures are providing an additional educational savings component, recognizing the demand of low-income populations to have funds available to pay for children's education. SDG 9 is about building resilient infrastructure, promoting inclusive and sustainable industrialization and fostering innovation. Applying risk-transfer structures protects investments. This is the case for both small and large terms, and for investments of governments. This also increases the willingness of banks to lend to terms, and risk-transfer can help foster innovation through covers that limit the risk of innovation. SDG 10 is about reducing inequality within and among countries. Available risk-transfer structures are able to complement government social protection schemes. Governments are trying to reduce societal inequalities by providing social protection for the poorest of the poor. Meanwhile, microinsurance targets low-income families and protects those who otherwise would not have access to any formal protection. Risk-transfer can help mitigate the development differences of a group of countries as this is the case in large multinational risk-transfer schemes, as discussed above in SDG 13. When a region is hit by disasters, countries receive pay-outs relative to the damage they experienced. With those funds, they are able to rebuild their infrastructure. SDG 11 is about make cities and human settlements inclusive, safe, resilient and sustainable. Applying risk-transfer structures makes human settlements more resilient. Property covers help to retain investments of individuals, businesses, local and national governments. Economic disparities, which often lead to safety concerns, can be exacerbated by a lack of insurance pushing people further into poverty. Effective resilience requires some external risk diversification which is a core reason for risk-transfer systems. Finally, SDG 17 is about strengthening the means of implementation and revitalize the global partnership for sustainable development. The positioning of risk-transfer structures within the global development is important. This involves integrating the applicability of risk-transfer structures within stakeholder engagement and profiling best practices during engagement in the global partnership for sustainable development.

To measure the sustainability of an object or a system, it requires a huge measurement of data and can only be approximated as it is technically not possible to measure all the dimensions of sustainability simultaneously. Among the many frameworks for measuring sustainability, three pillars approach also known as triple bottom line (TBL) approach is the most basic one. FIGS. 6 and 7 show another approach called Circles of Sustainability Development (CSD) framework providing the linking the key elements that influence environmental sustainability and human well-being. CSD is derived from the TBL-approach. The CSD is a possibility to identify the key measuring factors. It presents an assessment of four interdependent boundary domains: environment and ecology, social and cultural, Economics, and Governance and Policy. This approach can be applied in different systems, regions and scales. Thus, the multi-dimensional approach CSD assesses sustainability using the four dimensions of ecology, economics, politics and culture. Each of the four major domains can e.g. be further divided into seven subdomains as shown in the FIG. 5. Other subdomains are also possible as shown in FIG. 6. In order to examine sustainability of each subdomain a nine point scale has been introduced in FIG. 5, where lower point reflects critical sustainability and highest point reflects vibrant sustainability. The major difference between the triple bottom line (TBL) approach and the circles of sustainability approach is the division of social aspects into two weighted parameters of politics and culture.

SUMMARY OF THE INVENTION

It is an object of the invention to provide a reliable technical measuring system for measuring of environmental-human linkages of a complex object or system in relation to at least one predefined Sustainable Development Goals (SDGs). As possible goals, for example, the United Nations (UN) Sustainable Development Goals (SDGs) can be adopted as reference categorization and quantification of sustainable impacts, i.e. of environmental-human linkages. However, the measuring system should also be able to adopt differently defined SDGs. In particular, the measuring system should be able to measure, automatically monitor, track and/or report impacts on predefined sustainable development goals, e.g. by applied appropriate measuring thresholds associated with measuring parameters contextually measured for the complex system or object, such as an enterprise or industrial plant or environmental interacting device or the like. The measuring system should allow to provide for each monitored and measured system or object prioritization indicators measured by mutual weighting each indicator against each other. Further, it should allow to take into account possible correlation introduce ed by the selection of the measured indicators. Further, the measuring system should allow for systematic capturing, measuring, quantifying, and forward-looking generating of the impact of risk-transfer structures and accumulation risk-transfer measures to the physical real-world complex system or object based on measured physical measuring parameter values and data. Further, the system should be able to connect directly to the core flow of data of the present digital society e.g. using Internet of Things, smart system, and industry 4.0 technologies, etc.) by providing a new technology for automated measurements of the discussed environmental-human linkages of a complex object or system in relation to at least one predefined Sustainable Development Goals (SDGs). The invention should in particular allow for a normalization of the measured factors and indicators. Further, the invention should be easily integratable in other processes, productions chains and measuring systems. Finally, the invention should be enabled to use data and measuring parameter values from multiple heterogeneous data sources, inter alia from IoT sensory. The probability measures and risk forecasts should allow to capture various device and environmental structures, providing a precise and reproducible measuring of the relevant factors, and allowing to optimize associated risk-transfer structures.

According to the present invention, these objects are achieved particularly through the features of the independent claims. In addition, further advantageous embodiments follow from the dependent claims and the description.

According to the present invention, the abovementioned objects are particularly achieved in that the automated monitoring system steers progresses and measures possible effects of one or more risk-transfer structures to a monitored complex system by quantified distance progress measurements toward at least one predefined sustainable development goal (SDG) with and without applying said risk-transfer structures, wherein the monitoring system captures parameter indicating (i) a portfolio and/or policy classification of applied risk-transfer structures by line of business and/or region, (ii) one or more portfolio volumes by policy count and at least one other volume measure, and (iii) a quantification of SDG-relevant properties of each portfolio, wherein the monitoring system quantifies the portfolios and policies of applied risk-transfer structures by classifying the risk-transfer structure and quantifying the risk-transfer volume and the volumes of the actions and/or operations of the monitored complex system, wherein the monitoring system monitors transmission mechanisms to a SDG impact by quantifying SDG-relevant properties of the monitored complex system, the properties being represented by a parametrization each capturing a transmission mechanism from the risk-transfer operation to the SDG impact, and the transmission mechanisms consisting of three main parts: (i) a transmission mechanism cause capturing the impact of the complex system on a specific indicator, (ii) a transmission rate represented by a measuring value linking the cause of the transmission mechanism to the relevant activity/operation volume of the complex system, and (iii) a transmitted measuring value providing the relevant complex system's volume as complex system's volume times transmission rate for an indicator scaled by a risk-transfer allocation, wherein parametrizing levers are generated by the monitoring system capturing the mechanisms to SDG impact as different channels of transmission, wherein for each policy and/or portfolio a default value is determined from the classification, and wherein the default values are correspondingly adjusted, wherein the monitoring system quantifies the impact of the complex system on selected SDG indicators, wherein a lever-specific volume is applied to an indicator intensity of the complex system, and an underlying impact is attributed to a risk-transfer coverage, wherein the monitoring system compares, for indicator conversion and scoring, the monitored indicators to reference values to generate relative measures and converting them to a score metric, and wherein the monitoring system aggregates the indicators and scores across portfolios and/or policies and aggregating scores across SDGs and across portfolios and/or policies, the scores being combined into an overall score for steering and overall optimization. The transmission rate can e.g. consist either of one or more fractions of the complex system's volume which are homogeneous and relevant for a specific indicator and type of fraction or of a measuring value quantifying the quality of the complex system as a type of custom. The generation of the transmission rates can e.g. be provided in the step of monitoring the transmission mechanisms and is either integrated into the monitoring system or is not integrated into the monitoring system. The at least one other volume measure can e.g. comprise at least one or more defined premium monetary parameters.

BRIEF DESCRIPTION OF THE DRAWINGS

The present invention will be explained in more detail below relying on examples and with reference to these drawings in which:

FIG. 3 shows a diagram illustrating schematically the difference between those SDGs where insurance make a directly measurable contribution at a primary level (bold in FIG. 3), and those where it indirectly yet substantially and measurably contributes at a secondary level. Applying supporting risk-transfer structures as a risk protection mechanism can support many of the SDGs, some directly and others indirectly. Applying risk-transfer structures is critical to the achievement of six of the seventeen SDGs, and important to the completion of five other SDGs. For the inventive system, the focus is on applying those goals which directly correlate with the application of risk-transfer structures as a risk protection mechanism to align an object/system closer to selected SDGs. The difference between the two levels (direct/indirect contribution) is the depth of the contribution of insurance to the specific SDGs. FIG. 3 lists the SDGs and marks those six SDGs that can be directly and necessarily facilitated and accessed through the application of appropriate risk-transfer structures. FIG. 3 also highlights the five SDGs where risk-transfer structures can be measured to significantly contribute at a secondary level. It is to be noted that the present invention allows to measure on the more granular level of the 169 sustainable development target indicators or measures instead of measuring on the 17 aggregated sustainable development goal (SDG) indicators or measures.

DETAILED DESCRIPTION OF THE PREFERRED EMBODIMENTS

Figure 1:
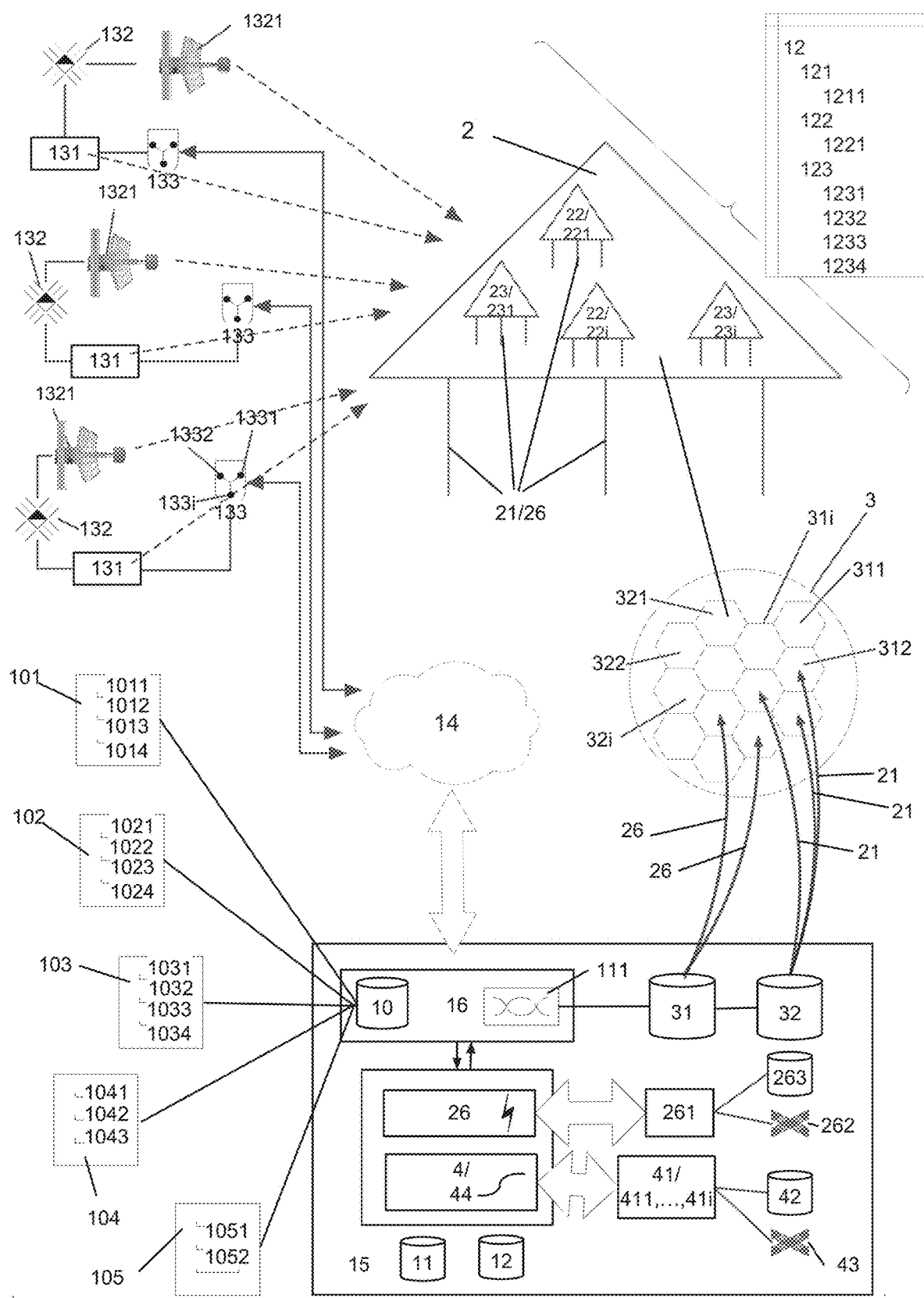
FIG. 1 shows a block diagram, schematically illustrating.
Figure 2:
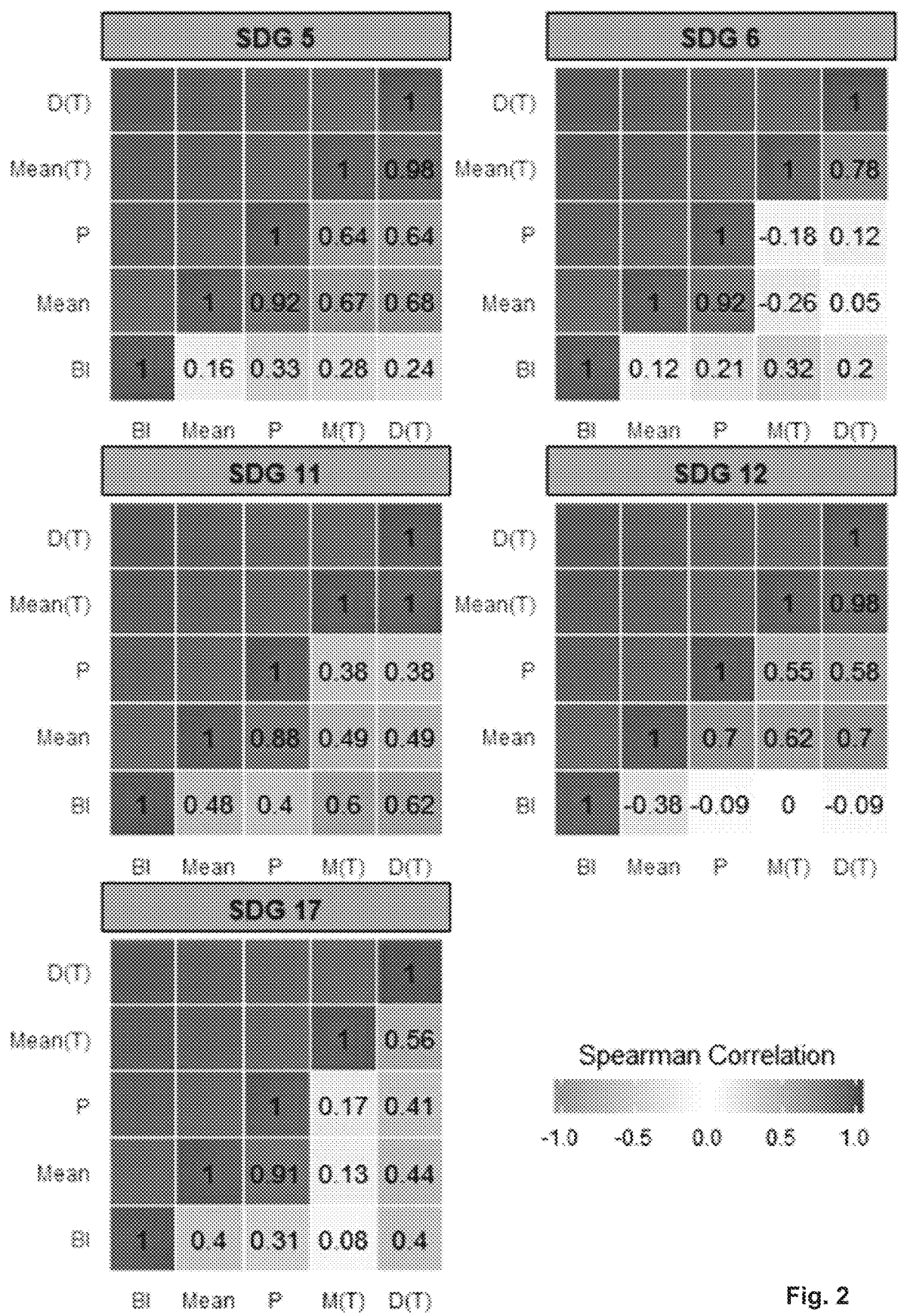
FIG. 2 shows diagrams illustrating schematically exemplary correlations for different combinations of SDG measures, obtained using different aggregated indicators and methodologies: "BI" (Bertelsmann Index), "Mean" (Simple mean of all indicators), "P" (progress measure using $t_{end}$ predictions for all contextual indicators), "Mean (T)" (Simple mean using contextual indicators where targets can be identified), "D (T)" (Distance measure using contextual indicators where targets can be identified).
Figure 4:
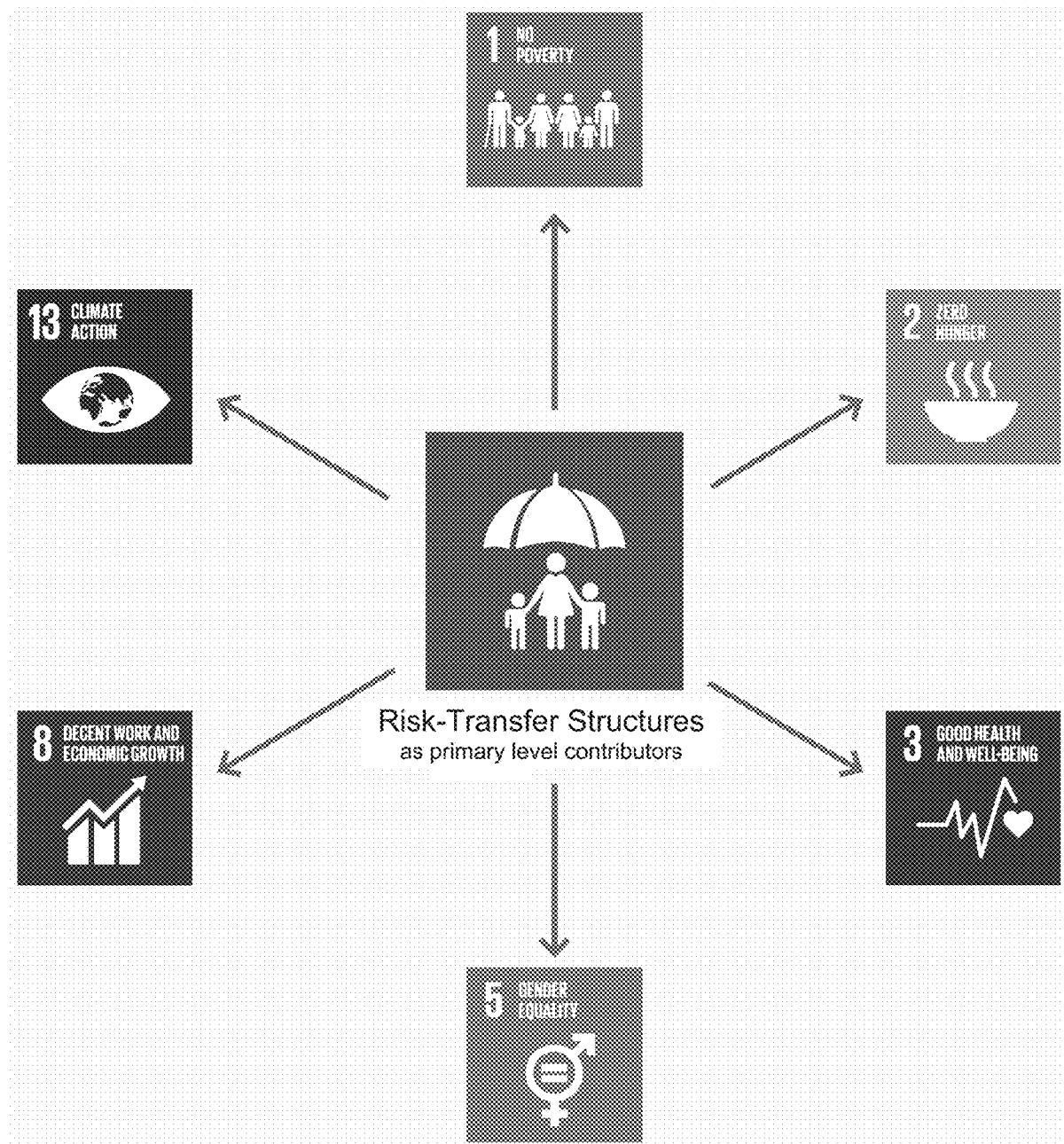
FIG. 4 shows a block diagram illustrating schematically where the application of risk-transfer structures is a primary level contributor to SDGs. For those 6 SDGs, their effects on the respective SDG is directly correlated and measurable, and the impact of measures in this area can be directly parameterized. Thus, risk-transfer mechanisms actuate and underpin possible achievement of the six, directly correlated SDGs.
Figure 5:
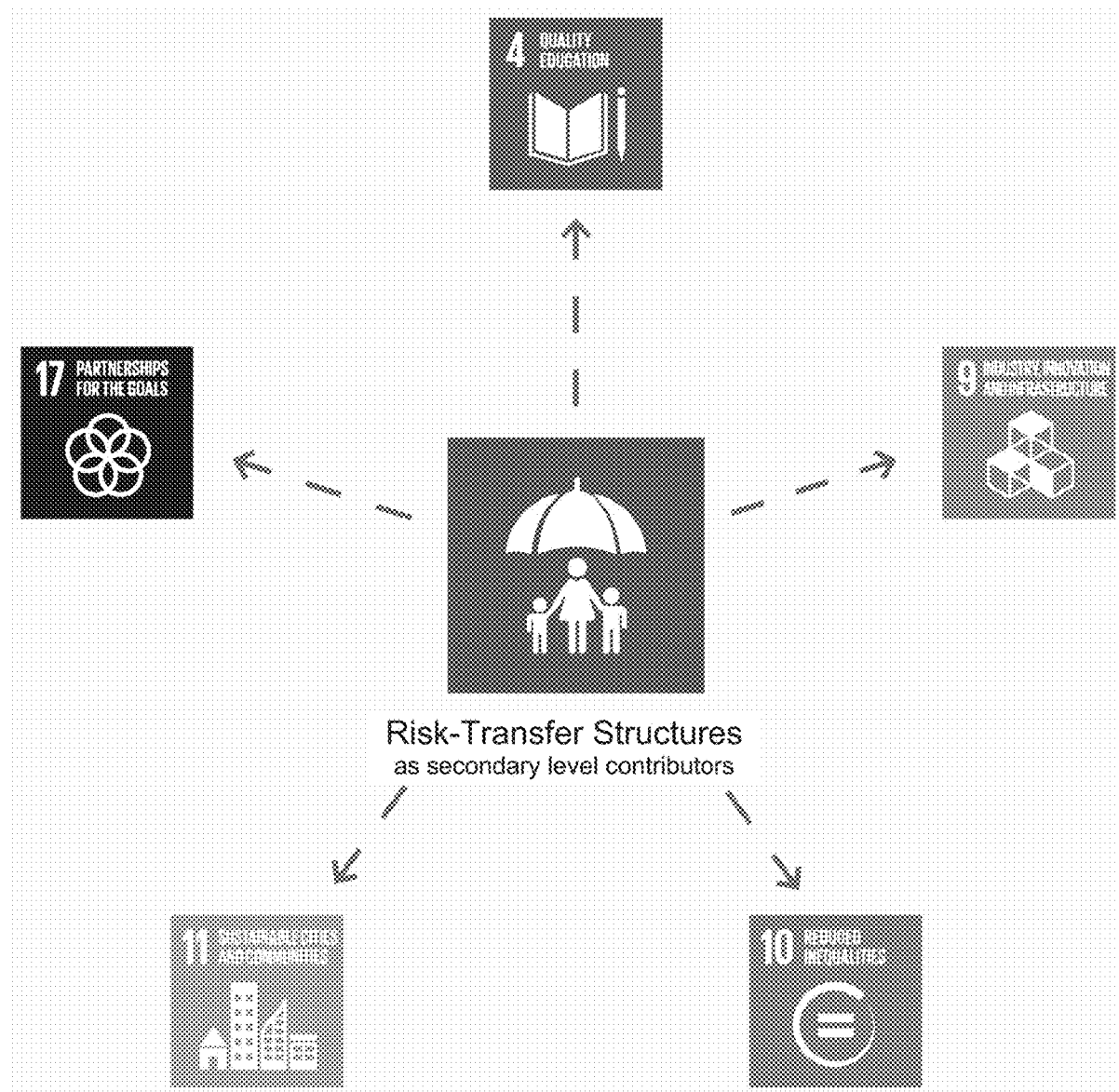
FIG. 5 shows a block diagram illustrating schematically applying risk-transfer structures as a secondary level contributor to five SDGs Where risk-transfer is a secondary level contributor to insurance, the relevance of risk-transfer and its effect on the respective SDG is indirect and less obvious than to the primary level SDGs mentioned above. However, applying risk-transfer structures is still relevant at least to the 5 SDGs shown in FIG. 5.
Figure 6:
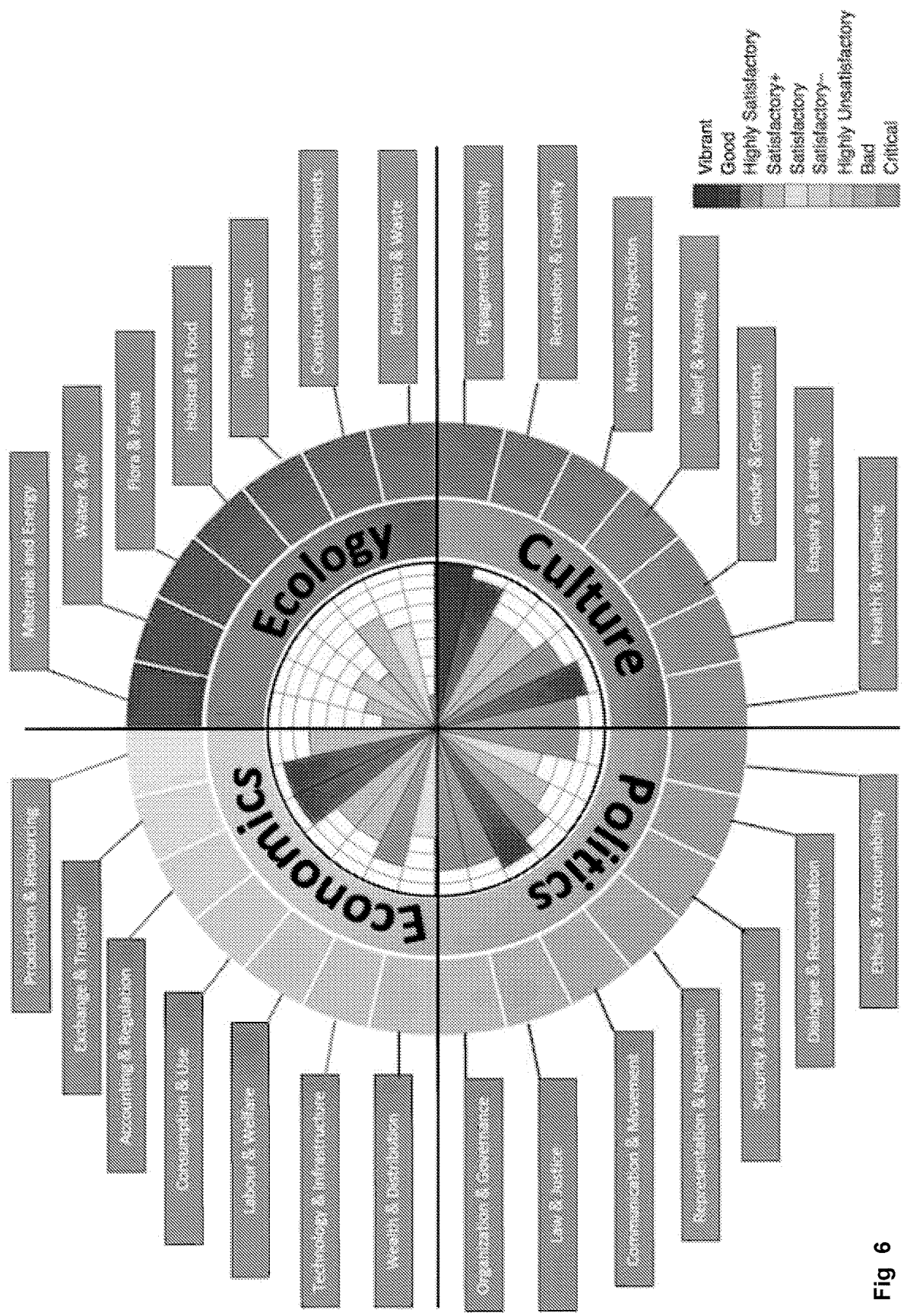
FIGS. 6 and 7 show diagrams illustrating schematically an exemplary Circles of Sustainability Development (CSD) framework illustrating the linking the key elements that influence environmental sustainability and human well-being. The CSD is a possibility to identify the key measuring factors. It presents an assessment of four interdependent boundary domains: environment and ecology, social and cultural, Economics, and Governance and Policy. This approach can be applied in different systems, regions and scales. Thus, the multi-dimensional approach CSD assesses sustainability using the four dimensions of ecology, economics, politics and culture. Each of the four major domains can e.g. be further divided into seven subdomains as shown in the FIG. 5. Other subdomains are also possible as shown in FIG. 6. In order to examine sustainability of each subdomain a nine point scale has been introduced in FIG. 5, where lower point reflects critical sustainability and highest point reflects vibrant sustainability. The major difference between the triple bottom line (TBL) approach and the circles of sustainability approach is the division of social aspects into two weighted parameters of politics and culture.
Figure 7:
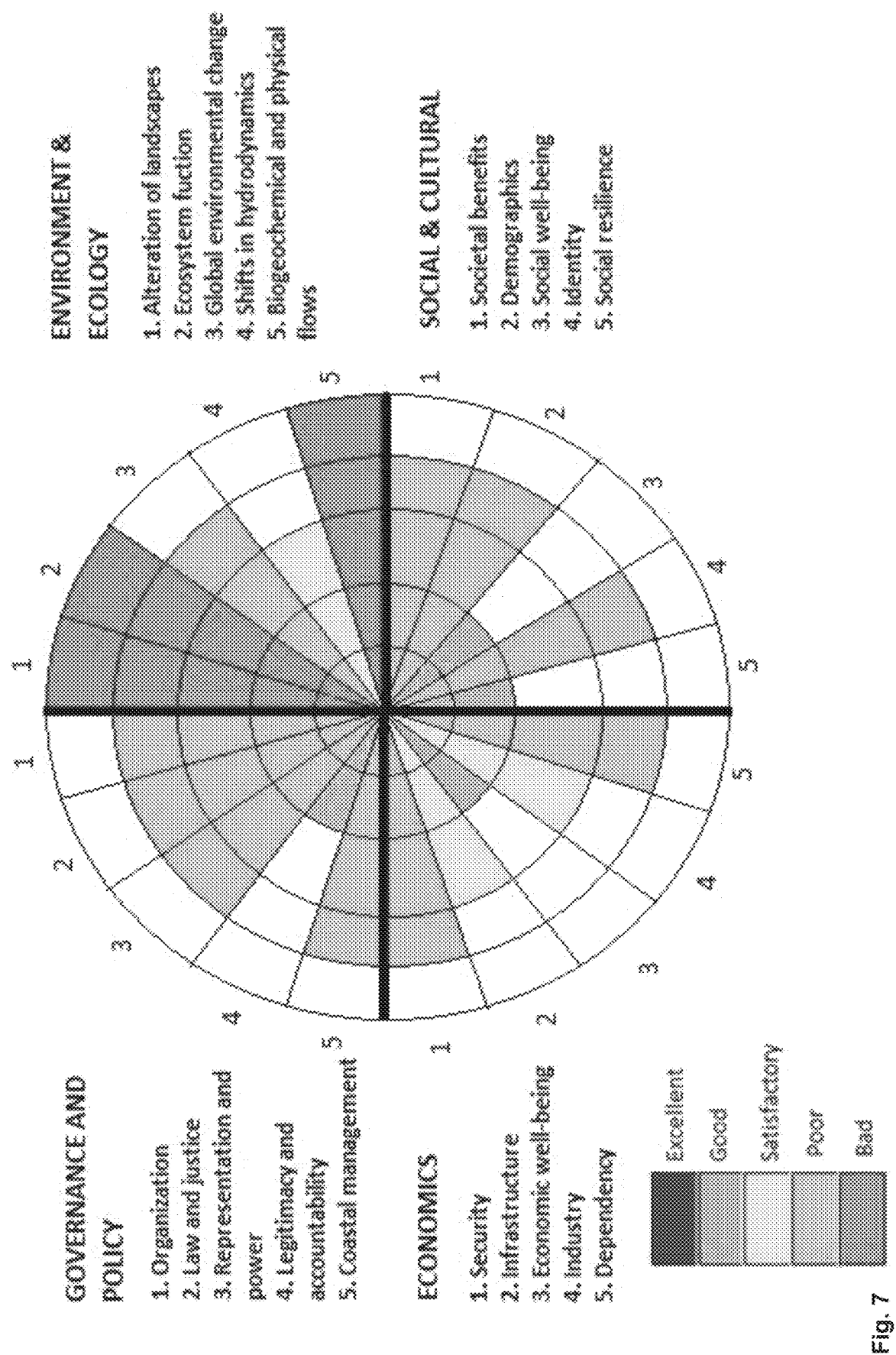
Figure 8:
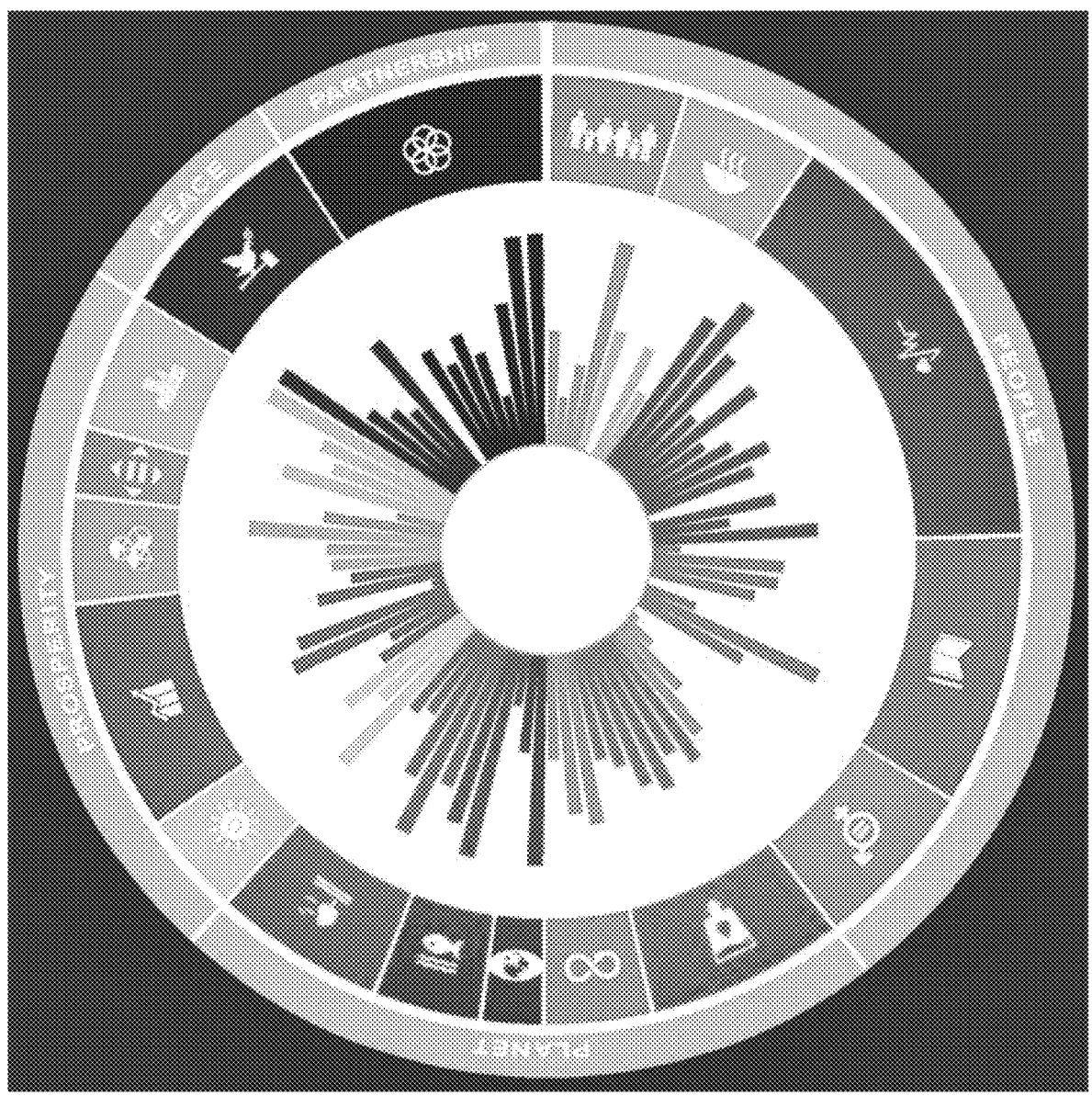
FIG. 8 shows a diagram illustrating schematically an exemplary measuring of the measuring distance to SDG targets, set for a future time $t_{end}$.

FIG. 1 schematically illustrate an architecture for a possible implementation of an embodiment of the inventive, automated measuring system 1 for progress monitoring and steering of impacts of a complex system 2 to world environment and ecosystem 3 induced by environmental-human linkages 21 and for quantitative measuring of effects of applied risk-transfer structures 4 to said environmental-human linkages 21 induced by risk-transfer-SDG linkages 41/411, . . . 41x measuring quantifying distances 11/111, 112, . . . , 11x of progresses toward at least one of a predefined sustainable development goal SDG/12 with and without applying said risk-transfer structures 4. The environmental-human linkages 21 of the complex system or object 2 can e.g. comprise transmission mechanisms associated with operations or actions of the complex system or object 2 to the world environment and ecosystem 3. For example, the official United Nations (UN) Sustainable Development Goals (SDGs) can e.g. be adopted as reference categorization or classification of sustainable impact. Each risk-transfer system providing one or more possible risk-transfer structure 4 can e.g. have a different underwriting focus. Not all SDGs need to be accounted for, and the weights can be customized.

The SDG key performance indicators (indicators or KPIs) 123 are used to measure the impact of the complex system or object 2, as a business, enterprise or industrial plant on specific aspects of an SDG. Each indicator 123 consists of: (i) SDG: The SDG it is meant to be a proxy of the aggregated measuring indicators, (ii) the criteria for risk-transfer (insurance): They reflect the ways risk-transfer can and is expected to contribute significantly to the SDGs; (iii) Indicator description: Specification of the indicator; (iv) Indicator unit for measurement, (v) Indicator source: source of indicator description and indicator unit, (vi) Role of risk-transfer structures 4: risk-transfer structures 4 can contribute in three ways to the SDGs: (a) Operational impact (by own sustainable operations), (b) Direct impact (by sustainable insurance covers, making the world more resilient), and (c) Underlying impact (by supporting sustainable policy holders by making them more resilient). For each relevant SDG 121, at least one indicator 123 is selected.

The monitoring system 1 captures parameters indicating (i) a classification of the applied risk-transfer structures 4 by operational or structural components 22/221, 222, 223, . . . , 22$i$ and/or region or topographical cells 23/231, 232, 233, . . . , 23$i$, (ii) a volume of the applied risk-transfer structures 4 by a risk-transfer structure count and at least one other volume measure, and (iii) a quantification of SDG-relevant properties 43 of the applied risk-transfer structures 4. The captured parameters indicating a classification of the applied risk-transfer structures 4/41, 42, . . . , 4$i$ can e.g. comprise a portfolio and/or policy classification of the applied risk-transfer structures 4/41, 42, . . . , 4$i$. Said parameters can further e.g. indicate a classification of the applied risk-transfer structures 4/41, 42, . . . , 4$i$ by lines of business 22/221, 222, 223, . . . , 22$i$. The at least one other volume measure can e.g. comprise at least one or more defined premium monetary parameters. The parameters can e.g. comprise parameters indicating a volume of the applied risk-transfer structures 4 by a risk-transfer structure count and at least one other volume measure comprises one or more portfolio volumes by policy count and at least one other volume measure. For example, the input of the measuring system 1 can at least comprise (i) Portfolio and/or policy classification by line of business and region, (ii) Portfolio volumes by policy count and at least one other volume measure such as written premium. Any additional values make the calculation more specific and accurate, and (iii) Quantification of SDG-relevant properties of each portfolio. A detailed calculation recipe is provided for each property, and the calculation can be automated The applied risk-transfer structures 4 are quantified by means of classifying the risk-transfer structures 4 and quantifying an associated risk-transfer volume 10134 and the volume 10135 of the actions and/or operations 24 conducted by the monitored complex system 2. Quantifying the applied risk-transfer structures 4/41, 42, . . . , 4$i$ by classifying the risk-transfer structures 4/41, 42, . . . , 4$i$ can e.g. comprise quantifying the portfolios and policies of applied risk-transfer structures by classifying the risk-transfer structures 4/41, 42, . . . , 4$i$.

The measuring system 1 measures the environmental-human linkages 21 and the risk-transfer—SDG linkages 41/411, . . . 41$x$ of the complex system or object 2 to a SDG by quantifying associated impacts of SDG-relevant properties 25 of the monitored complex system 2, the properties 25 being represented by a parametrization each capturing modified environmental-human linkage 26 modified by one or more risk-transfer—SDG linkages 41/411, . . . 41$x$ associated with one or more of the applied risk-transfer structures 4 to the SDG impact, wherein the modified environmental-human linkages 26 consisting of three main parts: (i) a transmission mechanism cause 261 capturing the impact of the complex system 2 on a specific indicator 1231, (ii) a transmission rate 262 represented by a measuring value linking the cause of the transmission mechanism to the relevant activity/operation volume of the complex system 2, and (iii) a transmission measuring value 263 providing a complex system's volume 263 as complex system's volume times transmission rate for an indicator 123 scaled by a risk-transfer structure 4 allocation, wherein parametrizing levers 105 are generated by the measuring system 1 capturing the mechanisms to SDG impact as different channels of transmission, wherein for each risk-transfer structure 4 a default value is determined from the classification, and wherein the default values are adjusted in relation to the classification. The transmission rate can e.g. consist either of one or more fractions of the complex system's volume which are homogeneous and relevant for a specific indicator and type of fraction or of a measuring value quantifying the quality of the complex system 2 as a type of custom. The generation of the transmission rates can e.g. be provided in the step of monitoring the transmission mechanisms and is either integrated into the monitoring system or is not integrated into the monitoring system. For capturing the mechanisms to SDG impact as different channels of transmission, for each policy and/or portfolio a default value can e.g. be determined from the classification.

The measuring system 1 quantifies the impact of the complex system 2 on selected SDG indicators 123/1231, wherein a lever-specific volume 1051 is applied to an indicator intensity 1052 of the complex system 2, and an underlying impact is attributed to an allocation of a risk-transfer structure 4.

The measuring system 1 compares, for indicator conversion and scoring, the monitored indicators 123/1231 to reference values to generate relative measures and converting them to a score metric.

The measuring system 1 aggregates indicators 123/1231 and scores across different portfolios and/or policies of applied risk-transfer structures 4 and aggregating scores across SDGs and across different portfolios and/or policies of applied risk-transfer structures 4, the scores being combined into an overall score for steering and overall optimization.

The of parameters can e.g. comprise parameters indicating a volume of the applied risk-transfer structures 4 by a risk-transfer structure count and at least one other volume measure comprises one or more portfolio volumes by policy count and at least one other volume measure.

In particular, for the measuring system 1 the official United Nations (UN) Sustainable Development Goals (SDGs) 1211 can e.g. be adopted as reference categorization of sustainable impact. Each risk-transfer system may provide different risk-transfer structures 4 having a different underwriting focus. Not all SDGs 121 need to be accounted for, and the weights can be customized. SDG key performance indicators 123/1232 (indicators or KPIs) can be used to measure the impact of the object or system 2 on specific aspects of an SDG 121/1211. Each indicator 123/1231 consists of:

SDG: The SDG it is meant to be a proxy of
Criteria for insurance: They reflect the ways insurance can and is expected to contribute significantly to the SDGs. Source: Swiss Re
Indicator description: Specification of the indicator. Source: Swiss Re, De Nederlandsche Bank, UN
Indicator unit for measurement
Indicator source: source of indicator description and indicator unit
Role of insurance: insurance can contribute in three ways to the SDGs:
  Operational impact (by own sustainable operations)
  Direct impact (by sustainable insurance covers, making the world more resilient), and
  Underlying impact (by supporting sustainable policy holders by making them more resilient)

Figure 9:
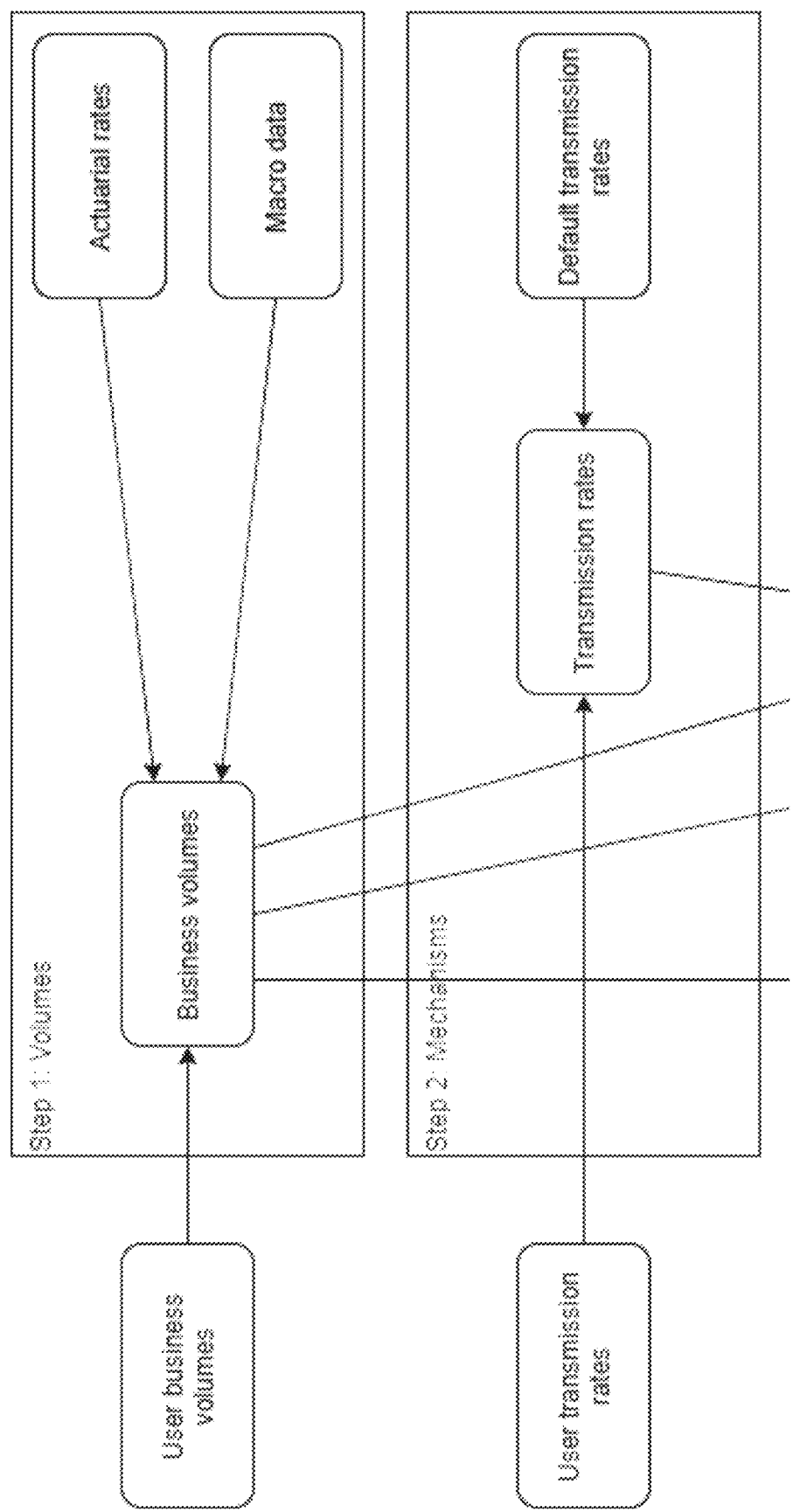
FIG. 9 shows a block diagram illustrating schematically an exemplary outline of the Insurance SDG calculation with dependencies. Inputs are blue, outputs are orange, parameters and results from other models are green, and calculated values are golden.
Figure 9:
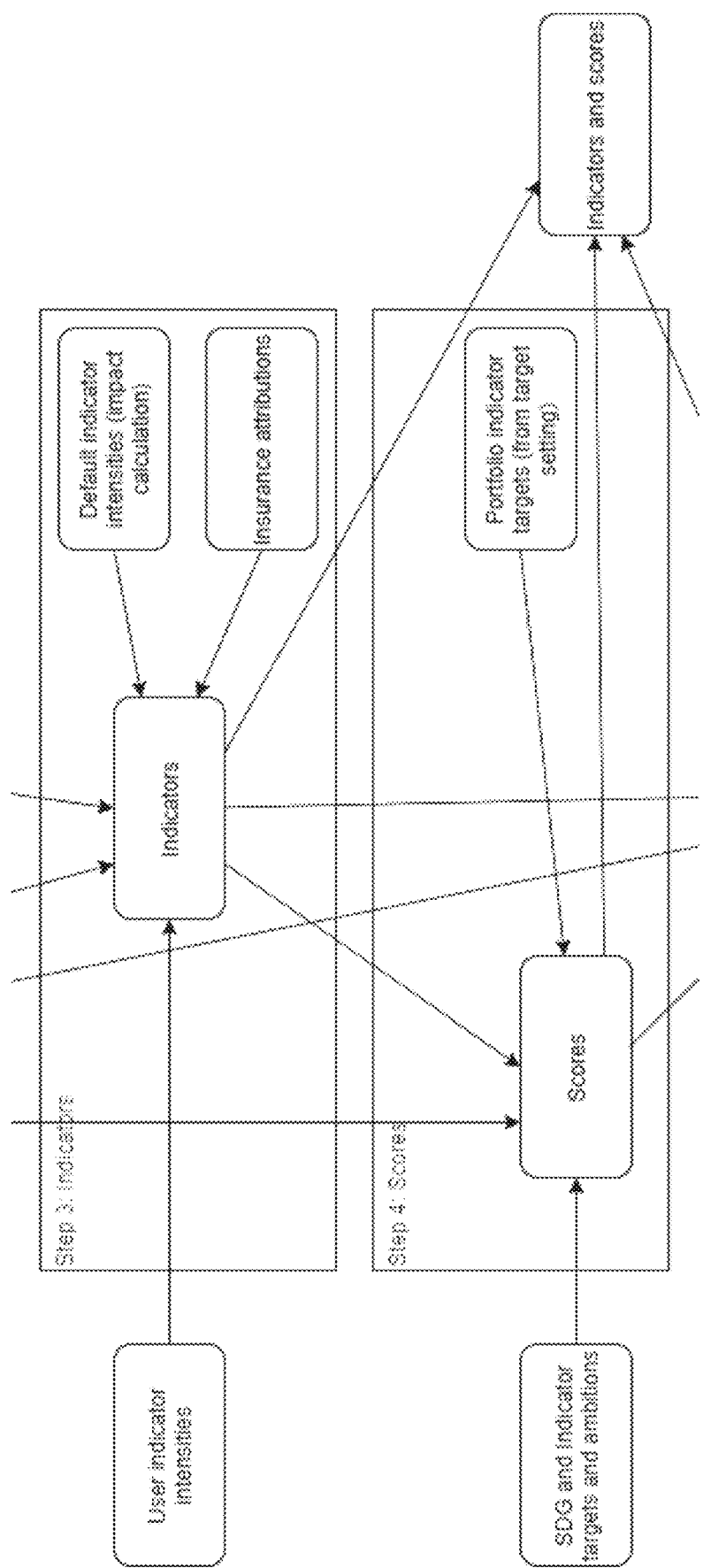
Figure 9:
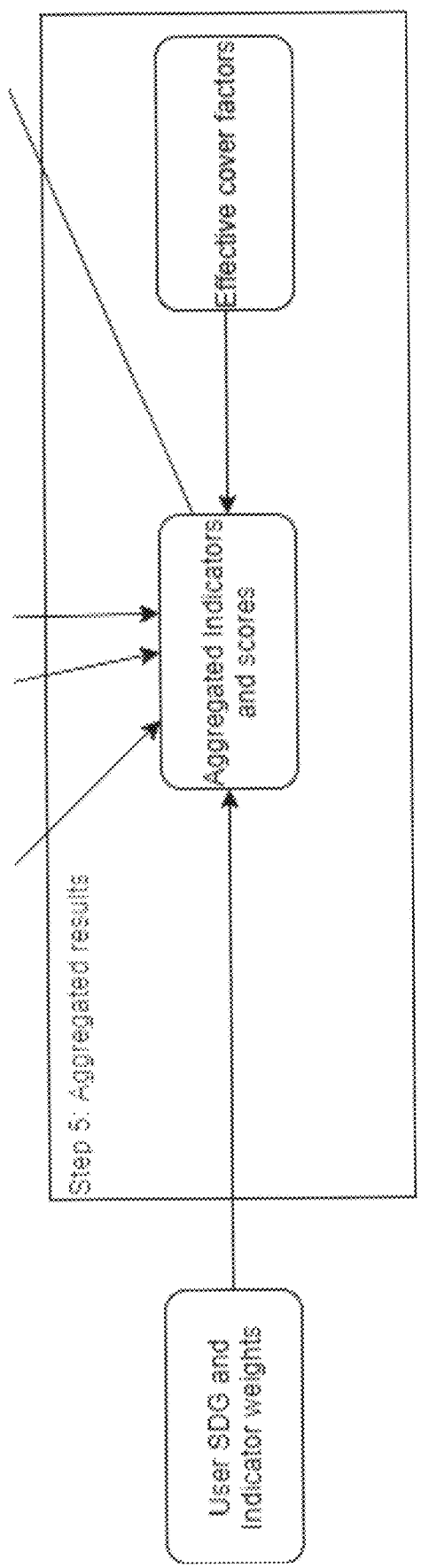

For each relevant SDG 121, at least one indicator 123/1231 is selected. The user input of the monitoring system 1 can e.g. comprise: (i) Portfolio and/or policy classification by line of business and region; (ii) Portfolio volumes by policy count of the applied risk-transfer structures 4 and at least one other volume measure 42 such as written premium by defined monetary amount parameters. Any additional values make the calculation more specific and accurate; and (iii) Quantification of SDG-relevant properties 25 of each portfolio. A detailed calculation recipe is provided for each property 25, and the calculation can be automated The output of the measuring system 1 can e.g. comprise three Sections: (i) Operation and/or actions performed by the complex system or object, e.g. given by its business, own system/object 2 climate resilience, and SDG impact. A business output can e.g. provide an overview of risk-transfer system's activities/business in terms of classic business KPIs. A own business resilience output can e.g. provide an overview of the resilience of the insurer's business, i.e. the activities of the risk-transfer system against climate change. An SDG impact output can e.g. comprise:

Absolute values of indicators 123. These measures reflect both quantity and quality of the business. They are combined by sums.
  1. $K_{k,i}^{abs}$ per portfolio i and indicator k
  2. $K_{k}^{abs}$ per indicator k Relative values of indicators 123. These measures reflect the quality of the business only, weighted with quantity. They are combined by weighted averages.
  1. $K_{k,i}^{rel}$ per portfolio i and indicator k
  2. $K_{k}^{rel}$ per indicator k Scores related to indicators 123 based on absolute allocation. These scores have a uniform scale, share the ordering with the underlying indicators, and they are obtained by comparison of the underlying indicator with an absolute target to be achieved. They are suited to monitor progress of an entire insurance industry.
  1. $S_{k,i}^{abs}$ per portfolio i and indicator k—for steering purposes
  2. $S_{s,i}^{abs}$ per portfolio i and SDG s—for steering and communication purposes
  3. $S_{*,i}^{abs}$ per portfolio i—for steering purposes
  4. $S_{k,*}^{abs}$ per indicator k—for transparency
  5. $S_{s,*}^{abs}$ per SDG s—for communication purposes
  6. $S_{*,*}^{abs}$ overall—for overall optimization purposes Scores related to indicators based on relative allocation. These scores have a uniform scale, sharing the ordering with the underlying indicators, and they are obtained by comparison of the underlying indicator with the maximum achievable value with the same volume of business. They are suited to monitor quality improvements of the business.
  1. $S_{k,i}^{rel}, S_{s,i}^{rel}, S_{*,i}^{rel}, S_{k,*}^{rel}, S_{s,*}^{rel}, S_{*,*}^{rel}$ The goal of the technical framework is to integrate all modelling and data analytics to generate all output consistently with one set of inputs and parameter. FIG. 9 outlines the functional blocks and the key variable groups of the measuring system 1. The blue boxes represent user input, the green boxes represent reference data, and the yellow and red boxes represent generated data. The results of the SDG impact analytics (see above) are integrated via the indicator intensities 1052. In this specification, a "portfolio" i can denote a portfolio or set of risk-transfer structures 4, i.e. defined by policies, or a single policy, and it can be split into disjoint sub-portfolios $\iota_i \subseteq i$, $\iota_i \cap \iota_i' = \emptyset$ if $\iota_i \neq \iota_i'$.

Step 1: Quantification of Applied Risk-Transfer Structures 4

This step classifies the volume of applied risk-transfer structures 4, i.e. the insurance business or activity, and quantifies the risk-transfer structures volume 42 as well as the volumes of the operations of the policy holders. The business can e.g. be categorized by line of business 311, 312, 313, . . . , 31*i* and region 321, 322, 323, . . . , 32*i*. The premium and underlying business volumes 42 can e.g. be measured and converted using market, costing, and macroeconomic data. The purpose of this is to achieve (i) repeatability and updateability, and (ii) basis for subsequent steps.

For the modelling, various simulations and models can be integrated into this step, in particular to feed the digital replica 102 of the real-world complex system/object 2, the digital ecosystem and world environment replica layer 103, the digital risk-transfer structure replica layer 104, and the levers 105 with the appropriate time-series of measuring parameter values and forecasted parameter values. In particular, the modelling and predictive modelling structures can e.g. further comprise actuarial costing modelling and macroeconomic modelling. As constant parameters, e.g. a list of risk-transfer structures 4 volume types can be used, with:

$\tau \in \text{Vol} = \{co, pr, am, rev, ic, kt\}$ where co is Count of policies
pr is Premium
am is Amount (sum insured)
rev is Revenue
ic is Installed Capacity (power generation)
kt is Kilometers Travelled (transportation)
vc is Vehicles Count (transportation)

A user input can e.g. comprise for each portfolio or policy i: (a) $l_i$ line of business and $r_i$, region; and (b) $V_{i,\tau}^u$, business volume measure of type $\tau \in \text{Vol}$ defined in the list of volume types. As output, the user input is complemented by reconstructed volume measures with: $V_{i,\tau}$ business volume measure of type $\tau \in \{\text{Volumes}\}$. Further, the parameters used can e.g. comprise (i) Default volumes: $V_{i,co}^d$ default business volume by count of policies; (ii) Actuarial parameter values, as: (a) default premium rates: $R_{i,r}^{pr}$ by line of business and region, and (b) Rate on line; and (iii) Macro information: Company size distribution: $F_{i,rev}(\sigma, V_{rev})$ by industry a and revenue $V_{rev}$ for region l.

The volume reconstruction depends on the volume measure:

Premium parameter values:

$$V_{i,pr} = \begin{cases} V_{i,pr}^u & \text{if known} \\ V_{i,pr}^d & \text{else if known} \\ V_{i,am}^u \cdot R_{l_i, r_i} & \text{else} \end{cases}$$

Revenue parameter values, expected value over all applicable industries σ and revenues $V_{rev}$ $$V_{i,rev} = V_{i,co} \cdot E_i[F_{l_i,rev}]$$

Installed capacity, kilometers driven: See carbon module

The relationships above can be used in both directions, i.e., the given coverage as insured amount can be obtained from the premium, $$V_{i,am} = \begin{cases} V_{i,am}^u & \text{if known} \\ \dfrac{V_{i,pr}^u}{R_{l_i,r_i}} & \text{else} \end{cases}$$

Data obtained from associated databases can be considered as user information date, i.e., it can be implemented as to take precedence over generated values. A dedicated module may be designed to look up and/or filter the information data.

Step 2: Mechanisms to Impact

This step quantifies SDG-relevant properties of the system or object 2, e.g. of a business. These properties are also called "transmission mechanisms" here after and represent a mechanism from the risk-transfer operation to the SDG impact. The transmission mechanisms consist of three main parts: (i) Transmission mechanism 261: The correlation or linkage describing the impact of the applied risk-transfer structure 4 on the indicator 123; (ii) Transmission rate 262: The value(s) linking the cause of the transmission mechanism to the relevant business volume. The transmission rate consists either of the fraction(s) of business volume which are homogeneous and relevant for the indicator (type fraction) or of a value quantifying the quality of the business (type custom); and (iii) Transmitted parameter volume 263: The relevant risk-transfer volume 263 (risk-transfer volume times transmission rate) for an indicator 1123 scaled by the risk-transfer allocation (see Step 3).

The generation of the transmission rates 262 is defined in this Step and can be integrated into the measuring system 1, but it does not need to be integrated. The levers 105 formalizing the mechanisms to impact (channels of transmission) can e.g. comprise: (1) For each policy and/or portfolio, the default values of each lever 105 are determined from the classification; (2) Values are adjusted where known. The purpose of the levers 105 lies in providing: (i) Consistency; (ii) Reduction of complexity of judgement calls; (iii) Basis for impact calculation. The approach behind the mechanisms and transmission rates it the idea that not all policies have the desired property, and the impact calculation becomes less judgmental if the fraction of business is determined where the criterion applies. There can be two types of lever 105, namely (1) Fraction of risk-transfer volume where the criterion applies; and (2) Custom property of a policy. The modelling integrated into this step comprises quantification of SDG-relevant properties of the portfolio.

As user input to step 2, for each portfolio or policy i and mechanism j e.g. a lever value can be provided with $L_{i,j}^u$ lever value. As further input, the values from step 1 are taken with $l_i$ Line of business and $r_i$ region, $V_{\tau,i}$ business volume measures. As output of step 2, for each portfolio or policy i and lever j, a lever value is provided with $L_{i,j}$ lever value.

For each mechanism j, the parameter are as follows:

$L_{j,l,r}^d$ default transmission rate value of line of business l and region r $T_j^{mech}$ mechanism type (type of transmission rate),
$T_j^{mech} \in$ {Fraction, Custom, Fraction array}

$\tau_j^{mech}$ volume type relevant for mechanism, $\tau_j^{mech} \in$ {Volumes}

Mechanism transmission rate completion is generated by the linkage:

$$L_{j,i} = \begin{cases} L_{j,i}^u & \text{if known} \\ L_{j,l_i,r_i}^d & \text{else} \end{cases}$$

Mechanism transmission rate generation (type fraction) by decomposition of portfolio i into disjoint sub-portfolios t:

$$L_{j,i}^u = \dfrac{\sum_{k \in i} \delta_{i,j} V_{i,\tau_j^{mech}}}{\sum_{k \in i} V_{i,\tau_j^{mech}}} \text{ where } \delta_{i,j} = \begin{cases} 1 & \text{if criterion } j \text{ is satisfied} \\ 0 & \text{else} \end{cases}$$

The transmission rate $L_{i,j}^u$ can also consist of (i.e. parameterize) multiple components, each element reflecting one criterion (e.g., energy production from photovoltaics, wind, hydro power, gas, or coal). Mechanism transmission rate calculation (type custom): This generation depends on the specific lever 105 and is defined separately for each applicable lever. Its domain is not limited to the range [0,1] but rather $D_j = [0, \infty]$.

The volumes including terminology (example of WACI (West African Coast Initiative) by the UN) can e.g. be given by:

Numerator of WACI: Absolute indicator 123 related to the underlying operations (e.g. emissions of $CO_2$ equivalent)

Denominator $V_{i,\tau_k^{indicator,ul}}$ of WACI: The indicator 123 underlying volume type $\tau_k^{indicator,ul}$ (e.g. revenue)

Absolute volume for the aggregated risk-transfer structures 44 (i.e. the portfolio 44 of the applied risk-transfer structures 4) weight: $V_{i,\tau_k^{indicator,p}}$. The indicator volume type (e.g. $\tau_k^{indicator,p}$ (e.g. premium) refers to the size of the applied risk-transfer coverage (as an investment) and is used as a weight Portfolio weight of WACI: Fraction of absolute volume for portfolio weight (e.g. premium)

On type of volume, it has further to be noted that (i) if a lever relates to an underlying volume type $\tau_j^{mech} \in$ {Underlying volumes} (size of underlying operations), $\tau_j^{mech}$ determines the type of underlying "size" (denominator of an intensity). $\tau_j^{mech}$ might be different from the underlying volume type $\tau_k^{indicator,ul}$ of a indicator; and (ii) If a lever relates to a portfolio volume (size of insurance cover), the volume type for weight and intensity might be the same. On the multi-component levers of type fraction (see below: carbon output generation) it has further to be noted: (i) There are three types of lever: fraction, custom, and fraction array; and (ii) In case of multi-component levers (fraction array) $L_{i,j} = [L_{j,i,\gamma}]_\gamma$, the input consists of multiple values: one value per component γ. The components are determined by the plug-in handling the output generation.

Step 3: Quantification of impact

This step quantifies the impact of the applied risk-transfer structures 4 and/or the aggregated risk-transfer structures 44 (i.e. the portfolio 44 of applied risk-transfer structures 4) on selected SDG indicators 123. It integrates the results of SDG impact analytics into an overall data processing. For the impact parameter value generation, (1) a lever-specific volume 1051 can e.g. be applied to indicator intensity 1052 of underlying applied risk-transfer structures (from impact analytics); and (2) an underlying impact is attributed to risk-transfer coverage. The technical purpose of conducting step 3 is (i) Translation from impact of underlying business to the actual risk-transfer impact, (ii) Continuous technical improvement via dynamic, adaptable integration of model and analytics results; and (iii) Avoidance of double counting. In step 3, the generation of indicator intensities 123 of the applied risk-transfer (results from the applied SDG impact analytics) is integrated. The input values for step 3 can e.g. comprise (i) Values derived from step 1: $l_i$ line of business and $r_i$ region, $V_{i,\tau}$ business volume; and/or (ii) Values from step 2: $L_{j,i}$ lever value. The output values generated by step 3 can e.g. comprise (i) $K_{k,i}^{abs}$ absolute value of indicator k and portfolio i; and (ii) $K_{k,i}^{rel}$ relative value of indicator k and portfolio i. The relevant parameters of step 3 can e.g. comprise:

- $T_k^{indicator,ul}$ type of underlying volume (see note on volumes, step 2). The constraint $T_k^{indicator,ul} = \tau_j^{mech}$ $\forall k,j$ where $I_{k,j} \neq 0$ does not need to hold if all underlying volumes are known.
- $T_k^{indicator}$ type of indicator calculation $T_k^{indicator} \in \{\text{fraction, custom, fraction array}\}$, where, as rule of thumb, Underlying relates to fraction array and direct relates to fraction or custom, see Section 2.2 SDG indicators (KPIs)
- $T_j^{mech} \in \{\text{fraction, custom, fraction array}\}$ type of mechanism. The constraint $T_k^{indicator} = T_j^{mech}$ $\forall k,j$ where $I_{k,j} \neq 0$ applies.
- $I_{k,j}^d$ default indicator intensity to transmission mechanism j (from SDG impact analytics, Section 1.2 SDG impact). This parameter is defined as the marginal contribution of business with the lever's type of volume to the indicator $$I_{k,j} = \begin{cases} 0 & \text{if mechanism } j \text{ does not contribute to indicator } k \\ 1 & \text{if mechanism } j \text{ contributes to indicator } k \text{ and } T_k^{indicator} = \text{Direct} \\ \dfrac{\partial K_k}{\partial V_{\tau_j^{mech}}^{active}} & \text{else} \end{cases}$$

where $$dK_k = \frac{\partial K_k}{\partial V_{\tau_j^{lever}}} dV_{\tau_j^{mech}}^{active}$$

is the contribution of the underlying operation to the indicator $K_k$.

Here, the differential volume $dV_\tau^{active}$ refers to the relevant part of the business only, i.e., after application of the corresponding transmission rate, $$dV_{\tau_j^{mech}}^{active} = dV_{\tau_j^{mech}} \cdot L$$

where L is the applicable transmission rate.

$A_{j,i,r}$ insurance line of business l attribution of lever j for region r. This parameter accounts for the insurance cover's contribution to the success of the underlying operations, $$A_{j,l,r} = \begin{cases} \sum_k p_{j,s,r} \delta_{s,l} & \text{if } T_j^{mech} = \text{Underlying} \\ 1 & \text{else} \end{cases},$$

$$\delta_{s,l} = \begin{cases} 1 & \text{if } s = \text{insurance with } LoB \; l \\ 0 & \text{else} \end{cases}$$

where $p_{k,s,r}$ is the contribution of success factor s to the success of the underlying operations corresponding to lever j. It is a judgmental parameter which needs to satisfy the constraint $\Sigma_s \, p_{j,x,r} = 1$ $\forall j,r$ and is captured to avoid any double counting, and to provide consistency $a_k$ attachment type of indicator k to lever value, $a_k \in \{\text{Value, Leverage}\}$ The generation of the output values can e.g. comprise:

Underlying volume type $\tau_k^{ul}$ for portfolio weights for indicator, $\tau_k^{ul} \in \{\text{Volumes}\}$, co: count of policies:

$$\tau_k^{ul} = \begin{cases} \tau_k^{indicator,ul} & \text{if } \tau_k^{indicator,ul} \neq \text{(Lever)} \\ \tau_j^{mech} & \text{if } \tau_k^{indicator,ul} = \text{(Lever) and } \tau_j^{mech} = \tau_{j'}^{lever}, \forall j, j' \text{ where } I_{k,j} \neq 0 \\ co & \text{else} \end{cases}$$

Transmitted value (for $a_k$=Leverage):

$$\Lambda_{i,j} = L_{i,j} V_{i,\tau_j^{mech}} A_{j,t_i,r_i}$$

Weight of lever j for calculation of indicator k (for $a_k$=Value):

$$w_{j,k,i}^{lever} = \frac{I_{k,j} V_{i,\tau_j^{ul}} A_{j,l_i,r_i}}{\sum_{j'} I_{k,j'} V_{i,\tau_{j'}^{ul}} A_{j',l_i,r_i}}$$

Constraint: $\tau_j^{lever} = \tau_{j'}^{lever}$ $\forall j,j'$ where $l_{k,j} \neq 0$ and $a_k$=Value.
Absolute value of indicator k of portfolio i:

$$K_{k,i}^{abs} = \begin{cases} K_{k,i}^{abs,mc} & \text{if } \exists\, j \text{ where } I_{k,j} \neq 0 \text{ and } T_j^{lever} = \text{Fraction array} \\ \sum_j \Lambda_{i,j} I_{k,j} & \text{else if } a_k = \text{Leverage} \\ \sum_j L_{i,j} w_{j,k,i}^{lever} & \text{else} \end{cases}$$

Note: The sum $\Sigma_j(\ldots) = \Sigma_{j\in(j,I_{k,j}\neq 0)}\delta_{j,k}(\ldots)$ can run over all levers j where the intensities $I_{k,j}$ are not equal to zero.

Relative value of indicator:

$$K_{k,i}^{rel} = \begin{cases} \dfrac{1}{V_{i,\tau_k^{indicator,ul}}} \sum_j \Lambda_{i,j} I_{k,j} & \text{if } a_k = \text{Leverage} \\ \sum_j L_{i,j} w_{j,k,i}^{lever} & \text{else} \end{cases}$$

Note, for the multi-component mechanisms of type fraction (see below: Carbon analysis):
 The lever 105 an indicator 123 refers to determines the type of calculation
 The lever $L_{i,j}=[L_{i,j,\gamma}]_\gamma$ and the leverage $\Lambda_{i,j}=[\Lambda_{i,j,\gamma}]_\gamma$ consist of $n_\gamma$ components each
 The intensity $I_{k,j}=[I_{k,j,\gamma}]_\gamma$ consists of $n_\gamma$ components
 The attribution $A_{j,t_i,r_i}$ is a scalar
 The contributions to the indicator are calculated using the scalar products,
 $L_{i,j} I_{k,j}=[L_{i,j,\gamma}]_\gamma^T \cdot [I_{k,j,\gamma}]_\gamma$, $\Lambda_{i,j} I_{k,j}=[\Lambda_{i,j,\gamma}]_\gamma^T \cdot [I_{k,j,\gamma}]_\gamma$
 respectively Further, note, for the attribution and intensity, that (i) The risk-transfer line of business attribution represents the marginal contribution of a specific risk-transfer coverage to the underlying operations' impact. A dedicated module can e.g. generate it (see below: Portfolio target setting). It consists of these two factors, namely (1) The risk-transfer structures' total attribution: Marginal contribution of a comprehensive cover against all relevant risks, and (2) The effective cover factor: Fraction of risk covered by a specific insurance coverage. Further, the indicator intensity is defined as the marginal contribution of.

Step 4: Indicator Conversion and Scoring

This step compares generated indicators 123 to reference values and converts them to scores. First, the indicators 123 are compared with reference values to obtain/measure relative measures. Secondly, relative indicators 123 are mapped onto a range for scores. The technical purpose behind step 4 is to apply a transparent measuring and benchmarking. Optionally, user inputs can e.g. be additionally used, as e.g. $R_{k,i}^{ptf,u}$ portfolio indicator ambition where known, absolute allocation, and/or $R_{k,i}^{rel,u}$ portfolio indicator ambition where known, relative allocation. As Input parameter values for step 4, the following values can e.g., be used (i) values from step 1: $l_i$ line of business and $r_i$ region, $V_{i,\tau}$ business volume; (ii) values from step 2: $\tau_j^{mech}$ volume type relevant for lever; and (iii) values from step 3: $K_{k,i}^{abs}$ absolute value of indicator k and portfolio i, $K_{k,i}^{rel}$ relative value of indicator k and portfolio i. Further, the following parameters can e.g. be used:

$\tau_k^{indicator,p}$ Type of portfolio volume for weighting (see note on volumes, step 2)
 $R_{c,k}^{abs}$ indicator absolute company target for indicator k and company c
 $R_{c,k}^{rel}$ indicator relative company target for indicator k and company
 $E_{k,l,r}$ portfolio type effective cover factor $$E_{k,l,r} = \begin{cases} 0 & \text{if portfolio type } l, r \text{ is not relevant for indicator } k \\ e_{k,l,r} & \text{if } T_k^{indicator} = \text{Direct} \\ 1 & \text{else} \end{cases}$$

constraint: $\Sigma_{l,r} E_{k,l,r} \leq 1\, \forall k$ and $e_{k,l,r}$ are judgmental values
$\delta_k^{Contribution}$ and $\delta_k^{NoHarm}$ contribution/no harm flags of indicator k, $$\delta_k^{Contribution} = \begin{cases} 1 & \text{if indicator } k \text{ can measure } a \text{ contribution to the SDGs} \\ 0 & \text{else} \end{cases}$$

$$\delta_k^{Contribution} = \begin{cases} 1 & \text{if indicator } k \text{ can measure } a \text{ harm to the SDGs} \\ 0 & \text{else} \end{cases}$$

$S^{target}$ score value which results from indicator value equal target value (e.g., $S^{target}$=10 means if you meet the target, the score is 10)
$S^{low}$(e.g., −10) lowest possible score, $S^{high}$ (e.g., 10) highest score, $S^{thr}$ (e.g., 0) score of the threshold between harm and contribution. See note on baseline
$s_k^{thr,abs}$, $s_k^{thr,rel}$ threshold indicator ratio (threshold ratio for each indicator k setting the boundary between harmful and contributing). See note on baseline There are two types of scores for each indicator k, which can be generated as output by step 4: (1) Scores based on absolute allocation $S_{k,i}^{abs}$; and (2) Scores based on relative allocation $S_{k,i}^{rel}$. The data processing conducted under step 4 can e.g. comprise:
 Volume type $T_k^{indicator} \in \{\text{Volumes}\}$ for portfolio weights for indicator k:

$$\tau_k^{indicator} = \begin{cases} \tau_k^{indicator,p} & \text{if } \tau_k^{indicator,p} \neq (\text{Lever}) \\ \tau_j^{lever} & \text{if } \tau_k^{indicator,p} \neq (\text{Lever}) \text{ and } \tau_j^{lever} = \tau_{j'}^{lever},\ \forall\, j, j' \text{ where } I_{k,j} \neq 0 \\ co & \text{else} \end{cases}$$

Portfolio indicator volume $V_{i,k}$:

$$V_{i,k} = V_{i,\tau_k^{indicator}}$$

Indicator-related portfolio weight $w_{i,k}^{ptf}$ (do not confuse with indicator weight $w_k^{indicator}$):

$$w_{i,k}^{ptf} = \frac{V_{i,k}}{\sum_{i'} V_{i',k}}$$

Part of reference indicator allocation for absolute allocation (Step 5 and Module 3.1—Portfolio target setting):

$$R_{k,i}^{abs} = R_k^{abs} \frac{w_{i,k}^{ptf}}{\sum_{i'} w_{i',k}^{ptf} E_{k,l_{i'},r_{i'}}}$$

Portfolio reference indicator, absolute allocation, if some portfolio ambitions $R_{k,i}^{ptf,u}$ are set:

$$R_{k,i}^{abs} = \begin{cases} R_{k,i}^{ptf,u} & \text{if known} \\ R_{k,i}^{ptf,d} & \text{else} \end{cases}$$

The long formula for $R_{k,i}^{ptf,d}$ is given in Section Module 3.1—Portfolio target setting.
Portfolio reference indicator, relative allocation (see Step 5 and Module—3.1—Portfolio target setting)

$$R_{k,i}^{rel} = \begin{cases} R_{k,i}^{rel,u} & \text{if known} \\ R_k^{rel,d} & \text{else} \end{cases}$$

The formula for $R_k^{rel,d}$ is given in Section Module 3.1—Portfolio target setting.
Threshold indicator—reference ratio:

$$s_k^{abs} = \begin{cases} s_k^{thr,abs} & \text{if defined for } k \\ 0 & \text{else} \end{cases}$$

$$s_k^{rel} = \begin{cases} s_k^{thr,rel} & \text{if defined for } k \\ 0 & \text{else} \end{cases}$$

Indicator score based on absolute allocation:

$$S_{k,i}^{abs,raw} = \begin{cases} S^{scale}\left(\frac{K_{k,i}^{abs}}{R_{k,i}^{ptf}} - s_k^{abs}\right) & \text{if } E_{k,l,r} > 0 \\ n/a & \text{else} \end{cases}$$

$$S_{k,i}^{abs} = S^{thr} + \max\left(\min\left(S_{k,i}^{abs,raw}, \delta_k^{Contribution}(S^{high} - S^{thr})\right), \delta_k^{No\,Harm}(S^{low} - S^{thr})\right)$$

Indicator score based on relative allocation:

$$S_{k,i}^{rel,raw} = \begin{cases} S^{scale}\left(\frac{K_{k,i}^{rel}}{r_{k,i}^{ptf}} - s_k^{rel}\right) & \text{if } E_{k,l,r} > 0 \\ n/a & \text{else} \end{cases}$$

$$S_{k,i}^{rel} = S^{thr} + \max\left(\min\left(S_{k,i}^{rel,raw}, \delta_k^{Contribution}(S^{high} - S^{thr})\right), \delta_k^{No\,Harm}(S^{low} - S^{thr})\right)$$

For the attribution vs. effective cover factor, it is to be noted that indicators' 123 narrative can e.g. precede technical considerations, i.e., indicators 123 related to risk-transfer itself do not consider the effectiveness of risk-transfer on the underlying operations, as e.g. (i) In case of an indicator related to underlying operations, the indicator 123 accounts for the contribution of a risk-transfer structure 4 to the SDG impact, and this is done by using the attribution; and (ii) In case of an indicator 123 related to risk-transfer itself, the indicator 123 takes credit to 100%, meaning that during aggregation, the indicator 123 would be double counted. This is corrected by the effective cover factor For on target setting, it is to be noted that the absolute targets need to account for the effectiveness of risk-transfer structure 4, also related to risk-transfer itself, where: (i) Scores, relative allocation: effective cover factor plays no role; (ii) Scores, absolute allocation, related to direct impact (insurance operations): The effective cover factors need to be accounted for in the reference indicator allocations $R_{k,l,r}$; (iii) Scores, absolute allocation, related to underlying impact (underlying operations): indicators account for the contribution of insurance to the SDG impact. The effective cover factors are equal to 1 and therefore automatically accounted for in the reference indicator allocations; and (iv) Scores, absolute allocation, related to operational impact (own operations): The effective cover factor plays no role.

For the baseline setting, it is to be noted that measured negative scores then correspond and are associate to values below the threshold. Example: Reaching a sufficient number and/or fraction of the population in poverty is a prerequisite to contribute to the corresponding indicator 123 of SDG 1. Indicators 123 with built-in baseline ($\zeta_k^{indicator} \neq$ zero, e.g. carbon—worldwide industry average) have thresholds $s_k^{thr,abs} = s_k^{thr,rel} = 0$. Example: An aggregation of applied risk-transfer structures, i.e. a specific portfolio of risk-transfers, which emits less $CO_2$ than a reference portfolio (with defined composition in terms of components $\gamma$) and reference carbon intensities for each component $\gamma$ (which might depend on the region) contributes positively to the corresponding indicator of SDG 13. In this case, the threshold value is not defined as a value but generated from multiple values each of which can be selected to change over time (reference indicator intensities 1233 and a reference portfolio composition).

Regarding the technical target, ambition and benchmark, it has to be noted that the reference indicator value $R_{k,i}^{abs}$ as indicated in the formula framework above can origin from three different sources: (i) Target: The target is set by consensus among market players and/or an authority, e.g. a regulator. It is therefore a reference value for the insurer whose SDG impact is to be calculated; (ii) Ambition: The ambition is set by insurer whose SDG impact is to be calculated; (iii) Benchmark: The benchmark is calculated for a group of peer insurers of the insurer whose SDG impact is to be calculated; and (iv) Baseline: Reference across groups. It can result out of the calculation using the relevant average. Options: worldwide or by region. Target, ambition, and benchmark indicator value are also referenced by "reference allocation", as general term.

Step 5: Aggregation

This step combines indicators 123 and scores across aggregations 44 of risk-transfer structures 4 (i.e. portfolios 44 of applied risk-transfer structures 4) and/or different risk-transfer structures 4 (e.g. given by policy parameters) and combines scores across SDGs and across aggregations 44 of risk-transfer structures 4 (i.e. portfolios 44 of applied risk-transfer structures 4) and/or policies. For the aggregation, first, indicators 123 can e.g. be aggregated over policies/portfolios 44, and secondly scores can e.g. be aggregated over policies/portfolios 44, and the scores are combined into an overall score. The purpose of step 5 is providing the appropriate steering and overall optimization. As user input, the following parameter vales can e.g. be used $w_k^{indicator}$ indicator weight, constraint: $\Sigma_{k \in (indicators\ in\ s)} w_k^{indicator} = 1\ \forall_s$, and (ii) $w_s^{SDG}$ SDG weight, constraint: $\Sigma_s w_s^{SDG} = 1$. As input parameter values, the following parameters can e.g. be used: (i) From step 1: Volumes; (ii) From step 2: Lever values; (iii) From step 3: Attachments of indicators to levers; and (iv) From step 4: indicators, weights, effective cover factors. As output parameters, generated by step 5, e.g. the following measuring parameter values can be provided by the measuring system 1: (i) Aggregated absolute values of indicators $K_k^{abs}$, (ii) Aggregated relative values of indicators $K_k^{rel}$; (iii) Aggregated scores related to indicators based on absolute allocation: $S_{s,i}^{abs}$, $S_{*,i}^{abs}$, $S_{k,*}^{abs}$, $S_{s,*}^{abs}$, $S_{*,*}^{abs}$; and (iv) Aggregated scores related to indicators based on relative allocation: $S_{s,i}^{rel}$, $S_{*,i}^{rel}$, $S_{k,*}^{rel}$, $S_{s,*}^{rel}$, $S_{*,*}^{rel}$, For the parameter processing and parameter generation, the measuring system 1 can e.g. use the indicator 123 effective weights as:

$$w_{i,k}^{ind,eff} = \frac{w_k^{indicator} \delta_{k,i}^{indicator}}{\sum_{k'} w_{k'}^{indicator} \delta_{k',i}^{indicator}}$$

where the portfolio indicator contribution flag $\delta_{k,i}^{indicator}$ is $$\delta_{k,i}^{indicator} = \begin{cases} 1 & if\ K_{k,i}^{abs} \neq n/a \\ 0 & else \end{cases}$$

Portfolio effective weights (portfolio weights $w_{i,k}^{ptf}$: see above) as:

$$w_{i,k}^{ptf,eff} = \frac{w_{i,k}^{ptf} E_{k,l_i,r_i}}{\sum_{i'} w_{i',k}^{ptf} E_{k,l_{i'},r_{i'}}}$$

using the portfolio indicator contribution flag $\delta_{k,i}^{indicator}$ defined above Aggregated indicator values, absolute allocation:

$$K_k^{abs} = \begin{cases} \sum_i K_{k,i}^{abs} E_{k,l_i,r_i} & if\ a_k = Leverage \\ \sum_i K_{k,i}^{abs} w_{i,k}^{ptf,eff} & else \end{cases}$$

Aggregated indicator values, relative allocation:

$$K_k^{rel} = \sum_i K_{k,i}^{rel} w_{i,k}^{ptf,eff}$$

Aggregated scores by portfolio, both allocation types (any $\in \{abs,rel\}$):

$$S_{s,i}^{any} = \sum_{k \in \{indicators\ in\ s\}} S_{k,i}^{any} w_k^{indicator},\ S_{*,i}^{any} = \sum_s S_{s,i}^{any} w_s^{SDG}$$

Aggregated scores by indicator, both allocation types (any $\in \{abs,rel\}$):

$$S_{k,*}^{any} = \sum_i S_{k,i}^{any} w_{i,k}^{ptf,eff}$$

Aggregated scores by SDG, both allocation types (any $\in \{abs,rel\}$):

$$S_{s,*}^{any} = \sum_{k \in \{indicators\ in\ s\}} S_{k,*}^{any} w_k^{indicator}$$

Total aggregated scores, both allocation types (any $\in \{abs, rel\}$):

$$S_{*,*}^{any} \sum_s S_{s,*}^{any} w_s^{SDG}$$

It is to be noted, that regarding a contribution/no harm aggregation (i) an indicator can measure the contribution or the harm or both to an SDG; (ii) The information on contribution or harm is on the SDG Contribution entity. As an example, the generation of a no poverty score can e.g. be given. This example illustrates the generation of the impact measurement parameter values of the applied risk-transfer structures 4 on poverty reduction (SDG 1 measured by a no poverty score). As another example, the generation of weighted average carbon intensities (WACI) can be given, illustrating the generation of the impact of the applied risk-transfer structures 4 on the climate (SDG 7 measured by the weighted average carbon intensities WACI).

The portfolio target setting can e.g. be realized as an automated module "portfolio target setting". The input parameter values can e.g. comprise (i) $R_{c,k}^{abs}$: company indicator absolute target for indicator k; and (ii) $R_{c,k}^{rel}$: system/object 1 indicator relative target for indicator k. As output measuring values, the parameter values can e.g. comprise (i) $R_{i,k}^{abs}$: portfolio indicator absolute target; and (ii) $R_{i,k}^{rel}$: portfolio indicator relative target.

Further, the measuring system 1 can e.g. comprise, for the absolute and relative allocation, a "portfolio indicator targets module". For the absolute allocation, this module generates the portfolio 44 SDG reference allocations $R_{k,i}$ for indicator k and portfolio i from the overall indicator targets $R_k$ and the portfolio indicator ambitions $R_{k,i}^{ptf,u}$ where known. The reference allocations follow from the constraint that the total score generated from the total indicators (a) must be equal to the total score aggregated over the portfolios (b).

$$S_{k,*}^{abs} = \frac{K_k^{abs}}{R_k^{abs}} = \frac{\sum_i K_{k,i}^{abs} E_{k,l_i,r_i}}{R_k^{abs}} \text{ (see Step 5)} \quad (a)$$

$$S_{k,*}^{abs} = \sum_i S_{k,i}^{abs} w_{i,k}^{ptf,eff} = \sum_i \frac{K_{k,i}^{abs}}{R_{k,i}^{abs}} w_{i,k}^{ptf,eff} \text{ (see Step 5)} \quad (b)$$

From $(a) = (b)$ follows $\frac{\sum_i K_{k,i}^{abs} E_{k,l_i,r_i}}{R_k^{abs}} = \sum_i \frac{K_{k,i}^{abs}}{R_{k,i}^{abs}} w_{i,k}^{ptf,eff}$ which must hold for all $K_{k,i}^{abs}$ and therefore $$\frac{E_{k,l_i,r_i}}{R_k} = \frac{w_{i,k}^{ptf,eff}}{R_{k,i}} = \frac{w_{i,k}^{ptf} E_{k,l_i,r_i}}{R_{k,i} \sum_{i'} w_{i',k}^{ptf} E_{k,l_{i'},r_{i'}}} \to R_{k,i}^{abs} = R_k^{abs} \frac{w_{i,k}^{ptf}}{\sum_{i'} w_{i',k}^{ptf} E_{k,l_{i'},r_{i'}}}$$

If some ambitions are known, we define $$\delta_{i,k}^{known} = \begin{cases} 1 & \text{if } R_{k,i}^{ptf,u} \text{ known} \\ 0 & \text{else} \end{cases},$$

and from $(b) S_{k,*}^{abs} =$ $$\sum_i \delta_{i,k}^{known} \frac{K_{k,i}^{abs}}{R_{k,i}^u} w_{i,k}^{ptf,eff} + \sum_i (1 - \delta_{i,k}^{known}) \frac{K_{k,i}^{abs}}{R_k^{abs}} w_{i,k}^{ptf,eff} \text{ follows}$$

$$\sum_i (1 - \delta_{i,k}^{known}) \frac{K_{k,i}^{abs}}{R_{k,i}^{ptf,d}} w_{i,k}^{ptf,eff} = \frac{\sum_i K_{k,i}^{abs} E_{k,l_i,r_i}}{R_k^{abs}} - \sum_i \delta_{i,k}^{known} \frac{K_{k,i}^{abs}}{R_{k,i}^{ptf,u}} w_{i,k}^{ptf,eff}$$

$$= \sum_i \delta_{i,k}^{known} \left( \frac{K_{k,i}^{abs} E_{k,l_i,r_i}}{R_k^{abs}} - \frac{K_{k,i}^{abs} w_{i,k}^{ptf,eff}}{R_{k,i}^{ptf,u}} \right) + \sum_i (1 - \delta_{i,k}^{known}) \frac{K_{k,i}^{abs} E_{k,l_i,r_i}}{R_k^{abs}}$$

$$= C_k + \sum_i (1 - \delta_{i,k}^{known}) \frac{K_{k,i}^{abs} E_{k,l_i,r_i}}{R_k^{abs}}$$

which must hold for all $K_{k,i}^{abs}$ where $R_{k,i}^u$ is not known. With $$R_k^{abs} C_k + \sum_i (1 - \delta_{i,k}^{known}) K_{k,i}^{abs} E_{k,l_i,r_i} =$$

$$\sum_i (1 - \delta_{i,k}^{known}) K_{k,i}^{abs} E_{k,l_i,r_i} \left( 1 + \frac{R_k^{abs} C_k}{\sum_{i'} K_{k,i'}^{abs} E_{k,l_{i'},r_{i'}}} \right) \text{ a norm } N_k =$$

$$1 + \frac{R_k C_k}{\sum_{i'} K_{k,i'}^{abs} E_{k,l_{i'},r_{i'}}} \text{ is defined,}$$

and $R_{k,i}^{ptf,d} = \frac{R_k^{abs} w_{i,k}^{ptf}}{N_k} \forall i$ where $\delta_{i,k}^{known} = 0$.

Finally, the targets are combined $$R_{k,i}^{abs} = \begin{cases} R_{k,i}^{ptf,u} & \text{if known} \\ R_{k,i}^{ptf,d} & \text{else} \end{cases}$$

For the relative allocation, the weighted average of the relative target allocations $R_{k,i}^{rel}$ must be $$R_k^{rel} = \sum_i \delta_{i,k}^{known} w_{i,k}^{ptf,eff} R_{k,i}^{rel,u} + \sum_i (1 - \delta_{i,k}^{known}) w_{i,k}^{ptf,eff} R_{k,i}^{rel} =$$

$$\sum_i \delta_{i,k}^{known} w_{i,k}^{ptf,eff} R_{k,i}^{rel,u} + R_k^{rel,d} \sum_i (1 - \delta_{i,k}^{known}) w_{i,k}^{ptf,eff}$$

Therefore, $$R_k^{rel,d} = \frac{R_k^{rel} - \sum_i \delta_{i,k}^{known} w_{i,k}^{ptf,eff} R_{k,i}^{rel,u}}{\sum_i (1 - \delta_{i,k}^{known}) w_{i,k}^{ptf,eff}}$$

The system/object 1 target setting can e.g. comprise for the input parameter values: $V_i^{\tau_k}$: portfolio volumes for absolute targets. The output parameter values can e.g. comprise (i) $R_{c,k}^{abs}$: company indicator absolute target for indicator k; (ii) $R_{c,k}^{rel}$: company indicator relative target for indicator k. The parameter used comprise e.g. (i) Targets:

$$R_{k,t_c,\alpha_c,r_c^{geo},r_c^{mat},f_c^{ind},f_c^{lob}}^{rel,t};$$

(ii) Categories, with:
t: Type of re-/insurance company, t∈ {Insurance company, Mutual, Reinsurance company, Insurance Association, Regulator, Bank} out of which Banks, Regulators and Insurance Associations might have no goals initially
α: Affinity group, defined together with ICMIF
$r^{geo}$: Region, $r^{geo}$∈ {North America, Latin America, EMEA, APAC, Global}
$r^{mat}$: Region, $r^{mat}$∈ {Mature, Emerging, Global}
$f^{ind}$: Industry focus
$f^{lob}$: Line of business focus
The generation of the relative allocation can e.g. be given by the lookup in a sparse matrix:

$$R_{c,k}^{rel} = R_{k,t_c,\alpha_c,r_c^{geo},r_c^{mat},f_c^{ind},f_c^{lob}}^{rel,t}.$$

The generation of the absolute allocation can e.g. be derived by the combination rule for sparse matrix by multiplying the relative targets with a volume: $R_{c,k}^{abs} = R_{c,k}^{rel} \cdot \Sigma_i V_i^{\tau_k} f_{i,k}^{mat}$. The materiality factor $f_{i,k}^{mat} = 1$ will be generated.

Use the global targets and allocations results (or equivalent) and allocate them further, for the absolute allocation. These results likely will refer to underlying operations and they need to be linked to a risk-transfer structure 4 via attribution, (e.g., the $CO_2$ emissions targets, as e.g. set by IMO (International Maritime Organization)). It is clear, that any other settings are also imaginable. The influence of changes in management is not trivial. For example, it can be required to monitor the development closely and actively, bringing in the recipe for break down.

The generation of the attribution parameter vales can be demonstrated in the example of the carbon parameter values generation e.g. processed by a module for generating weighted average carbon intensities and beyond. As user input parameter vales, the following can e.g. be used:
(i) User transmission rates (volume split of portfolio i into categories γ) in terms of volume type $\tau_j^{lever}$ (may be sparse): $L_{j,i,\tau_j^{lever},\gamma}^u$;
(ii) User indicator intensities, e.g., carbon intensities (may be sparse):

$$I_{k,j,\gamma,i}^u = \frac{\partial K_k^{abs}}{\partial V_{\tau_j^{lever}}}.$$

and
(iii) User intensity rates, e.g., distance travelled by a vehicle in the portfolio (may be sparse): $v_{k,j,\gamma}^u$, The input parameter values can e.g. comprise
Portfolios i (from measuring system 1):
Contexts $l_i$, $r_i$, e.g. Commercial Auto, Japan (from calculator)

Underlying volumes: $V_{i,\tau_j^{lever}}$, e.g. installed energy production capacity insured by the Property portfolio in Japan Mechanisms j, determine the applicable sectors σ, categories γ, and Volume types $\tau_j^{mech}$, $\tau_k^{indicator,ul}$, $\tau_k^{indicator,p}$ (from calculator)

Insurance attributions $A_{j,l_i,r_i}$ (from calculator)

Indicators k (from measuring system 1), determine

Baseline type: $\zeta_k^{indicator}$ (from calculator), $\zeta_k^{indicator} \in \{zero, pos, neg, pos_{gl}, neg_{gl}\}$ Volume type for denominator: $\tau_k^{indicator,ul}$ (from calculator)

Volume type for weight: $\tau_k^{indicator,p}$ (from calculator)

Modeled volume split $$V_{i,\tau_j^{mech},\gamma}^{pm}$$

(from portfolio model—outlook)

The output parameter can e.g. comprise:

Contribution of portfolio i to indicator k: $K_{k,i}^{abs,mc}$

These values are not strictly needed (calculation in calling context is the same):

Contribution of portfolio i via mechanism j to indicator k: $K_{k,j,i}^{abs,mech}$ Relative indicator k of portfolio i: $K_{k,i}^{rel}$ Possibly effective indicator intensity for portfolio i: $l_{k,j,i}^{eff}$ Possibly breakdown of above values into components $\gamma_i$ and amended portfolio split (lever): $L_{j,i,\gamma}$ (no longer sparse)

The parameters used can e.g. comprise:

Components $\gamma_i$ of portfolio i: part of the plug-in (sufficiently homogeneous in terms of intensity)

Sectors σ: part of the plug-in (preferably SASB), can be used to determine default splits and intensities Default indicator intensities $I_{k,j,\gamma,r_i,l_i}^{d}$ (e.g. carbon intensities) for each bucket (j, γ) and type of intensity k (here carbon dioxide equivalent) where j determines the sector, γ determines the group of policy holders sharing a indicator intensity, and the context $r_i$, $l_i$ might affect the default intensities and default transfer rates (e.g. average carbon intensity of a passenger car in the U.S.)

Default transfer rates (i.e., fractions of volume) by context: $L_{j,r,l,\gamma}^{d}$ (e.g., the fraction of wind energy production capacity in Japan of total installed capacity). Note: they are measured in terms of the volume type $\tau_j^{lever}$. These volumes might be calculated from other tabulated values. Outlook: The default sectoral split might be integrated to get the default fractions (from portfolio model-outlook)

Default indicator rates $v_{k,j,\gamma}^{d}$ converting the lever volume type $\tau_j^{lever}$ to the volume type of the tabulated indicator intensity (e.g. the distance travelled by a vehicle, converting the number of vehicles to the total distance travelled)

Global reference transfer rates, indicator intensities, and indicator rates: $L_{j,\gamma}^{r}$, $l_{k,j,\gamma}^{r}$, $v_{k,j,\gamma}^{r}$ As a step 2, the generation can e.g. comprise:

Transfer rates from user (α simplification): Volume split of portfolio i into categories γ in terms of volume measure by category γ applicable to mechanism j (no longer sparse):

$$L_{j,i,\gamma} = L_{j,i,\tau_j^{mech},\gamma}^{u}$$

The difference to standard step 2 is that there is a category and re-scaling is required if user values are merged with defaults.

Transfer rates from user and default:

$$L_{j,i,\gamma} = \delta_{\gamma,j,i} L_{j,i,\tau_j^{mech},\gamma}^{u} + (1 - \delta_{\gamma,j,i}) s_{j,i} L_{j,\gamma,r_i,l_i}^{d}$$

where $$\delta_{\gamma,j,i} = \begin{cases} L_{j,i,\tau_j^{mech},\gamma}^{u} & \text{if } L_{j,i,\gamma}^{u} \text{ is known} \\ s_{j,i} L_{j,\gamma,r_i,l_i}^{d} & \text{else} \end{cases}$$

and $$s_{j,i} = \frac{1 - \sum_\gamma \delta_{\gamma,j,i} L_{j,i,\tau_j^{mech},\gamma}^{u}}{\sum_\gamma (1 - \delta_{\gamma,j,i}) L_{j,\gamma,r_i,l_i}^{d}}$$

Transfer rates from user, default, and indicator rates (note: the subscript volume type is for this)

This value can e.g. be combined from three sources: the user split $$V_{i,\tau_j^{mech},\gamma}^{u},$$

the modeled split $$V_{i,\tau_j^{lever},\gamma}^{pm},$$

and the default split $$L_{r_i,l_i,\tau_j^{mech},\gamma}^{def}$$

using the portfolio underlying volume $V_{i,\tau_j^{mech}}$.

Reference transfer rate: For the time being just the default portfolio split or zero $$L_{j,i,\gamma}^{ref} = \begin{cases} L_{j,\gamma}^{r} & \text{if } \zeta_k^{indicator} \in \{pos_{gl}, neg_{gl}\} \\ L_{j,\gamma,r_i,l_i}^{d} & \text{else} \end{cases}$$

As a step 3, the generation can e.g. comprise:

Indicator rates:

$$v_{k,j,\gamma,i} = \begin{cases} v_{k,j,\gamma,i}^{u} & \text{if } v_{k,j,\gamma}^{u} \text{ is known} \\ v_{k,j,\gamma,r_i,l_i}^{d} & \text{else} \end{cases}$$

Reference indicator rates:

$$v_{k,j,\gamma,i}^{ref} = \begin{cases} v_{k,j,\gamma}^{r} & \text{if } \zeta_k^{indicator} \in \{pos_{g1}, neg_{g1}\} \\ v_{k,j,\gamma,r_i,l_i}^{d} & \text{else} \end{cases}$$

Leverage:
$$\Lambda_{i,j,\gamma} = L_{i,j,\gamma} V_{i,\tau_j^{mech}} A_{j,l_i,r_i},$$
Reference leverage:
$$\Lambda_{i,j,\gamma}^{ref} = L_{i,j,\gamma}^{ref} V_{i,\tau_j^{mech}} A_{j,l_i,r_i}$$
Indicator intensities:

$$I_{k,j,\gamma,i} = \begin{cases} I_{k,j,\gamma,i}^u & \text{if } I_{k,j,\gamma,i}^u \text{ is known} \\ I_{k,j,\gamma,r_i,l_i}^d & \text{else} \end{cases}$$

Portfolio (contribution to) absolute indicator k via mechanism j:

$$K_{k,j,i}^{abs,mech} = \begin{cases} \sum_\gamma \left( \Lambda_{i,j,\gamma} I_{k,j,\gamma,i} v_{k,j,\gamma} - \Lambda_{i,j,\gamma}^{ref} I_{k,j,\gamma}^{ref} v_{k,j,\gamma}^{ref} \right) & \text{if } \zeta_k^{indicator} \in \{pos, pos_{g1}\} \\ -\sum_\gamma \left( \Lambda_{i,j,\gamma} I_{k,j,\gamma,i} v_{k,j,\gamma} - \Lambda_{i,j,\gamma}^{ref} I_{k,j,\gamma}^{ref} v_{k,j,\gamma}^{ref} \right) & \text{if } \zeta_k^{indicator} = \{neg, neg_{g1}\} \\ \sum_\gamma \Lambda_{i,j,\gamma} I_{k,j,\gamma,i} v_{k,j,\gamma} & \text{if } \zeta_k^{indicator} = zero \end{cases}$$

Portfolio (contribution to) absolute indicator (return to step 3):
$$K_{k,i}^{abs,mc} = \Sigma_j K_{k,j,i}^{abs,mech}$$
Portfolio relative indicator (like step 3):

$$K_{k,i}^{rel} = \frac{K_{k,i}^{abs}}{V_{i,\tau_k^{indicator,ul}}}$$

Effective indicator intensity:
$$I_{k,j,i}^{eff} = I_{k,j,\gamma,i} v_{k,j,\gamma}$$
Note that the applicable connection between indicator measure, mechanism, category can e.g. be:
  The default indicator intensities (non-carbon) for mechanisms
  The default indicator intensities (carbon) for categories
  See Glossary document (domain functional model) for more information Further, for the weighted average carbon intensities, e.g., a family of weighted average carbon intensities (WACIs) can be used for applied risk-transfer structures. As weights, the following can e.g. be used:
  Gross written premium (GWP)
  Net written premium
  Limit/sum insured/value/capacity
  Risk capital The measured WACI based on the GWP (Gross Written Premium) can be defined as:

$$WACI = \sum_n \frac{GWP_n}{GWP} \cdot \frac{Em_n}{Rev_n}$$

where $GWP_n$ is gross written premium of the sub-portfolio (transaction) n, and $Rev_n$ and $Em_n$ are the policy holder's scope 1 and 2 CO2 emissions and revenues respectively. In the measuring system 1, this can be achieved in by setting
  WACI: $WACI_i = K_{CO_2,i}^{rel}$
  Baseline type: $\zeta_k^{indicator} = zero$
  Volume type for denominator: $\tau_k^{indicator,ul} = revenue$
  Volume type for weight: $\tau_k^{indicator,p} = premium$
  Volume type the calculation of the footprint $\tau_j^{mech}$ depends on the mechanism (e.g., energy production attaching to installed capacity, means of transportation attaching to numbers of vehicles)

Depending on the information available and used, three representations (A/B/C) emerge. (A) Portfolio emissions-based representation (cf. CRO (Chief Risk Officers) forum). In this representation, the portfolio-internal weighting is based on the $CO_2$ emissions related to each policy, i.e., each portfolio's total carbon footprint is used as a starting point for premium weighting. In the portfolio emissions-based representation, the granularity is: (i) Emissions are calculated for portfolios i, WACIs are calculated across portfolios i: n=i; (ii) Combined revenue $V_{i,revenue}$ of each relevant portfolio i is required; and (iii) Combined premium $V_{i,premium}$ of each relevant portfolio i is required. The advantages are (i) Least amount of policy holder information required; and (ii) Result does not depend on details of coverage within the portfolio. However, the drawbacks are: Partially compliant with CRO recommendation only: Partial use of premium as weight only, premium is not used as portfolio-internal weight. (B) In the Sub-Portfolio emissions-based representation (cf. CRO forum), the portfolios i are broken down into sub-portfolios t. The sub-portfolio-internal weighting is based on the CO2 emissions related to each policy, i.e., each sub-portfolio's total carbon footprint is used as a starting point for premium weighting. The implementation comprises: (i) Emissions are calculated for sub-portfolios ι, WACIs are calculated across sub-portfolios ι∈i and portfolios i: n=ι; (ii) Combined revenue $V_{\iota,revenue}$ of each relevant sub-portfolio ι is required; and (iii) Combined premium $V_{\iota,premium}$ of each relevant sub-portfolio ι is required. The advantages are, inter alia: (i) Intermediate amount of policy holder information required; and (ii) Result does not depend on details of coverage within the sub-portfolio. The drawbacks comprise, inter alia: (i) Partially compliant with CRO recommendation only: Partial use of premium as weight only, premium is not used as sub-portfolio-internal weight; and (ii) Result depends on details of coverage within the portfolio (split into sub-portfolios). (C) In the policy-based (faithful) representation (cf. CRO forum), the portfolios i are broken down into policies ι, i.e. single risk-transfer structures 4. The policy-internal weighting is based on the $CO_2$ emissions of the policy holder, i.e., each policy holder's carbon footprint is used as a starting point for premium weighting. The implementation can e.g. be based on:
  Emissions are calculated for policies ι, WACIs are calculated across policies ι∈i: and portfolios i: n=ι
  Combined revenue $V_{\iota,revenue}$ of each relevant policy ι is required
  Combined premium $V_{\iota,premium}$ of each relevant policy ι is required As advantages the representation can technically be made fully compliant with official recommendations, as e.g. the CRO recommendation: Premium is used as weight throughout. Drawbacks are here that (i) the result depends on details of coverage within the portfolio and sub-portfolio; and (ii) Most amount of policy holder information required. As a variant and as a workaround for faithful representation of CRO forum recommendation without full policy information It can be estimated of both the premium $V_{i,premium,\gamma}^u$ and the underlying risk-transfer structure volume $V_{i,\tau_j^{lever},\gamma}^u$ and setting the sub-levers $v_{k,j,\gamma}^u$ accordingly for each category γ, it is possible to approximate the CRO forum's WACI without detailed policy information. As examples, the levers 105 of a prototype can be given as follows:

| ID | Lever | Attaching to | Lever type | Volume type | Input description |
|---|---|---|---|---|---|
| e | Means of transportation | Underlying | Fraction array | Count | Modal split by means of transportation |
| f | Type of energy production | Underlying | Fraction array | Installed capacity | Split of installed capacity by energy carrier |

Note that "Volume type" is the type of portfolio weight and does not need to be equal to the denominator of the intensity. Regarding the energy production, the carbon emissions of an energy production portfolio (sector: energy production) can be measured. Intensities are given in terms of revenue or installed capacity or the like. It is to be noted

| Categories (j, σ, γ) | | | Default fraction in Japan $v_{i,j,\gamma}$ | Carbon intensity $I_{k,j,\gamma}$ | Unit |
|---|---|---|---|---|---|
| Lever j | Sector σ | Component γ | | | |
| Type of energy production | Energy production | Electricity: coal | | Huge | t CO$_2$ equiv./MWh |
| Type of energy production | Energy production | Electricity: wind | | Negligible | t CO$_2$ equiv./MWh |
| Type of energy production | Energy production | Electricity: solar | | Negligible | t CO$_2$ equiv./MWh |
| Type of energy production | Energy production | Electricity: gas combined | | Large | t CO$_2$ equiv./MWh |
| Type of energy production | Energy production | Electricity: nuclear | | Small | t CO$_2$ equiv./MWh |
| ... | ... | ... | ... | ... | ... |
| Type of energy production | (multiple) | Total | 100% | | t CO$_2$ equiv./MWh |

For commercial motor risk-transfer, the carbon emissions caused by the policy holders of a motor portfolio (sector transportation commercial) can e.g. be given by the intensities in terms of revenue:

| Categories (j, σ, γ) | | | Default fraction in Japan $v_{i,j,\gamma}$ | Carbon intensity $I_{k,j,\gamma}$ | Unit |
|---|---|---|---|---|---|
| Lever j | Sector σ | Component γ | | | |
| | Transportation commercial | Car conventional | | | |
| | Transportation commercial | Car hybrid | | | |
| | Transportation commercial | Bus | | | |
| ... | | | | | |

For personal motor risk-transfer, the intensities in terms of person-kilometer or policy holder or whatever can be given as follows:

| Categories (j, σ, γ) | | | Default fraction in Japan $v_{i,j,\gamma}$ | Carbon intensity $I_{k,j,\gamma}$ | Unit |
|---|---|---|---|---|---|
| Lever j | Sector σ | Component γ | | | |
| | Transportation personal | Car conventional | | | |
| | Transportation personal | Car hybrid | | | |
| | Transportation personal | Car pool | | | |
| | Transportation personal | Motor cycle | | | |
| ... | | | | | |

For modelling reinsurance risk-transfer structures, association, and regulator top-down there are readily available categories from the systems as line of business, region, and type of agreement. These are proxies, but combined, they are useful having the following impacts:

Quantitative: Information is available from the systems (for and beyond Specialty Re)

Qualitative, macro: From the region, both the unbiased composition of the markets and some average ESG performance by industry are known Qualitative, top-down: From the region and line of business, the underwriting appetite can be assessed Qualitative, bottom-up: From a comparison of the facultative book with the macro view, the treaty business can be assessed in collaboration with underwriting The data sources can be selected per indicator 123 at (i) Company Level (ESG); (ii) Portfolio level (identification of companies, categorization of portfolio, allocations); and (iii) Data source country level (statistics). Separating between contribution and no harm and aggregating onto those two criteria instead of individual SDGs 121/1211 does not replace a detailed multidimensional footprint. It however leads to actionable insight when drilling into the reasons. The contribution/no harm aggregation is based on four principles: (1) Each indicator 123 measures just one aspect, so a portfolio might contribute to an SDG 121/1211 via one indicator 123 and harm it via another one Example: Withdrawing from coal mining will improve "SDG 13" via carbon footprint, but depending on the region, it might harm "SDG 1" via increased structural unemployment; (2) Setting a baseline/threshold: Positive (contribution)/negative (harm). The mechanisms are outlined below. Example: Below average carbon footprint improves overall footprint, above average harms the footprint (baseline). Example: Insuring people in poverty always contributes to the insuring low-income people indicator, but a portfolio mainly insuring wealthy people does not contribute enough; (3) Common scale for score. Positive (contribution)/negative (harm). The mechanisms are outlined in Step 4. See examples above; and (4) Aggregation and drill-in (extension to Step 5): See below. Example: Withdrawing from coal mining will move the portfolio towards the upper left. Filtering and/or drilling into the point reveals that "SDG 13" is contributing more, "SDG 1" is harming more.

Figure 10:
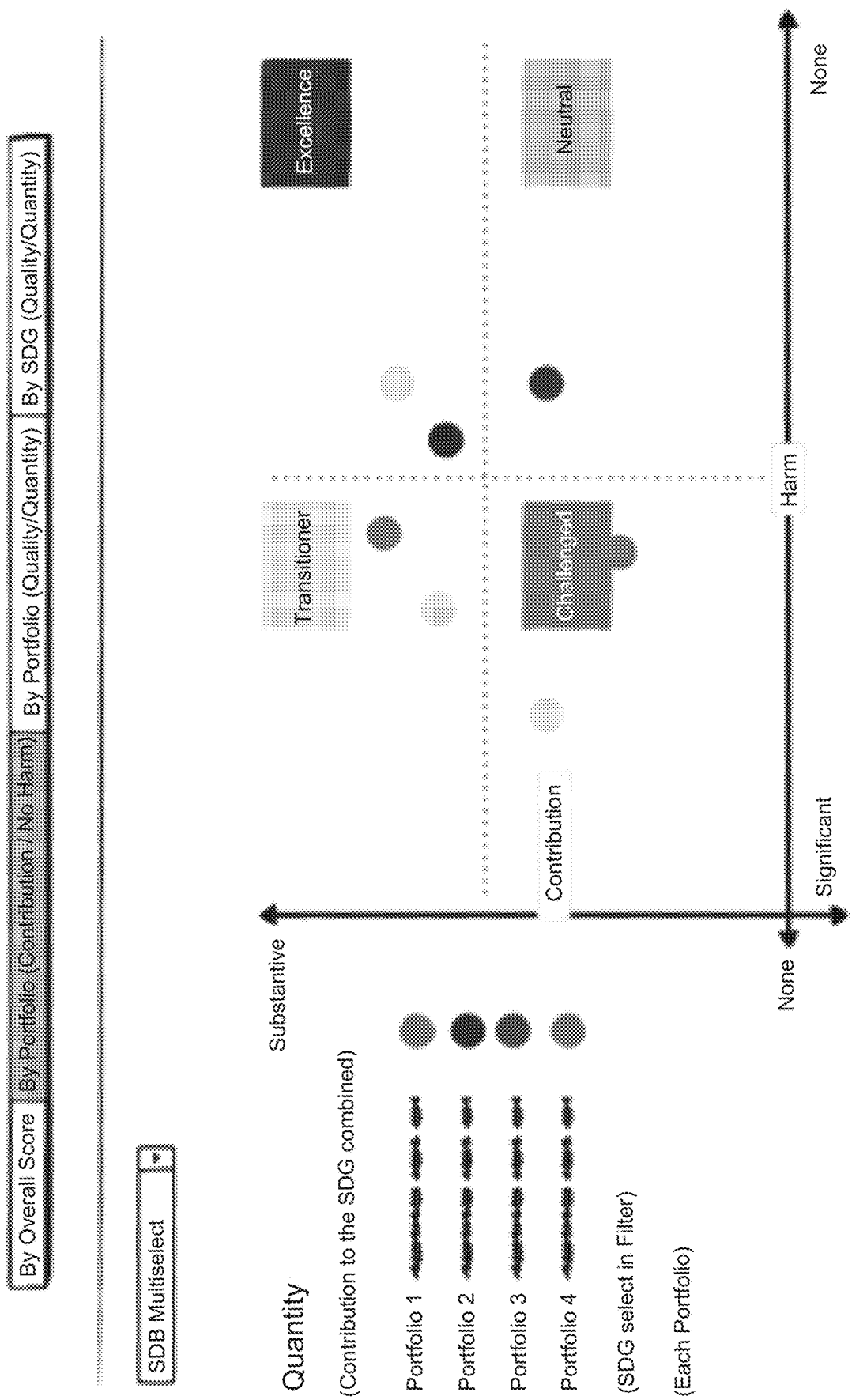
FIG. 10 shows a diagram illustrating schematically an exemplary illustration of the SDG 121 contribution/no harm. Regarding range, threshold, and baseline setting, a positive score represents a contribution, a negative score represents harm to an SDG 121.

FIG. 10 is an illustration of the SDG 121 contribution/no harm. Regarding range, threshold, and baseline setting, a positive score represents a contribution, a negative score represents harm to an SDG 121. See Steps 3 and 4. The threshold between contribution and no harm is determined by (i) the baseline (set at Step 3) based on the baseline type $\zeta_k^{indicator}$ (if $\zeta_k^{indicator} \neq$ zero, e.g. carbon); and (ii) the threshold (applied at Step 4) based on the threshold indicator—reference ratios $s_k^{abs}$ and $s_k^{rel}$ (if $\zeta_k^{indicator}$=zero). The range gets constrained to the relevant range at Step 4 based on the contribution/no harm flags $\delta_k^{Contribution}$ and $\delta_k^{NoHarm}$.

The contribution/no harm score aggregation extends the Step 5, having e.g. the input parameters as shown under Step 5. The output parameter values can e.g. be given by (i) contribution/no harm scores by portfolio i: $S_{*,i}^{abs,Contribution}$, $S_{*,i}^{rel,Contribution}$, $S_{*,i}^{abs,NoHarm}$, $S_{*,i}^{rel,NoHarm}$; and (ii) contribution/no harm scores by SDG s: $S_{s,*}^{abs,Contribution}$, $S_{s,*}^{rel,Contribution}$, $S_{s,*}^{abs,NoHarm}$, $S_{s,*}^{rel,NoHarm}$. For the generation processing the aggregated contribution/no harm scores by portfolio, both allocation types (any ∈ {abs,rel}) can e.g. be given by the linkage:

$$S_{s,i}^{any,Contribution} = S^{thr} + \sum_{k\in\{indicators\,in\,s\}} \min\left((S_{k,i}^{any} - S^{thr})w_k^{indicator}, 0\right)$$

$$S_{*,i}^{any,Contribution} = \sum_s S_{s,i}^{any,Contribution} w_s^{SDG}$$

$$S_{s,i}^{any,No\,Harm} = S^{thr} + \sum_{k\in\{indicators\,in\,s\}} \max\left((S_{k,i}^{any} - S^{thr})w_k^{indicator}, 0\right)$$

$$S_{*,i}^{any,No\,Harm} = \sum_s S_{s,i}^{any,No\,Harm} w_s^{SDG}$$

And the aggregated scores by SDG 121, both allocation types (any ∈ {abs,rel}) can e.g. be given by the linkage:

$$S_{k,*}^{any,Contribution} = S^{thr} + \sum_i \min\left((S_{k,i}^{any} - S^{thr})w_{i,k}^{ptf,eff}, 0\right)$$

$$S_{k,*}^{any,No\,Harm} = S^{thr} + \sum_i \max\left((S_{k,i}^{any} - S^{thr})w_{i,k}^{ptf,eff}, 0\right)$$

$$S_{s,*}^{any,Contribution} = \sum_{k\in\{indicators\,in\,s\}} S_{k,*}^{any,Contribution} w_k^{indicator}$$

$$S_{s,*}^{any,No\,Harm} = \sum_{k\in\{indicators\,in\,s\}} S_{k,*}^{any,No\,Harm} w_k^{indicator}$$

Regarding the weights, it should be noted that (i) the indicator $w_k^{indicator}$ and SDG $w_s^{SDG}$ weights (user inputs) are not rescaled, consistently with Step 5; and (ii) the portfolio effective weights $w_{i,k}^{ind,eff}$ are rescaled in Step 5 to account for portfolios where an indicator is not applicable (see portfolio indicator contribution flag $\delta_{k,i}^{indicator}$ defined in Step 4). There are two options here: (1) Do not further rescale: If an indicator is applicable but cannot contribute or harm, it nevertheless remains relevant to the portfolio. This may make it impossible to reach a score of $S^{high}$ or $S^{low}$ in some cases; and (2) Do rescale where an indicator would be applicable to a given portfolio but not to either contribution or harm, whichever is relevant. This corresponds to an indicator effectively not existing for contribution/harm which is more compelling but results in different weights for the same indicator, depending on whether it contributes to contribution or to harm.

Though there is no "right" or "wrong" answer here, in the formula framework, option 1 exemplarily is chosen. For a possible mapping to the domain model and display of the quadrants, the mapping can e.g. be given by:

| Visual | | Points | | Coordinates of points | |
|---|---|---|---|---|---|
| Page | Graph | Entity | ID | x-axis | y-axis |
| Contribution/ No harm By portfolio | Quantity Quality Contribution No harm | Portfolio footprint | i i | $S_{*,i}^{abs,NoHarm}$ $S_{*,i}^{rel,NoHarm}$ $S_{*,i}^{rel,Contribution}$ $S_{*,i}^{rel,NoHarm}$ | $S_{*,i}^{abs,Contribution}$ $S_{*,i}^{rel,Contribution}$ $S_{*,i}^{abs,Contribution}$ $S_{*,i}^{abs,NoHarm}$ |
| By SDG | Contribution No harm | SDG footprint | s | $S_{s,*}^{rel,Contribution}$ $S_{s,*}^{rel,NoHarm}$ | $S_{s,*}^{abs,Contribution}$ $S_{s,*}^{abs,NoHarm}$ |

The measuring system 1's technical methodology and background can be based on a domain model comprising (1) a domain information model structure, (2) a domain functional model structure, and (3) a handling of identity and time. The domain information model structure, comprises a entity taxonomy consisting of three levels, namely (i) Bounded contexts (groups of entities mainly for information integration and overview); (ii) Entities (the building blocks—translated to groups of tables and classes); and (iii) Attributes (the properties of the entities—translated to variables, constants and table columns) The following can e.g. describe the domain information model structure: (i) The conceptual information model structure, depicting the entities and relationships; (ii) A listing of the key entities and attributes with definitions, descriptions, bounded context, and type of entity.

Figure 11:
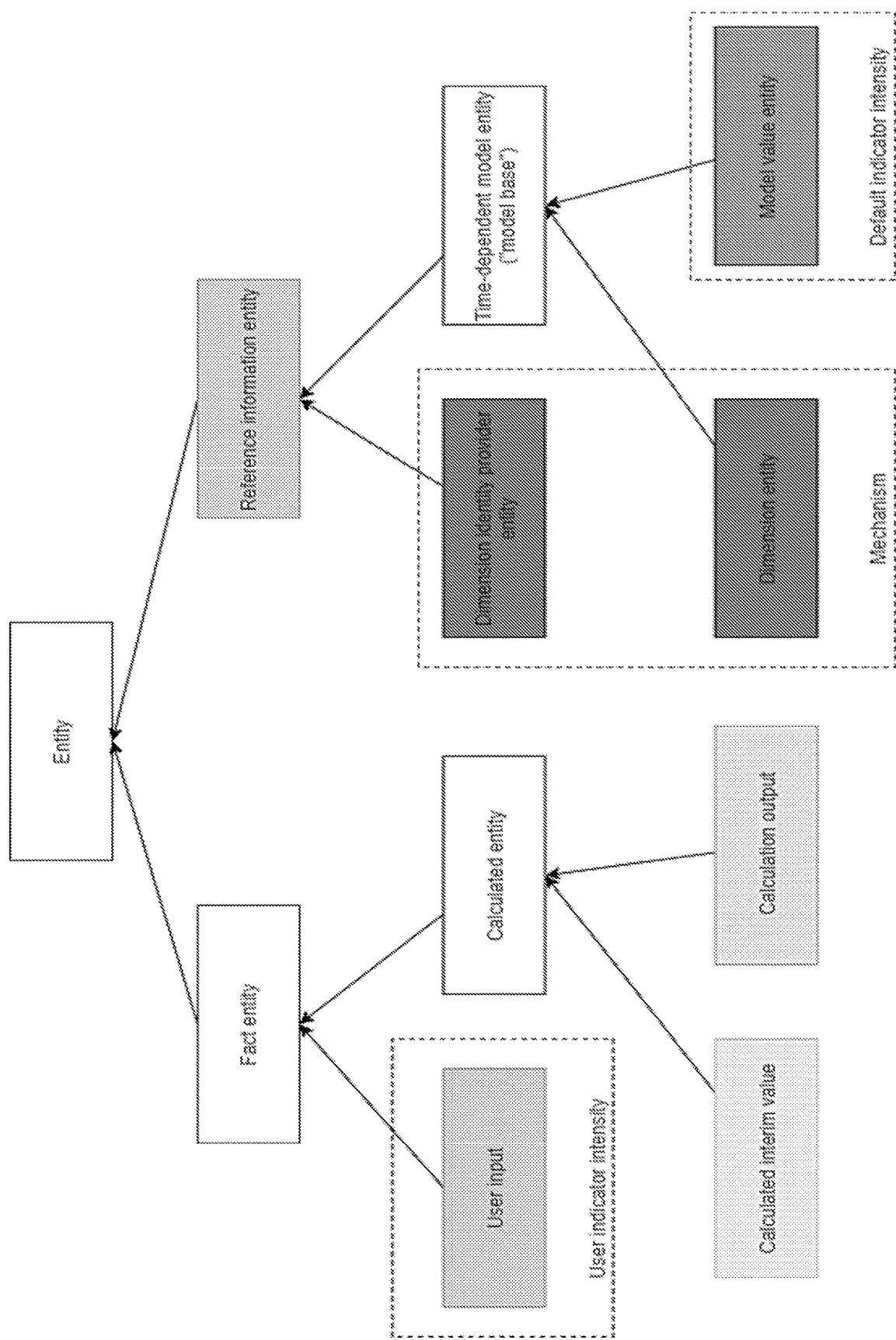
FIG. 11 shows a block diagram illustrating schematically an exemplary structure regarding the bounded contexts and entities, as the bounded contexts are intended to incorporate more information seamlessly. They can e.g. be given as illustrated with the entities shown in FIG. 11.

FIG. 11 show a diagram illustrating an information model structure containing different types of entity. The color code denotes the type of entity and is used throughout this specification. The domains denote the source and area of the data, e.g. as follows:

| Domain | Type | Color | Description | Materialization |
|---|---|---|---|---|
| Portfolio | User input | Blue | Insurance portfolio size and quality | Data |
| User target | User input | Blue | SDG and business targets | Data |
| SDG calc | Calculation | Gold | Calculation structure and results | Volatile |
| SDG results | Results | Orange | Calculation results | Data |
| Parameters | Reference | Green | Calculation parameters | SC Dimension |
| Analytics | Reference | Green | Analytics results used as parameters | SC Dimension |
| Dimensions | Reference | Green | Dimensions and their properties | SC Dimension |

The persistency layer implements the object-relational maps depending on the materialization: (i) Data: Transaction data, read/write. Versioning scope: top-level entity of the domain; (ii) Volatile: Not persisted; and (iii) SC Dimension: Slowly changing dimension, read-only from the perspective of the application.

Figure 12:
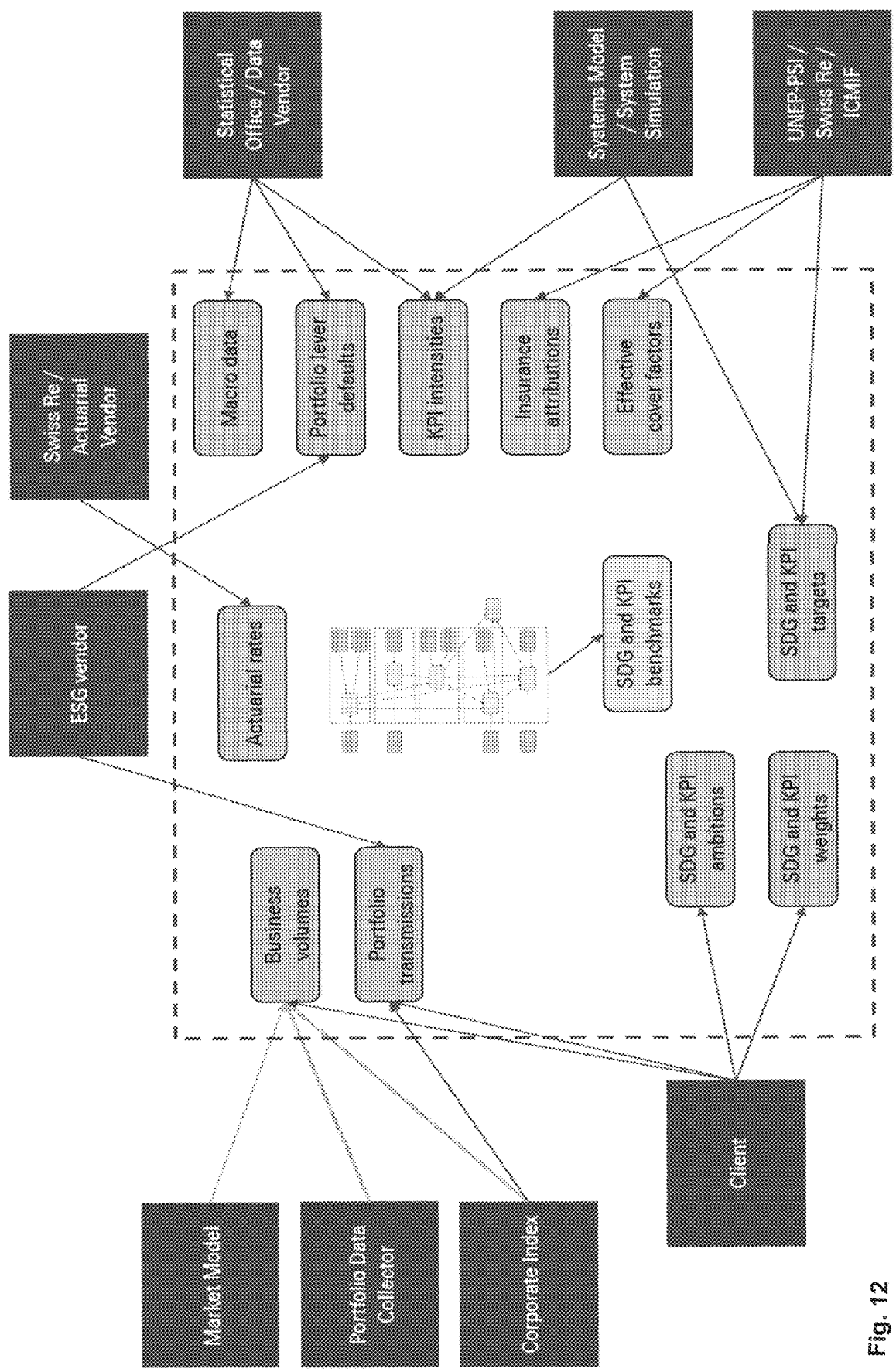
FIG. 12 shows a block diagram illustrating schematically an exemplary information model structure containing different types of entity.
Figure 13:
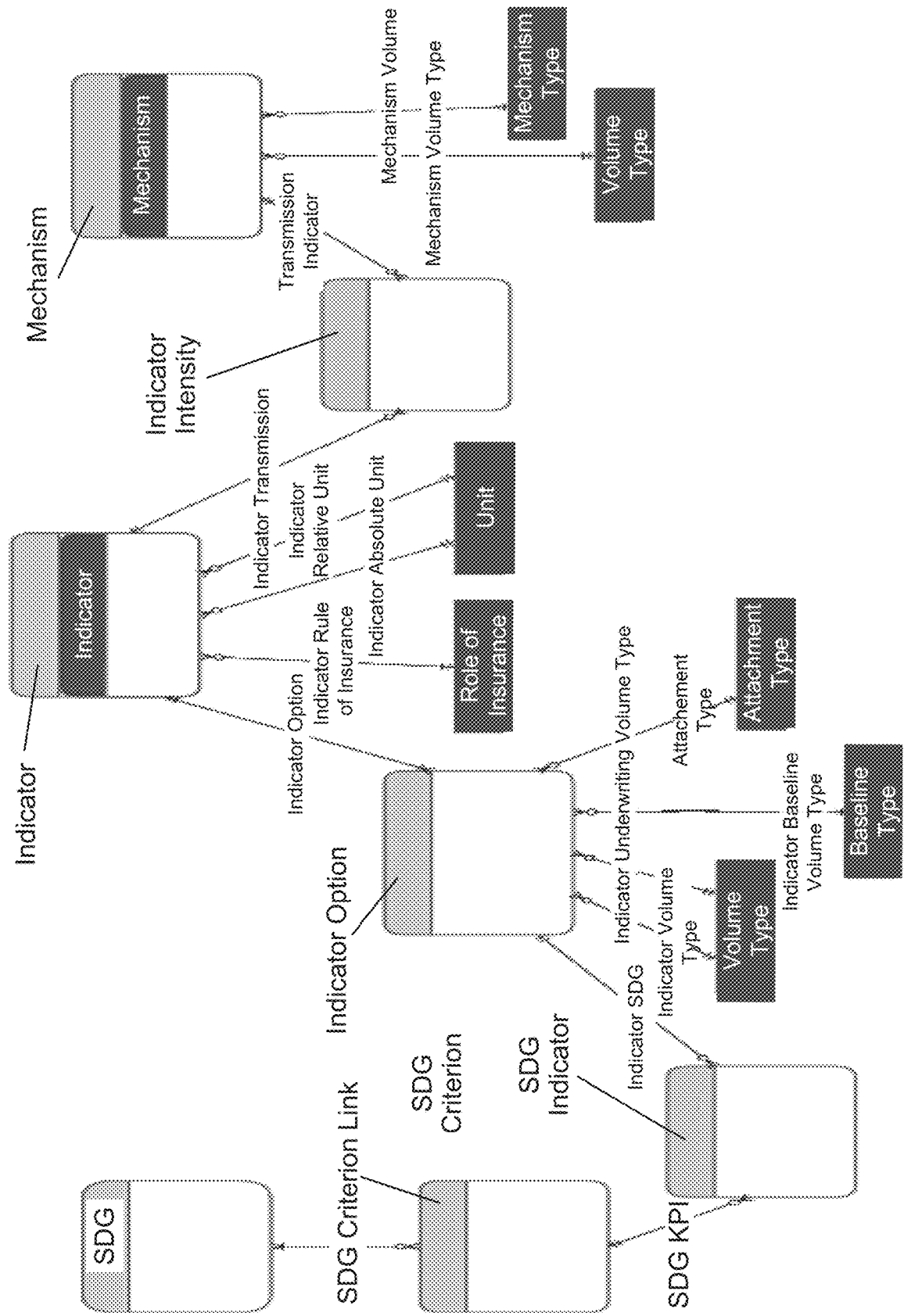
FIGS. 13 to 15 show block diagrams illustrating schematically an exemplary overview of the measuring system 1 conceptual information model structure in the context of the used entities and attributes. In particular, FIG. 14 provides an exemplary overview of the measuring system 1's reference information structure, while FIG. 15 provides an exemplary overview of the measuring system 1's aggregated risk-transfer structures (portfolio) information structure.
Figure 14:
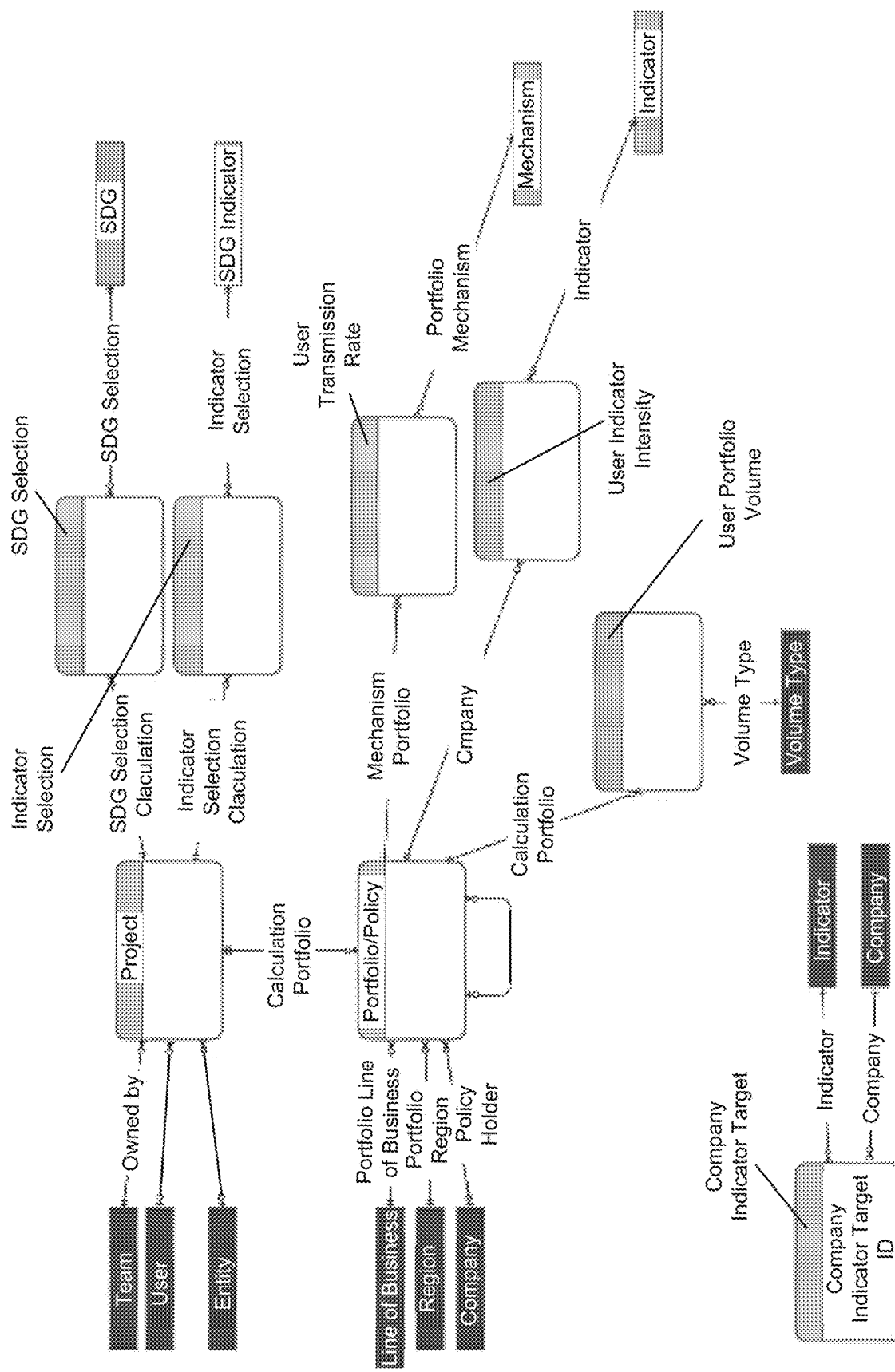
Figure 15:
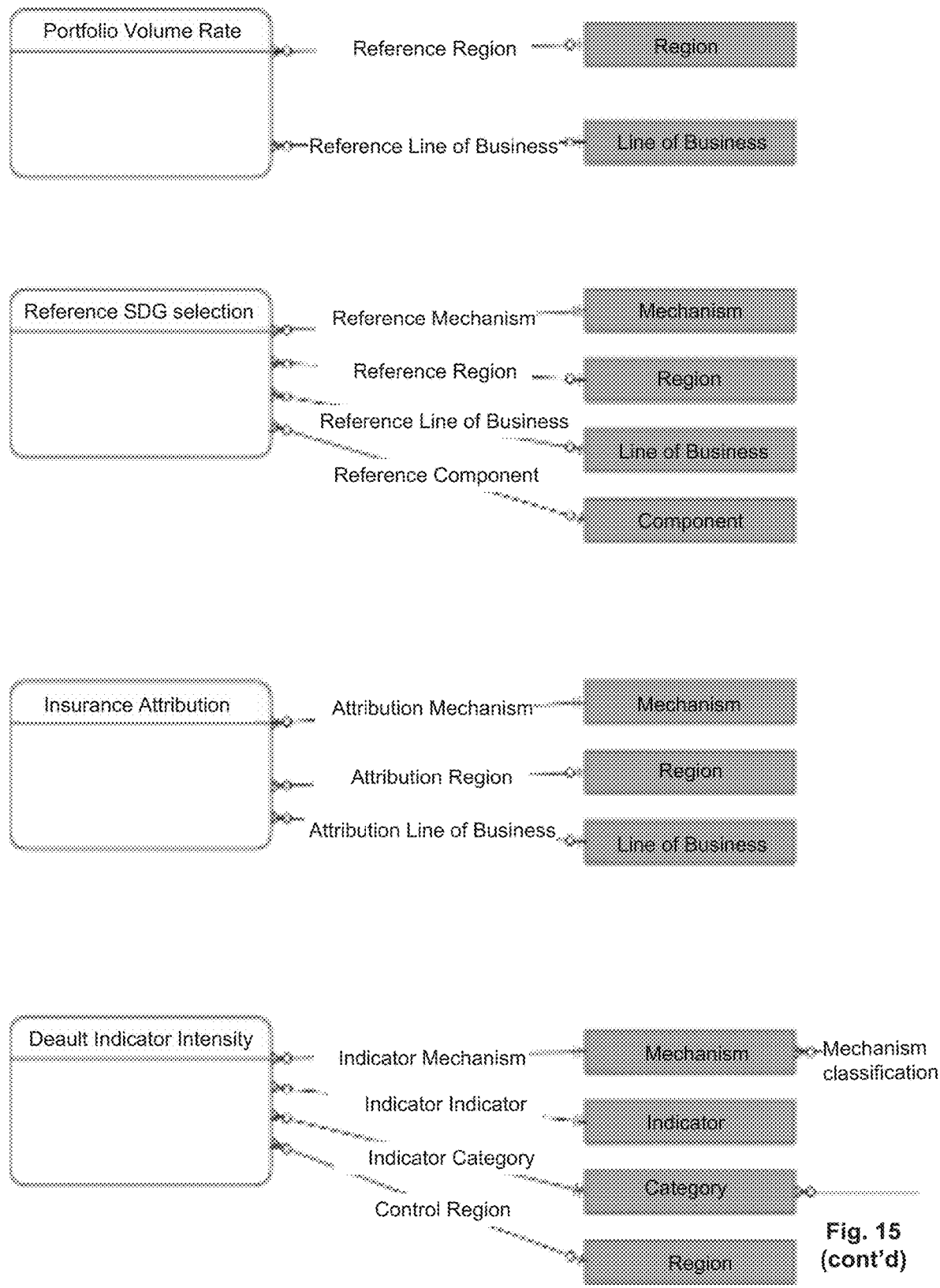
Figure 15:
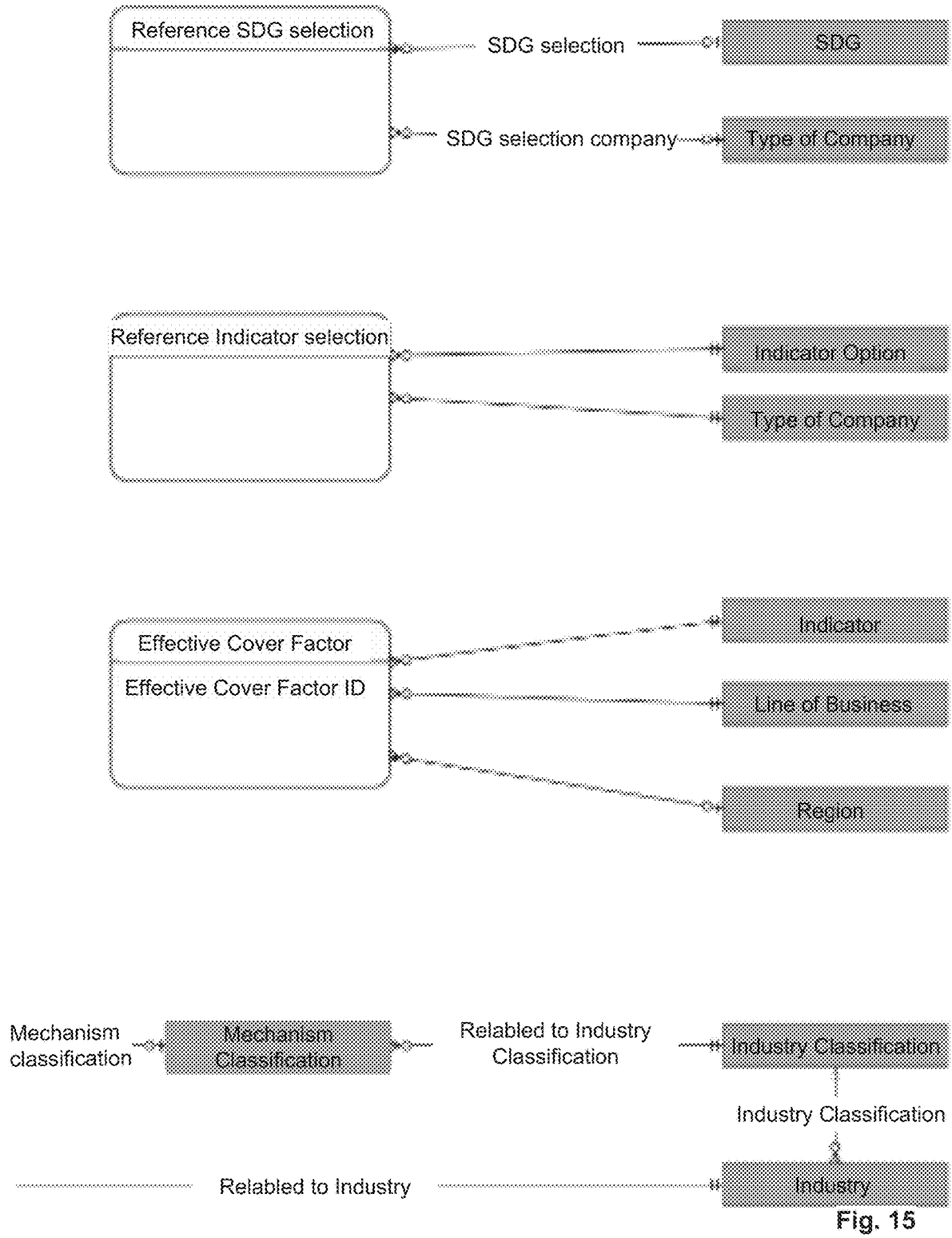

Regarding the bounded contexts and entities, the bounded contexts are intended to incorporate more information seamlessly. They can e.g. be given as illustrated with the entities below. An exemplary broader view is taken by FIG. 12. Regarding the entities and attributes, FIGS. 13 to 15 give an exemplary overview of the measuring system 1 conceptual information model structure. In particular, FIGS. 13 and 15 provide an exemplary overview of the measuring system 1's reference information structure, while FIG. 14 provides an exemplary overview of the measuring system 1's aggregated risk-transfer structures (portfolio) information structure. The attributes are grouped by entity and bounded context. The symbols are used consistently throughout description. The convention for each symbol is the same: $D_i^{specifier}$ where D denotes the type of variable (e.g., volume, volume type, indicator, etc.), specifier indicates the specific variable (e.g., volume by count, volume type of a mechanism, absolute indicator by SDG and portfolio, etc.), and the subscript denotes the instance of the variable (e.g., the volume of the first portfolio, the volume type of the second mechanism, the third indicator of the fourth portfolio). The used dimensions can e.g. be given as follows:

| Meta ID | Entity | Attribute | Symbol | Definition (from/for methods doc) | Description (from/for slides) | Type/ Domain | Named | Introduced in step |
|---|---|---|---|---|---|---|---|---|
| | Portfolio | Portfolio identifier | i | A single policy or a portfolio of policies, which can be split into disjoint sub-portfolios | A collection of underwritten policies grouped with similar characteristic | Identifier | | 1 |
| | Mechanism | Mechanism identifier | j | Mechanism from the insurance operation to the SDG impact | A certain way of leveraging portfolio volume or business figure onto an associated sustainability impact | Dimension identifier | | 2 |
| | Indicator | Indicator identifier | k | Metric that measures the impact of the business on specific aspects of an SDG | A certain metric to measure associated sustainability impacts | Dimension identifier | | 3 |
| | Line of business | Line of business identifier | l | A class or type of insurance (e.g. fire, marine, casualty, etc.) | As convention | Dimension identifier | | 1 |
| | Region | Region identifier | r | Region of insured client/clients | Insured's (or most insured's) region | Dimension identifier | | 1 |
| | Type of volume | Type of volume identifier | $\tau$ | Metric for measuring business activity (e.g. count, premium, amount, revenue, etc.) | A certain type of volume that a portfolio or business activity is measured with | Dimension identifier | | 3 |
| | Role of insurance | Role of insurance identifier | T | Impact of insurance on an SDG: by sustainable insurance cover (direct), by supporting sustainable policy holders (underlying) or by own sustainable operations (operational) | A certain type of impact that insurance is inducing to an associated indicator, either by operation, providing insurance directly, or supporting underlying activity | Dimension identifier | | 3 |
| | Attachment type | Attachment type identifier | a | Type of link between an indicator and a mechanism. This entity captures which types exist in the model: indicator determined by transfer rate (independent of volume) or transferred value. | Impact type being transferred (transfer rate or transferred value) | Dimension identifier | | 3 |
| | Component | Component identifier | $\gamma$ | Criterion through which a mechanism is enacted (e.g. energy production through photovoltaics) | A collection of segments with different indicator intensities that associate with a mechanism and an industry | Dimension identifier | | 2. carbon |
| | Company | Company identifier | c | Unique way to identify a company within a portfolio | As convention | Dimension identifier | | 4. target |
| | Commitment | Commitment identifier | y | | The initiative/ organization/principle that defines the source of target or baseline or weight | Dimension identifier | | |

The context can e.g. be illustrated by the following table:

| Meta ID | Entity | Attribute | Symbol | Definition (from/for methods doc) | Description (from/for slides) | Type/Domain | Named | Introduced in step |
|---|---|---|---|---|---|---|---|---|
| | Constants | Reference score | $S^{target}$ | Score value which results from indicator value equal target value | A numerical value represents the score if reaching the reference performance | Number | | 4 |
| | Constants | Lowest possible score | $S^{low}$ | | | Number | | 4 |
| | Constants | Highest possible score | $S^{high}$ | | | Number | | 4 |

For users e.g. as stakeholder, it can e.g. be illustrated by the following table:

| Meta ID | Entity | Attribute | Symbol | Definition (from/for methods doc) | Description (from/for slides) | Type/Domain | Named | Introduced in step |
|---|---|---|---|---|---|---|---|---|
| | User Indicator selection | Indicator weight | $w_k^{indicator}$ | Weight of each selected indicator k, such that the sum of all indicator weights is equal to 1. | A relative weight assigned to a certain indicator, suggesting the priority or relevance of this indicator | Number/fraction | | 4 |
| | User SDG selection | SDG weight | $w_s^{SDG}$ | Weight of each selected SDG s, such that the sum of all SDG weights is equal to 1. | A relative weight assigned to a certain SDG, suggesting the priority or relevance of this SDG | Number/fraction | | 4 |
| | Company indicator target | Company indicator absolute target | $R_{c,k}^{abs}$ | Absolute numerical target for indicator k and company c | A numerical target that suggests the goal or best scenario performance in terms of a certain indicator value in absolute format, set by the user company | Number | | 4. target |
| | Company indicator target | Campany indicator relative target | $R_{c,k}^{rel}$ | Relative numerical target for indicator k and company c | A numerical target that suggests the goal or best scenario performance in terms of a certain indicator value in relative format, set by the user company | Number | | 4. target |
| | Portfolio indicator target | Portfolio indicator absolute target | $R_{i,k}^{abs}$ | Absolute numerical target for indicator k and portfolio i | A numerical target that suggests the goal or best scenario performance in terms of a certain indicator value from a certain portfolio in absolute format, set by the user company | Number | | 4. target |
| | Portfolio indicator target | Portfolio indicator relative target | $R_{i,k}^{rel}$ | Relative numerical target for indicator k and portfolio i | A numerical target that suggests the goal or best scenario performance in terms of a certain indicator value from a certain portfolio in relative format, set by the user company | Number | | 4. target |

For risk-transfer systems e.g. as insurance systems, it can e.g. be illustrated by the following table:

| Meta ID | Entity | Attribute | Symbol | Definition (from/for methods doc) | Description (from/for slides) | Type/Domain | Named | Introduced in step |
|---|---|---|---|---|---|---|---|---|
| | Default volume rate | Premium rate | $R_{l,r}^{pr}$ | Default premium rate by line of business l and region r | Rate to derive one type of business volume from another | Number: Reference value/Monetary amount | | 1 |

| Meta ID | Entity | Attribute | Symbol | Definition (from/for methods doc) | Description (from/for slides) | Type/Domain | Named | Introduced in step |
|---|---|---|---|---|---|---|---|---|
| | Effective cover factor | Effective cover factor | $E_{k,l,r}$ | For each line of business l and region r, portfolio effectiveness in covering indicator k (it ranges from 0 to 1) | The effectiveness of a certain portfolio (if direct impact then <1) covering for an associated indicator (to avoid double-counting) | Number | | 4 |
| | Insurance attribution | Insurance attribution | $A_{j,l,r}$ | For each line of business l and region r, insurance cover's contribution to the success of the underlying operations corresponding to mechanism j | The ratio of the transmitted impact (if underlaying impact then <1) that should be credited to the insurer | Number | | 3 |

For the defined goal, also referred as measures, this can e.g. be illustrated by the following table:

| Meta ID | Entity | Attribute | Symbol | Definition (from/for methods doc) | Description (from/for slides) | Type/Domain | Named | Introduced in step |
|---|---|---|---|---|---|---|---|---|
| | Indicator option | Indicator volume type | $\tau_k^{indicator,p}$ | Way of measuring size of insurance coverage (e.g. premium) for indicator k | A certain type of volume that an indicator is measured with | Type | | 3 |
| | Indicator option | Indicator underlying volume type | $\tau_k^{indicator,ul}$ | Way of measuring size of covered underlying (e.g. revenue) for indicator k | A certain type of volume that size of the portfolio is measured with for a certain indicator | Type | | 3 |
| | Indicator option | Baseline type | $\zeta_k^{indicator}$ | Baseline for indicator k (it can be zero, positive or negative) | | | | |
| | Indicator option | Threshold indicator ratio | $s_k^{thr,abs}$ $s_k^{thr,rel}$ | Threshold ratio for each indicator k (either absolute or relative) setting the boundary between harmful and contributing | | | | |
| | Indicator | Indicator role of insurance | $T_k^{indicator}$ | For indicator k, specifies the role of insurance (e.g. direct, operational, underlying impact) | The type of impact that insurance is inducing to an associated indicator | Type | | 3 |
| | Indicator | Indicator attachment type | $a_k$ | A particular indicator's type of link between the indicator and a mechanism. This attribute determines which value is applicable to the indicator. | Transfer rate or transferred value | Type | | 3 |

For the mechanism, this can e.g. be illustrated by the following table:

| Meta ID | Entity | Attribute | Symbol | Definition (from/for methods doc) | Description (from/for slides) | Type/Domain | Named | Introduced in step |
|---|---|---|---|---|---|---|---|---|
| | Mechanism | Mechanism volume type | $\tau_j^{mech}$ | Size of insurance coverage for mechanism j | The type of volume that a transmitted impact is measured with | Type | | 3 |
| | Mechanism | Type of mechanism | $\tau_j^{mech}$ | Size of underlying business covered by insurance for mechanism j | | Type | | 3 |
| | Default transfer rate | Default transfer rate value | $L_{j,l,r}^d$ $L_{j,\gamma,l,r}^d$ | For each line of business and region r, default contribution to mechanism j (can be split by mechanism component γ) | Default or pre-calculated rate that transmits the business volume of a certain portfolio through a mechanism to a certain impact | Number | (named) | 22. carbon |

| Meta ID | Entity | Attribute | Symbol | Definition (from/ for methods doc) | Description (from/ for slides) | Type/ Domain | Named | Introduced in step |
|---|---|---|---|---|---|---|---|---|
| | Default transfer rate | Reference transfer rate | $L_{j,\gamma}^{r}$ | Global reference transfer rate (defined above) | | (see $L_{j,\gamma,l,r}^{d}$, with is_reference = 1) | | 2. carbon |
| | User transfer rate | Transfer rate | $L_{i,j}^{u}$ | User defined contribution of portfolio i to mechanism j | User input rate that transmits the business volume of a certain portfolio through a mechanism to a certain impact | Number | | 22. carbon |
| | Default indicator intensity | Indicator intensity | $I_{k,j}^{d}$ $I_{k,j,\gamma,r,l}^{d}$ | Default marginal contribution of business with mechanism type of volume j to indicator k (can be further split by component, region and line of business) | A default or pre-calculated rate that indicates how much a certain mechanism impact is contributing to a certain indictor | Number | | 33. carbon |
| | User indicator intensity | Indicator intensity | $I_{k,j,\gamma}^{u}$ | User-defined marginal contribution of business with mechanism type of volume j to indicator k (further split by component) | A user input rate that indicates how much a certain mechanism impact is contributing to a certain indictor | Number | | 3. carbon |
| | Default indicator rate | Indicator rate | $v_{k,j,\gamma,r,l}^{d}$ | | | | | |
| | User indicator rate | Indicator rate | $v_{k,j,\gamma}^{u}$ | | | | | |

For the impact, this can e.g. be illustrated by the following table:

| Meta ID | Entity | Attribute | Symbol | Definition (from/for methods doc) | Description (from/ for slides) | Type/ Domain | Named | Introduced in step |
|---|---|---|---|---|---|---|---|---|
| | SDG Impact | Indicator absolute allocation | $K_{k,i}^{abs}$ $K_{k}^{abs}$ | Absolute value of indicator k for portfolio i (can be aggregated over all portfolios) | A numerical result indicating the actual absolute performance according to a certain indicator | Number | | 35 |
| | SDG Impact | Indicator relative allocation | $K_{k,i}^{rel}$ $K_{k}^{rel}$ | Relative value of indicator k for portfolio i (can be aggregated over all portfolios) | A numerical result indicating the actual relative performance according to a certain indicator | Number | | 35 |
| | SDG Impact | Score absolute allocation | $S_{s,i}^{abs}$ $S_{*,i}^{abs}$ $S_{k,*}^{abs}$ $S_{s,*}^{abs}$ $S_{*,*}^{abs}$ | Score obtained by comparing the indicator value with an absolute target (can aggregated over indicator k, SDG s and/or portfolio i) | A score indicating the performance comparing to certain absolute target according to a certain indicator | Number | | 45 |

| Meta ID | Entity | Attribute | Symbol | Definition (from/for methods doc) | Description (from/for slides) | Type/Domain | Named | Introduced in step |
|---|---|---|---|---|---|---|---|---|
| | SDG Impact | Score relative allocation | $S_{s,i}^{rel}$ $S_{*,i}^{rel}$ $S_{k,*}^{rel}$ $S_{s,*}^{rel}$ $S_{*,*}^{rel}$ | Score obtained by comparing the indicator value with the maximum achievable value within the business (can aggregated over indicator k, SDG s and/or portfolio i) | A score indicating the performance comparing to certain relative target according to a certain indicator | Number | | 45 |

For the interim generated values of the impact, this can e.g. be illustrated by the following table:

| Meta ID | Entity | Attribute | Symbol | Definition (from/for methods doc) | Description (from/for slides) | Type/Domain | Named | Introduced in step |
|---|---|---|---|---|---|---|---|---|
| | | | $w_{i,k}^{ptf,eff}$ | Portfolio effective weight by indicator | | | | |

The outputs of the SDG Calculator are a function of the inputs and the parameters. The domain functional model describes (i) the information dependencies (what—which entities the attributes of an entity depend on), and (ii) the functions (how these attributes of an entity depend on the other entities). The domain functional model consists of 5 main steps e.g. realized comprising plug-in functions. The five functional blocks and the key plug-in functions are given in the Methods document. The resolution of connections determines the relationships which instances of an entity depend on which instances of another entity: (i) Mechanisms which matter to an indicator 123: (a) There exists a path indicator—Default Indicator Intensity 1233 (non-Carbon)—Mechanism with a non-null default intensity; and (b) The default intensity can be zero; (ii) Categories which matter for a mechanism: (a) There exists a path Mechanism—Default Indicator Intensity 1233 (Carbon)—Category with a non-null default indicator intensity 1233 (non-null means there exists an entry and a non-null value); and (b) The default intensity 1233 can be zero; (iii) Categories which matter for a mechanism and a given indicator 123: There exists a path mechanism—(indicator 123—default indicator intensity 1233)—Category; (iv) Industry classifications which matter for a given category: There exists a path Category—Industry—Industry Classification; and (v) Indicators 123 doing contribution/harm to an SDG 121: There exists a connection Indicator 123 Selection—Indicator 123 Option—SDG 121 Contribution—SDG 121—SDG 121 Selection (aggregation groups by SDG s, aggregating over indicators k, getting $\delta_k^{Contribution}$ and $\delta_k^{NoHarm}$ from SDG Contribution).

Figure 16:
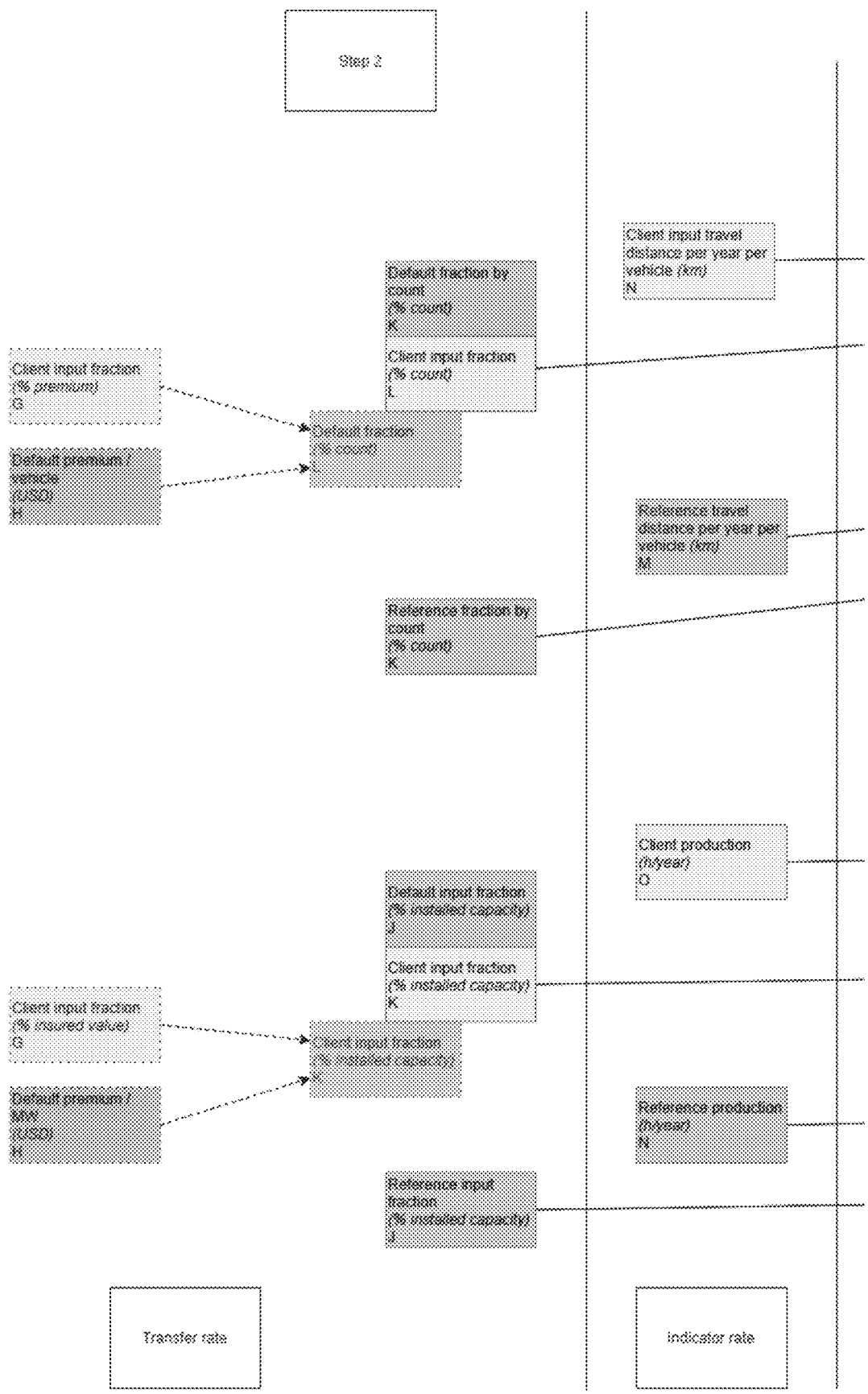
FIG. 16 shows a block diagram illustrating schematically exemplary functional dependencies based on the example of the carbon parameter generation. Three entities are used to bring the values of the carbon parameter generation to a comparable form: Transfer rate, Indicator rate, and Indicator intensity. The functional dependencies of the carbon parameter generation are shown in FIG. 16. The methodology is explained below: the carbon parameter generation can e.g. comprise a plug-in or other functional module implemented for weighted average carbon intensities and beyond.
Figure 16:
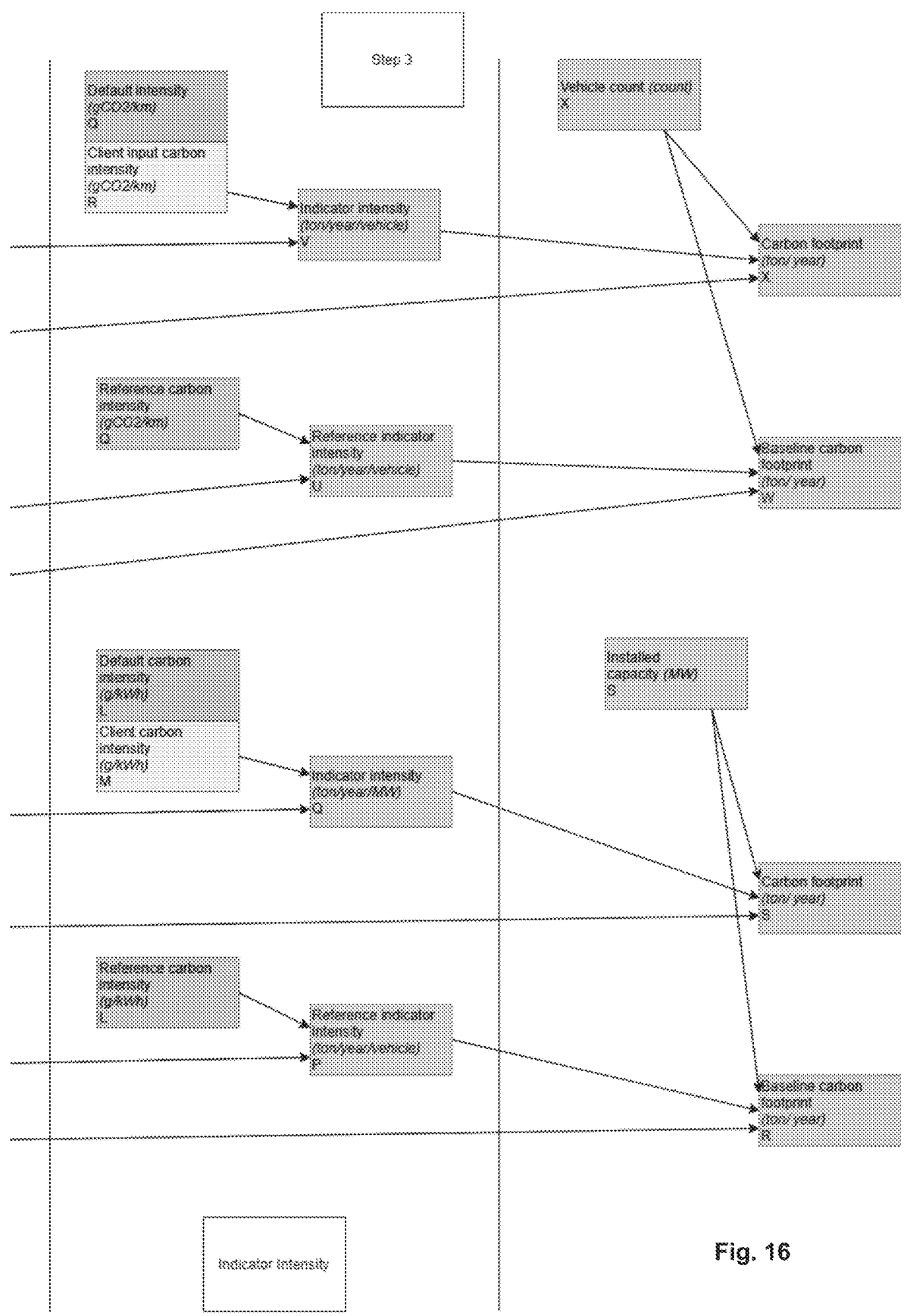

For the example of the carbon parameter generation, the functional dependencies are illustrated by FIG. 16. Three entities are used to bring the values of the carbon parameter generation to a comparable form: Transfer rate, Indicator rate, and Indicator intensity. The functional dependencies of the carbon parameter generation are shown in FIG. 16. The methodology is explained below: the carbon parameter generation can e.g. comprise a plug-in or other functional module implemented for weighted average carbon intensities and beyond. In the handling of time and identity, these are slowly changing dimensions, since in the area of sustainability, long time scales matter. In order to account for a changing world during these time scales, and to account for a changing knowledge about it, the entries in each reference information entity can e.g. be identified by (i) the identifying dimensions, (ii) a validity time span (valid from/valid to), and (iii) a time of knowledge reflected by the model version. A bitemporal extension of slowly changing dimensions (SCD) type 2 with separate entity providers can e.g. be used. The selection of an instance of a reference entity follows this skeleton which is the same for all entities derived from a time-dependent entity (model base):

```
select * from entity ent
    where <business_identifiers>=ent.<business_identifiers> and
        <project_date> < ent.valid_to and project_date >=ent.valid_from and
        <project_model_version_id>=ent.model_version_id;
    where
        <business_identifiers> are the dimensions identifying a business context (example:
mechanism identifier),
        <project_date> is the date the business is in force whose SDG footprint is to be
calculated, and
        <project_model_version_id> is the model version the project considers the
relevant state of knowledge.
```

There are two types of reference information entity: D(i) dimension and (ii) model value A dimension entity translates into two tables: (1) Dimension identity provider table (called "Dimension Identity"). This entity does not carry any content other than the identity across time, and (2) Dimension table (called "Dimension"). This entity carries all properties. A generalized example can e.g. be given by:

Time-independent identifiers (sometimes referred-to as SCD type 6).

Bi-temporal extension: Valid from/valid to and model version ID.

The pair (ID, Code) is a bijection and represented in the identity provider table. The primary identifier is the ID.

The tuple (ID, Valid from, Valid to, Model version ID) is the primary identifier of the dimension table.

The tuple (ID1 [, ID2 [,]], Valid from, Valid to, Model version ID) is the primary identifier of a model value table.

Factored-out fast-changing properties (model values).

View "current" as of "current knowledge" (e.g. by mono-temporal snapshot).

Successor where relevant.

For the technical handling of the time, two types of reference entity can be given: (i) Dimension entities have two tables: (a) Identity provider (no time, no content), and (b) Property provider (with time, with content); and (ii) Parameter entities have one table: Identified by multiple dimensions (with time, with content). The selection of time can e.g. be given by:

Two variables of a project:
ProjectDate: Date
ProjectModelVersion: Number

Default selection and behavior of the first release:
If a project is created:
ProjectDate=today( )
ProjectModelVersion=Constants.ModelVersionLatest
If a project is re-opened
ProjectDate=Project.ProjectDate
ProjectModelVersion=Porject.ProjectModelVersion Reference date migration (for second release):
If a project is re-opened and the model version and/or the year has changed, the user enters a dialogue The measuring system 1 comprises implemented the underlying technical structure, especially for the quantification measurements of the impact of aggregated applied risk-transfer structures 44, i.e. the portfolio/container/basket of applied risk-transfer structures, e.g. formally defined by specific underwriting portfolios and policies on the United Nations' Sustainable Development Goals (SDGs) 1211.

Figure 17:
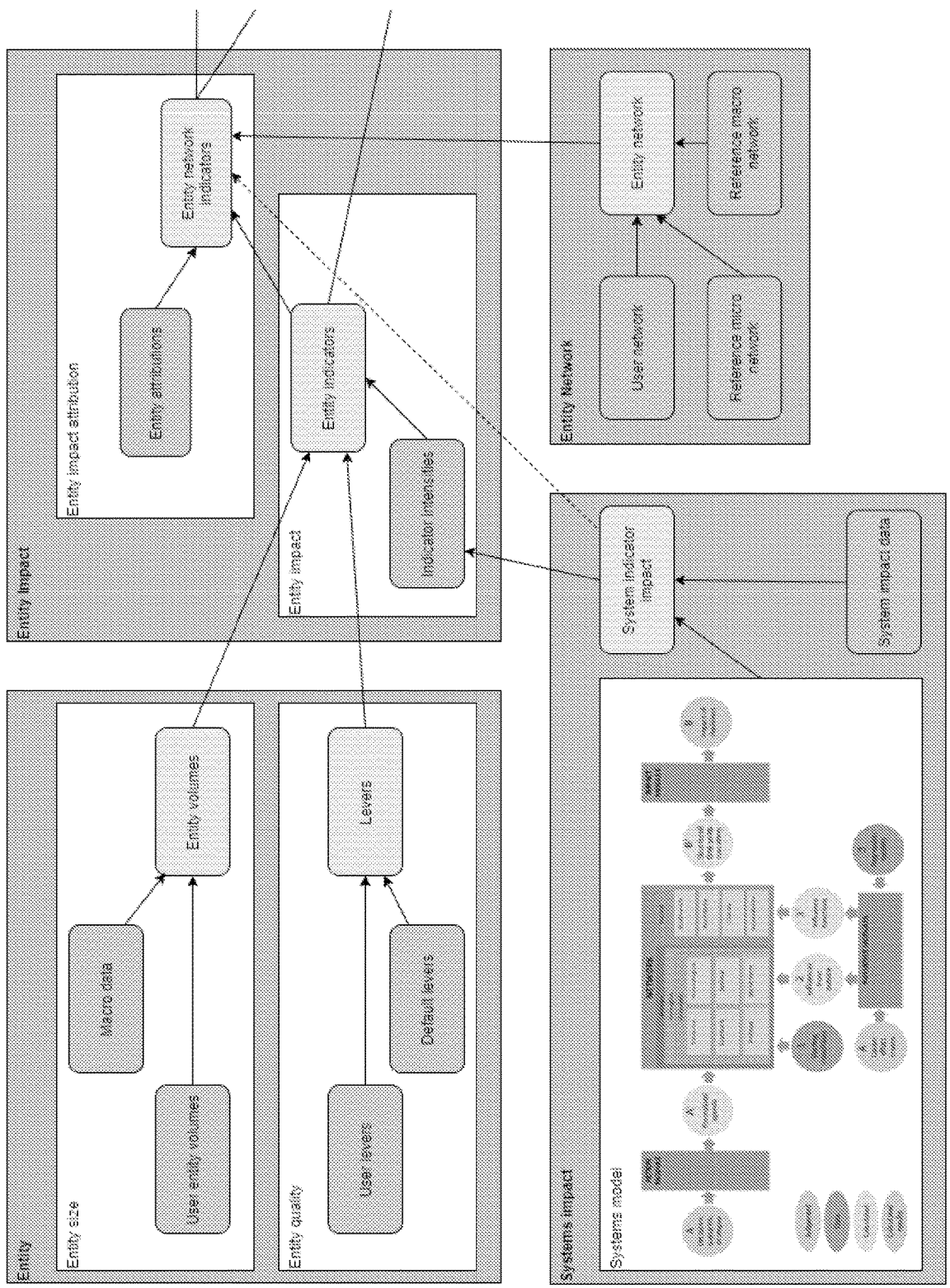
FIG. 17 show block diagrams illustrating schematically exemplary overview of the SDG parameter generation structure. The measuring system's 1 technical structure can e.g. be realized breaking down the parameter generation of the SDG 121 impact into a modular framework ensuring consistency, breaking dependency on unavailable information, enabling a forward-looking calculation, and providing transferable insights, as illustrated by FIG. 17.
Figure 17:
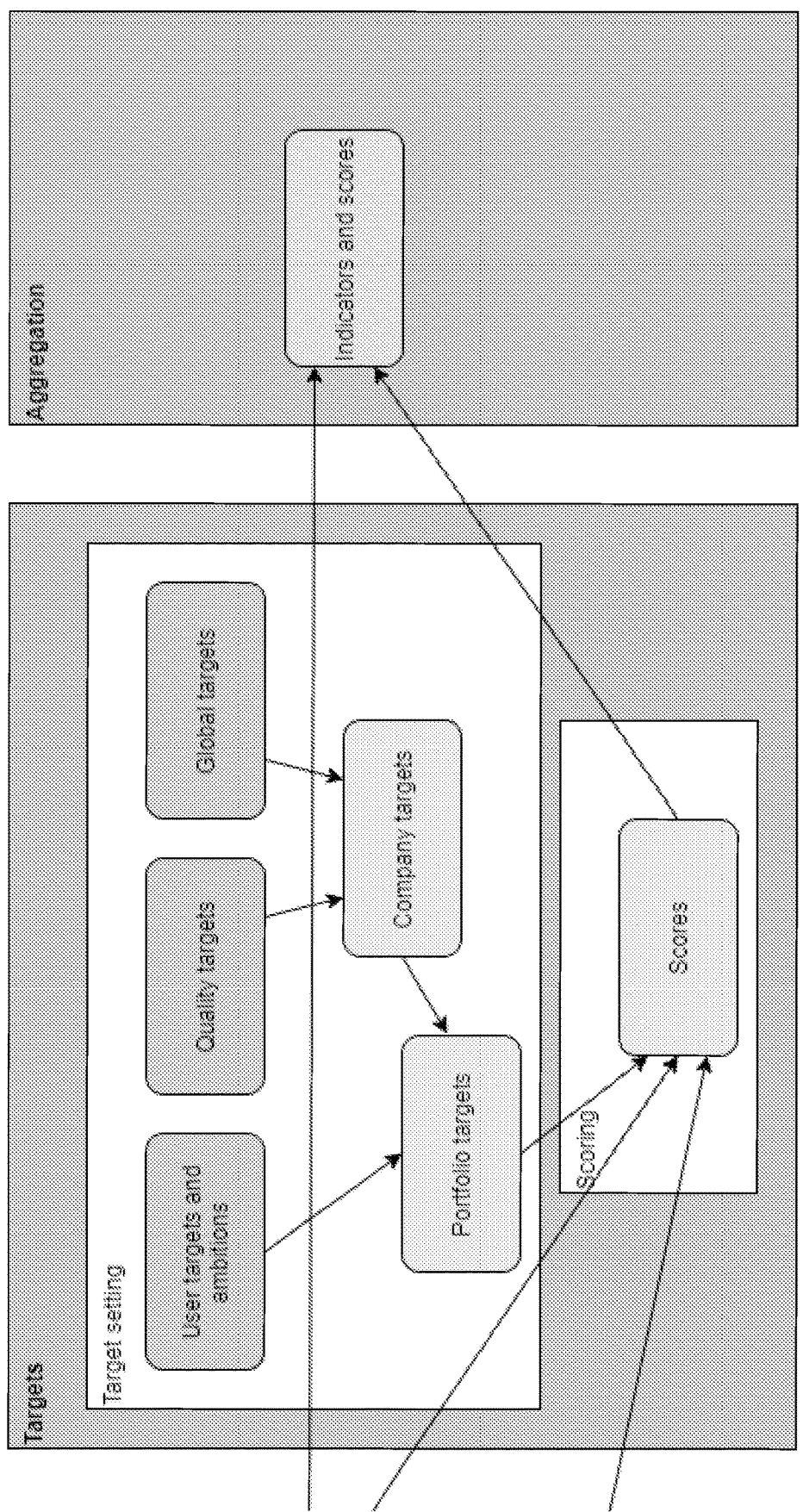

The measuring system's 1 technical structure can e.g. be realized breaking down the parameter generation of the SDG 121 impact into a modular framework ensuring consistency, breaking dependency on unavailable information, enabling a forward-looking calculation, and providing transferable insights, as illustrated by FIG. 17. FIG. 17 shows an exemplary overview of the SDG parameter generation structure. Further, the measuring system's 1 structure for the quantified measuring of the impact of applied risk-transfer structures of a system/object 2 to defined SDGs 121 can be illustrated by the following table, where for the direct impact intensities, the entity impact indicators can e.g. be omitted in the measuring system 1: The indicators 123 correspond to the entity network indicators with the special network consisting of the risk-transfer system and the risk-exposed object/system 2.

| Risk-Transfer | Implements | Part | Extension and adaptation for risk-transfer | In risk-transfer |
|---|---|---|---|---|
| Step 1 | Entity/Entity size | | Use of actuarial rates | Yes |
| Step 2 | Entity/Entity quality | | Direct impact mechanisms | Yes |
| Step 2 carbon | Entity/Entity quality | | | Yes |
| Step 3 | Entity Impact/Entity impact | | Direct impact intensities | Yes |
| | Entity Impact/Entity impact attribution | Attribution | Insurance attribution, cover effectiveness | Yes |
| | Entity Impact/Entity impact attribution | Network | Relationship insurance - insured | Yes |
| Step 3 carbon | Entity Impact/Entity impact | | CRO forum WACI | Yes |
| | Entity Impact/Entity impact attribution | Attribution | Like step 3 | Yes |
| | Entity Impact/Entity impact attribution | Network | Like step 3 | Yes |
| | Entity Impact/Entity impact attribution | Scope 3 | | Not yet |
| Step 4 | Targets/Scoring | | Cover effectiveness | Yes |
| Step 5 | Aggregation | | | Yes |
| Target setting | Targets/Target setting | Company | Insurance classification | Yes |
| | Targets/Target setting | Global | Insurance attribution | Not yet |
| | Targets/Target setting | Portfolio | Cover effectiveness | Part |
| Portfolio | Entity | | Insurance portfolio/policy | Yes |
| Contribution/no harm | Entity Impact/Entity impact | Indicator | From insurance (can be re-used) | Yes |
| | Targets/scoring | Threshold | From insurance (can be re-used) | Yes |
| | Aggregation | Aggregation | | Yes |
| System impact | Systems impact/systems model | | | Not yet |
| | Systems impact | | (via observed intensities only) | Part |
| | Entity network | | | Not yet |

Note, that the disclosed measuring system 1 is a technical concept: Each implementation and realization can have slightly different linkages and equations. The linkages are only exemplarily written down for an exemplary measuring system 1. The next table illustrates the link of the risk-transfer measuring part of the measuring system 1 to the underlying measuring structure.

| Risk-Transfer | Implements | Part | Extension and adaptation for risk-transfer | Implemented |
|---|---|---|---|---|
| Domain | Domain | Entity taxonomy | | Yes |
| information | information | Bounded contexts | Risk-transfer-related | Yes |
| model | model | Entities and attributes | All insurance specifics | Yes |
| | | Attributes and symbols | All insurance specifics | Yes |
| Domain | Domain | Functional blocks | | Yes |
| functional | functional | Implementation layers | | Yes |

-continued

| Risk-Transfer | Implements | Part | Extension and adaptation for risk-transfer | Implemented |
|---|---|---|---|---|
| model | model | Carbon calculation | Specific data sources | Yes |
| | | Handling of time | | Yes |
| | | Handling of identity | | Yes |

The architecture for a possible implementation of an embodiment of the inventive measuring system 1 can e.g. be realized using avatar measurements of temporally evolving risk-based real-world measuring parameters. The measuring system 1, at least partially realized as an automated, autonomous operating, electronic, digital cyber-physical production system, comprises a plurality of data-capturing devices or measuring sensors 1023/1033/1043 associated with a specific physical real-world system/object 2 to be monitored, and the world environment and ecosystem 3 the system/object 2 is interacting with and influencing its SDGs 12. The data-capturing devices and/or measuring sensors 1023/1033/1043, in particular, can comprise IoT sensory and digital sensory networks with appropriate controls, sensors and other devices that make up the digital sensory network. Such sensory network allow seamlessly collecting and communicating data to enable the measuring system 1. Thus, the physical real-world system/object 2 that is to be twinned is fitted with sensors that measures the desired parameters and forwards them to the connected measuring system 1. Sensory and tracking technology may create real-time streams of measuring data with a predictive potential. The appropriate measuring devices, wearables, trackers, smart devices and other sensors can so create a constant stream of evolving data that allow to track the evolution of the twinned system/object 2 and the twinned world environment and ecosystem 3. Granular streams of data from the used sensory and tracking technology can e.g. be molded into a single digital twin representation by using analytical capabilities of artificial intelligence and machine learning. For the measurements, the typically complex world environment and ecosystem 3 can be broken down to grid-cell-specific measurements measuring in subsystems and components 31 of the world environment and ecosystem and its respective structural subsystems 311, 312, 313, . . . , 31$i$ and/or geographical or topological subsystems/subregions or grid 32 and its respective geographical or topological grid cells 321, 322, 323, . . . , 32$i$.

The present invention has inter alia the advantage, that the measuring system 1 is consolidated in dynamic measuring technology, especially providing new technical advantages in the automation measurements of quantitative impacts of risk-transfer technology, in particular automated risk control and monitoring systems. For example in the case of automated means for risk-transfer in the context of its impacts to sustainable development goals 121, their nowadays increasing hyper-connection will contribute to the construction of the digital replicas 102/103/104 by means the measuring system 1, so that the measuring system 1 provides new technical ways to generate predictive modelling and offer automated monitoring and measuring systems. As an increasing amount of sensory data are generated e.g. through satellites, distributed measuring systems, smartphones, fitbits or other devices, prior art systems are, despite the availability of more and more data, not able to make them coherent and to translate them into quantified impact measurements e.g. of applied risk-transfer structures 4 to a system/object 2 in a real world environment and ecosystem 3. Thus, the inventive measuring system 1 is able to play a key role that allows a more direct and object-oriented linkage-measurement with the object/system 2. Thus, the measuring system 1 is able to provide a critical technical role as new intermediary measuring system between applied risk-transfer structures 4 to a system/object 2 in a real world environment and ecosystem 3, specialized in interpreting the accumulating big data by linking it to the generation of appropriate digital replica structures 102/103/104.

Finally, it should be noted that the present invention, as described above, can be realized to specially rely on various attributions and/or portfolio-specific targets and thresholds and/or company-specific targets and thresholds and/or risk-transfer specific classification translation.

LIST OF REFERENCE SIGNS

1 Measuring system
  10 Data Store
  101 Data-structure holding Digital Replica of the Complex System/Object
    1011 Digital Intelligence Layer
    1012 Property Parameters
      10121 Property Parameters of Complex System/Object
      10122 Property Parameters of World Env./Ecosystem
    1013 Modular Digital Data Elements of the System/Object
    1014 Status Parameters of the Complex System/Object
      10131 Structural Status Parameters
      10132 Operational Status Parameters
      10133 Environmental Status Parameters
      10134 Volume of applied Risk-Transfer Structures
      10135 Volume of the actions and/or operations conducted by the monitored complex system
  102 Digital Replica of the Real-World Complex System/Object
    1021 Simulation
    1022 Synchronization
    1023 Replica Linking: Sensory/Measuring/Data Acquisition
    1024 Digital Replica Layer of the Complex System/Object
      10241, . . . 1024$i$ Virtual Subsystems of Replicated Real-World Complex System/Object
  103 Digital Ecosystem Replica Layer
    1031 Simulation
    1032 Synchronization
    1033 Replica Linking: Sensory/Measuring/Data Acquisition
    1034 Digital Replica Layer of World Environment/Ecosystem
      10341, . . . 1034$i$ Virtual Subsystems of Replicated World Environment/Ecosystem
  104 Digital Risk-Transfer Structure Replica Layer
    1041 Simulation
    1042 Synchronization
    1043 Replica Linking: Sensory/Measuring/Data Acquisition
  105 Levers
    1051 Lever-specific Volume
    1052 Indicator Intensities 11 Measured distances of progress
111, 112, ..., 11x Measured distances
12 Sustainable Development
121 Predefined Sustainable Development Goals (SDGs)
    1211 UN Sustainable Development Goals (1, ..., 17)
122 Predefined Sustainable Development Targets
    1221 UN Sustainable Development Targets (1, ..., 169)
123 Predefined Sustainable Development Indicators
    1231 UN Sustainable Development Indicators (1, ..., 232)
    1232 SDG Key Performance Indicators
    1233 Measured Indicator Intensity
    1234 Measured Indicator Rate
13 Sensory and Measuring devices
131 IoT Sensory (input devices and sensors)
132 Image/pattern recognition based measurement
    1321 Satellite based measurements
133 Data Transmission Interface
    1331, 1332, ..., 133i Unified Identicator
14 Data transmission network
15 Central Processing Unit
16 Data Processing/Data Mining/Machine Learning/Neural Network
2 Real-world Complex System or Object
21 Environmental-Human and/or Human-Human Linkages (transmission mechanisms)
22 Subsystems of the Real-world Complex System or Object Classified by Operational/Structural criteria
    221, 222, 223, ..., 22i Subsystems 1, ..., l (e.g. line of businesses)
23 Subsystems of the Real-world Complex System or Object classified by Geographical and/or Topographical Criteria
    231, 232, 233, ..., 23i Subsystems 1, ..., l (e.g. line of businesses)
24 Operation and/or actions performed by the complex system or object
25 SDG relevant properties
26 Modified Environmental-Human and/or Human-Human Linkages
    261 Transmission Mechanism
    262 Transmission Rate
    263 Transmission Volume/Value (Complex System's Volume Times Transmission Rate)
3 World Environment and Ecosystem (including Social Ecosystem e.g. captured by SDG 1/3/8 etc.)
31 Subsystems and Components of the World Environment and Ecosystem
    311, 312, 313, ..., 31i Subsystems
32 Geographical or topological Subsystems/Subregions or Grid
    321, 322, 323, ..., 32i Geographical or Topological Grid Cells
4 Applied Risk-Transfer Structures
41 Risk-Transfer Structure— SDG Linkages
    411, ... 41x Risk-Transfer Structure— SDG Linkage
42 Volume of applied Risk-Transfer Structures
43 SDG-relevant properties of the risk-transfer structures
44 Aggregated Risk-Transfer Structures, i.e. Portfolio/Container/Basket of Applied Risk-Transfer Structures
45 Coverage Provided by the Applied Risk-Transfer Structures 4

The invention claimed is:

1. A method for progress monitoring and steering of impacts of a complex system to a world environment and ecosystem and social ecosystem induced by environmental-human and/or human-human linkages and for quantitative measuring of effects of applied risk-transfer structures to said environmental-human and/or human-human linkages induced by risk-transfer-sustainable development goal (SDG) linkages measuring quantifying distances of progresses toward at least one of a predefined SDG with and without applying said risk-transfer structures, the method performed by an automated measuring system and comprising:

capturing parameters indicating (i) a classification of the applied risk-transfer structures by operational or structural components and/or region or topographical cells, (ii) a volume of the applied risk-transfer structures by a risk-transfer structure count and at least one other volume measure, and (iii) a quantification of SDG-relevant properties of the applied risk-transfer structures, quantifying the applied risk-transfer structures by classifying the risk-transfer structures and quantifying an associated risk-transfer volume and a volume of actions and/or operations conducted by the complex system, measuring the environmental-human and/or human-human linkages and the risk-transfer-SDG linkages of the complex system to an SDG by quantifying associated impacts of SDG-relevant properties of the complex system, the measuring being realized by measuring temporally evolving real-world measuring parameters by a plurality of measuring sensors associated with physical real-world systems/objects to be monitored and associated with the world environment and ecosystem the systems/objects are interacting with and influencing their SDGs, including at least one of satellites, distributed measuring systems, smartphones, and wearable devices, allowing seamlessly collecting and communicating data enabling the measuring system, capturing the properties of the complex system by creating a digital replica of the complex system based on performing machine learning on the evolving real-world measuring parameters measured by the plurality of measuring sensors and using a parametrization capturing a modified environmental-human and/or human-human linkage modified by one or more of the risk-transfer-SDG linkages associated with one or more of the applied risk-transfer structures to an SDG impact, the modified environmental-human and/or human-human linkages including three main parts: (i) a transmission mechanism cause capturing an impact of the complex system on a specific indicator, (ii) a transmission rate represented by a measuring value linking the transmission mechanism cause to a relevant activity/operation volume of the complex system, and (iii) a transmission measuring value providing a complex system's volume as the complex system's volume times a transmission rate for an indicator scaled by a risk-transfer structure allocation, parametrizing levers being generated by capturing mechanisms to SDG impact as different channels of transmission, for each risk-transfer structure a default value being determined from the classification, and the default values being adjusted in relation to the classification, the transmission rate generated to consist of fractions of the complex system's volume which are homogeneous and relevant for a specific indicator and type of fraction or of a measuring value quantifying the quality of the complex system as a type of custom, quantifying the impact of the complex system on selected SDG indicators, a lever-specific volume being applied to an indicator intensity of the complex system and an underlying impact being attributed to an allocation of a risk-transfer structure, wherein a lever comprises a fraction value of a risk-transfer volume, the quantification comprising quantifying SDG-relevant properties of the risk-transfer structure, comparing, for indicator conversion and scoring, the indicators to reference values to generate relative measures and converting them to a score metric, aggregating indicators and scores across different portfolios and/or policies of the applied risk-transfer structures and aggregating scores across SDGs and across the different portfolios and/or policies of the applied risk-transfer structures, the scores being combined into an overall score for steering and overall optimization, each score indicating the performance of an applied risk-transfer structure to a relative target according to a certain SDG indicator, and the risk-transfer structures being adapted based on the quantified measuring of the impact of the applied risk-transfer structures.

2. The method according to claim 1, wherein the transmission rate includes either of one or more fractions of the complex system's volume which are homogeneous and relevant for the specific indicator and type of fraction or of a measuring value quantifying a quality of the complex system as a type of custom.

3. The method according to claim 1, wherein generation of the transmission rate is provided in a step of monitoring the transmission mechanisms and is either integrated into the measuring system or is not integrated into the measuring system, and signaling of the measuring system is used as input to a system generating the transmission rate.

4. The method according to claim 1, wherein the at least one other volume measure comprises at least one or more defined premium monetary parameter and or parameter capturing a sum covered by a risk-transfer.

5. The method according to claim 1, wherein the captured parameters indicating the classification of the applied risk-transfer structures include a portfolio and/or policy classification of the applied risk-transfer structures.

6. The method according to claim 1, wherein the captured parameters indicate the classification of the applied risk-transfer structures by lines of business and/or geographic locations.

7. The method according to claim 1, wherein quantifying the applied risk-transfer structures by classifying the risk-transfer structures includes quantifying the portfolios and policies of applied risk-transfer structures by classifying the risk-transfer structures.

8. The method according to claim 1, wherein the environmental-human and/or human-human linkages of the complex system include transmission mechanisms associated with operations or actions of the complex system to the world environment and ecosystem.

9. The method according to claim 1, wherein the captured parameters indicating the volume of the applied risk-transfer structures by the risk-transfer structure count and the at least one other volume measure include one or more portfolio volume by policy count and the at least one other volume measure.

10. The method according to claim 1, wherein, for capturing the mechanisms to SDG impact as different channels of transmission, for each policy and/or portfolio, a default value or an array of default values is determined from the classification.

11. An automated monitoring system for monitoring and steering a measured progress of impacts of a complex system or object to world environment and ecosystem and social eco-system induced by environmental-human and/or human-human linkages and quantitatively measuring effects of applied risk-transfer structures to said environmental-human and/or hu-man-human linkages induced by risk-transfer-SDG linkages by quantified distance measurements of progresses toward at least one predefined sustainable development goal (SDG) by applying said risk-transfer structures, the monitoring system being configured to perform:

capturing by the monitoring system parameters indicating (i) a classification of the applied risk-transfer structures by operational or structural components and/or region or topographical cells, (ii) a volume of the applied risk-transfer structures by a risk-transfer structure count and at least one other volume measure, and (iii) a quantification of SDG-relevant properties of the applied risk-transfer structures;

quantifying the applied risk-transfer structures by classifying the risk-transfer structures and quantifying an associated risk-transfer volume and the volume of the actions and/or operations conducted by the monitored complex system;

measuring the environmental-human linkages and the risk-transfer-SDG linkages of the complex system or object to a SDG by quantifying associated impacts of SDG-relevant properties of the monitored complex system, the measuring being realized by measuring temporally evolving real-world measuring parameters by a plurality of measuring sensors associated with physical real-world systems/objects to be monitored and associated with the world environment and ecosystem the systems/objects are interacting with and influencing their SDGs, including at least one of satellites, distributed measuring systems, smartphones, and wearable devices, allowing seamlessly collecting and communicating data enabling the measuring system, capturing the properties of the complex system by creating a digital replica of the complex system based on performing machine learning on the evolving real-world measuring parameters measured by the plurality of measuring sensors and using a parametrization each capturing an environmental-human linkage modified by one or more risk-transfer-SDG linkages associated with one or more of the applied risk-transfer structures to the SDG impact, wherein the modified environmental-human and/or human-human linkages consisting of three main parts: (i) a transmission mechanism cause capturing the impact of the complex system on a specific indicator, (ii) a transmission rate represented by a measuring value linking the cause of the transmission mechanism to the relevant activity/operation volume of the complex system, and (iii) a transmission measuring value providing a complex system's volume as complex system's volume times transmission rate for an indicator scaled by a risk-transfer structure allocation, wherein parametrizing levers are generated by the measuring system capturing the mechanisms to SDG impact as different channels of transmission, wherein for each risk-transfer structure a default value is determined from the classification, and wherein the default values are adjusted in relation to the classification;

generating the transmission rates by the monitoring of the transmission mechanisms, wherein the generation of the transmission rates is an integrated part of the monitoring system, and inputting the signaling of the monitoring system to the system generating the transmission rates, the transmission rate consisting of fractions of the complex system's volume which are homogeneous and relevant for a specific indicator and type of fraction or of a measuring value quantifying the quality of the complex system as a type of custom;

quantifying the impact of the complex system on selected SDG indicators, wherein a lever-specific volume is applied to an indicator intensity of the complex system, and an underlying impact is attributed to an allocation of a risk-transfer structure, wherein a lever comprises a fraction value of a risk-transfer volume, the quantification comprising quantifying SDG-relevant properties of the risk-transfer structure;

comparing, for indicator conversion and scoring, the monitored indicators to reference values to generate relative measures and converting them to a score metric; and aggregating indicators and scores across different portfolios and/or policies of applied risk-transfer structures and aggregating scores across SDGs and across different portfolios and/or policies of applied risk-transfer structures, the scores being combined into an overall score for steering and overall optimization, each score indicating the performance of an applied risk-transfer structure to a relative target according to a certain SDG indicator, and the risk-transfer structures being adapted based on the quantified measuring of the impact of the applied risk-transfer structures.

* * * * *